United States Patent
Nasserbakht et al.

(10) Patent No.: US 10,368,241 B1
(45) Date of Patent: Jul. 30, 2019

(54) SECURITY FOR MOBILE AND STATIONARY ELECTRONIC SYSTEMS

(71) Applicant: ENORCOM Corporation, Los Altos, CA (US)

(72) Inventors: Gitty N. Nasserbakht, Los Altos, CA (US); Mitra Nasserbakht, Los Altos, CA (US)

(73) Assignee: ENORCOM Corporation, Los Altos, CA (US)

( * ) Notice: Subject to any disclaimer, the term of this patent is extended or adjusted under 35 U.S.C. 154(b) by 0 days.

(21) Appl. No.: 15/431,436

(22) Filed: Feb. 13, 2017

Related U.S. Application Data

(63) Continuation of application No. 14/509,895, filed on Oct. 8, 2014, now abandoned, which is a continuation of application No. 13/674,612, filed on Nov. 12, 2012, now Pat. No. 8,868,036, which is a continuation of application No. 12/193,711, filed on Aug. 18, 2008, now Pat. No. 8,311,513, which is a continuation-in-part of application No. 12/163,973, filed on Jun. 27, 2008, now Pat. No. 8,495,020, and a continuation-in-part of application No. 12/163,878, filed on Jun. 27, 2008, now Pat. No. 8,326,353.

(60) Provisional application No. 60/965,104, filed on Aug. 17, 2007, provisional application No. 60/946,618, filed on Jun. 27, 2007.

(51) Int. Cl.
| | |
|---|---|
| *H04W 12/06* | (2009.01) |
| *H04L 29/06* | (2006.01) |
| *G06F 1/3218* | (2019.01) |
| *G06F 1/16* | (2006.01) |
| *G06Q 30/02* | (2012.01) |

(52) U.S. Cl.
CPC .......... *H04W 12/06* (2013.01); *G06F 1/1647* (2013.01); *G06F 1/1654* (2013.01); *G06F 1/3218* (2013.01); *H04L 63/083* (2013.01); *H04L 63/0853* (2013.01); *H04L 63/0861* (2013.01); *G06Q 30/0261* (2013.01); *G06Q 30/0267* (2013.01)

(58) Field of Classification Search
CPC .... H04W 12/06; G06F 1/1647; G06F 1/1654; G06F 1/3218; H04L 63/083; H04L 63/0853; H04L 63/0861; G06Q 30/0261; G06Q 30/0267
USPC ......... 455/411, 410, 418, 419; 726/2, 22, 26
See application file for complete search history.

(56) References Cited

U.S. PATENT DOCUMENTS

| | | |
|---|---|---|
| 4,644,246 A | 2/1987 | Knapen |
| 5,845,005 A | 12/1998 | Setlak et al. |

(Continued)

FOREIGN PATENT DOCUMENTS

| | | |
|---|---|---|
| WO | WO-03025696 A2 | 3/2003 |
| WO | WO-2006004786 A1 | 1/2006 |

OTHER PUBLICATIONS

U.S. Appl. No. 12/163,878, Preliminary Amendment filed Sep. 4, 2008, 27 pgs.

(Continued)

*Primary Examiner* — Mong-Thuy T Tran
(74) *Attorney, Agent, or Firm* — Schwegman Lundberg & Woessner, P.A.

(57) ABSTRACT

An automated system and method for electronic systems is disclosed providing proactive and anticipatory autonomous security procedures for mobile device and stationary environments including hybrid security and authentication mechanisms.

11 Claims, 49 Drawing Sheets

(56) References Cited

U.S. PATENT DOCUMENTS

| | | | |
|---|---|---|---|
| 5,933,515 A * | 8/1999 | Pu | G06K 9/00006 340/5.53 |
| 6,038,315 A | 3/2000 | Strait et al. | |
| 6,144,358 A | 11/2000 | Narayanaswamy et al. | |
| 6,169,575 B1 | 1/2001 | Anderson et al. | |
| 6,256,737 B1 | 7/2001 | Bianco et al. | |
| 6,259,782 B1 | 7/2001 | Gallant | |
| 6,311,063 B1 | 10/2001 | Valliani et al. | |
| 6,434,668 B1 | 8/2002 | Arimilli et al. | |
| 6,487,561 B1 | 11/2002 | Ofek et al. | |
| 6,507,912 B1 | 1/2003 | Matyas, Jr. et al. | |
| 6,810,414 B1 | 10/2004 | Brittain | |
| 6,944,478 B1 | 9/2005 | Durand | |
| 7,047,236 B2 | 5/2006 | Conroy et al. | |
| 7,127,239 B2 | 10/2006 | Ogman et al. | |
| 7,337,468 B2 | 2/2008 | Metzger | |
| 7,415,662 B2 | 8/2008 | Rothmuller et al. | |
| 7,603,139 B1 | 10/2009 | Tom | |
| 7,606,560 B2 | 10/2009 | Labrou et al. | |
| 7,636,733 B1 | 12/2009 | Rothmuller | |
| 7,650,409 B2 | 1/2010 | Cain et al. | |
| 7,657,227 B2 | 2/2010 | Doan et al. | |
| 7,657,270 B2 | 2/2010 | Hicks, III et al. | |
| 7,680,491 B2 | 3/2010 | Zabawskyj et al. | |
| 7,711,152 B1 | 5/2010 | Davida et al. | |
| 7,714,709 B1 | 5/2010 | Daniel | |
| 7,724,717 B2 | 5/2010 | Porras et al. | |
| 7,777,689 B2 | 8/2010 | Fratti et al. | |
| 7,796,013 B2 | 9/2010 | Murakami et al. | |
| 7,831,264 B2 | 11/2010 | Miegel | |
| 7,930,629 B2 | 4/2011 | Hurst-hiller et al. | |
| 7,956,742 B2 | 6/2011 | Lupoli et al. | |
| 7,957,401 B2 | 6/2011 | Zalenski et al. | |
| 7,995,995 B2 | 8/2011 | Novack et al. | |
| 8,281,136 B2 | 10/2012 | Ramakrishna | |
| 8,311,513 B1 | 11/2012 | Nasserbakht et al. | |
| 8,326,353 B1 | 12/2012 | Nasserbakht et al. | |
| 8,375,088 B2 | 2/2013 | Glasgow | |
| 8,495,020 B1 | 7/2013 | Nasserbakht et al. | |
| 8,805,441 B1 | 8/2014 | Nasserbakht et al. | |
| 8,868,036 B1 | 10/2014 | Nasserbakht et al. | |
| 8,897,760 B1 | 11/2014 | Nasserbakht et al. | |
| 9,201,885 B1 | 12/2015 | Nasserbakht et al. | |
| 9,509,674 B1 | 11/2016 | Nasserbakht et al. | |
| 9,542,493 B1 | 1/2017 | Nasserbakht et al. | |
| 2001/0034836 A1 | 10/2001 | Matsumoto et al. | |
| 2001/0041056 A1 | 11/2001 | Tanaka et al. | |
| 2001/0043514 A1 | 11/2001 | Kita | |
| 2002/0077129 A1 | 6/2002 | Kikuta et al. | |
| 2002/0123325 A1 * | 9/2002 | Cooper | H04L 63/0492 455/411 |
| 2002/0173339 A1 | 11/2002 | Safadi | |
| 2003/0033296 A1 | 2/2003 | Rothmuller et al. | |
| 2003/0041263 A1 | 2/2003 | Devine et al. | |
| 2003/0045270 A1 | 3/2003 | Agrawal et al. | |
| 2003/0105725 A1 * | 6/2003 | Hoffman | G06F 21/32 705/75 |
| 2003/0125072 A1 | 7/2003 | Dent | |
| 2003/0125082 A1 | 7/2003 | Vanderhelm | |
| 2003/0217073 A1 | 11/2003 | Walther et al. | |
| 2003/0229542 A1 | 12/2003 | Morrisroe | |
| 2004/0034645 A1 | 2/2004 | Manabe et al. | |
| 2004/0041917 A1 | 3/2004 | Norcross et al. | |
| 2004/0102182 A1 | 5/2004 | Reith et al. | |
| 2004/0167938 A1 | 8/2004 | Margolus et al. | |
| 2004/0168173 A1 | 8/2004 | Cohen et al. | |
| 2004/0203505 A1 | 10/2004 | Newman et al. | |
| 2004/0219902 A1 | 11/2004 | Lee et al. | |
| 2004/0267944 A1 | 12/2004 | Britt, Jr. | |
| 2005/0096518 A1 | 5/2005 | Chang | |
| 2005/0138433 A1 | 6/2005 | Linetsky | |
| 2005/0182944 A1 | 8/2005 | Wagner et al. | |
| 2005/0197844 A1 | 9/2005 | Ng et al. | |
| 2005/0220325 A1 | 10/2005 | Kinsella | |
| 2005/0222933 A1 | 10/2005 | Wesby | |
| 2005/0282529 A1 | 12/2005 | Thorson et al. | |
| 2006/0003782 A1 | 1/2006 | Jensen et al. | |
| 2006/0015405 A1 | 1/2006 | Bala et al. | |
| 2006/0015725 A1 | 1/2006 | Voice et al. | |
| 2006/0068812 A1 | 3/2006 | Carro et al. | |
| 2006/0105754 A1 | 5/2006 | Jagadeesan et al. | |
| 2006/0121939 A1 | 6/2006 | Anwar et al. | |
| 2006/0156385 A1 | 7/2006 | Chiviendacz et al. | |
| 2006/0166715 A1 | 7/2006 | Van Engelen et al. | |
| 2006/0187717 A1 | 8/2006 | Hsieh | |
| 2006/0242241 A1 | 10/2006 | Tock et al. | |
| 2006/0282886 A1 | 12/2006 | Gaug | |
| 2007/0011261 A1 | 1/2007 | Madams et al. | |
| 2007/0028105 A1 | 2/2007 | Hynek | |
| 2007/0032240 A1 | 2/2007 | Finnegan et al. | |
| 2007/0050396 A1 | 3/2007 | Cheng et al. | |
| 2007/0061881 A1 | 3/2007 | Eyre | |
| 2007/0100666 A1 | 5/2007 | Stivoric et al. | |
| 2007/0115940 A1 * | 5/2007 | Kamen | H04L 63/0853 370/352 |
| 2007/0142024 A1 | 6/2007 | Clayton et al. | |
| 2007/0167136 A1 | 7/2007 | Groth | |
| 2007/0174906 A1 | 7/2007 | Burchett et al. | |
| 2007/0182582 A1 | 8/2007 | Booher et al. | |
| 2007/0196096 A1 | 8/2007 | Naruse | |
| 2007/0250920 A1 | 10/2007 | Lindsay | |
| 2007/0260862 A1 | 11/2007 | Mcfarling | |
| 2007/0273518 A1 | 11/2007 | Lupoli et al. | |
| 2007/0291661 A1 | 12/2007 | Nishibayashi et al. | |
| 2007/0293275 A1 | 12/2007 | Kalinichenko et al. | |
| 2007/0294403 A1 | 12/2007 | Verona | |
| 2007/0300164 A1 | 12/2007 | Bhogal et al. | |
| 2007/0300288 A1 | 12/2007 | Choi | |
| 2008/0005087 A1 | 1/2008 | Sato et al. | |
| 2008/0018459 A1 | 1/2008 | Derrick et al. | |
| 2008/0021834 A1 | 1/2008 | Holla et al. | |
| 2008/0045161 A1 | 2/2008 | Lee et al. | |
| 2008/0062625 A1 | 3/2008 | Batio | |
| 2008/0068292 A1 | 3/2008 | Yuan et al. | |
| 2008/0072063 A1 | 3/2008 | Takahashi et al. | |
| 2008/0086759 A1 | 4/2008 | Colson | |
| 2008/0117679 A1 | 5/2008 | Srinivasan et al. | |
| 2008/0117839 A1 | 5/2008 | Raju et al. | |
| 2008/0130957 A1 * | 6/2008 | Small | G06F 19/322 382/115 |
| 2008/0153670 A1 | 6/2008 | Mckirdy et al. | |
| 2008/0168135 A1 | 7/2008 | Redlich et al. | |
| 2008/0189496 A1 | 8/2008 | Raczynski et al. | |
| 2008/0201302 A1 | 8/2008 | Kimchi et al. | |
| 2008/0222706 A1 | 9/2008 | Renaud et al. | |
| 2008/0243696 A1 | 10/2008 | Levine | |
| 2008/0288573 A1 | 11/2008 | Bellotti et al. | |
| 2008/0289032 A1 | 11/2008 | Aoki et al. | |
| 2009/0195379 A1 | 8/2009 | Joy et al. | |
| 2009/0207187 A1 | 8/2009 | Lee | |
| 2009/0235087 A1 | 9/2009 | Bird | |
| 2009/0240949 A9 * | 9/2009 | Kitchens | G06F 21/316 713/183 |
| 2009/0259588 A1 | 10/2009 | Lindsay | |
| 2010/0058106 A1 | 3/2010 | Srinivasan et al. | |
| 2010/0173620 A1 | 7/2010 | Hicks, III | |
| 2010/0255829 A1 | 10/2010 | Forte | |
| 2012/0088481 A1 | 4/2012 | Postma et al. | |
| 2014/0335848 A1 | 11/2014 | Nasserbakht et al. | |
| 2015/0095158 A1 | 4/2015 | Nasserbakht et al. | |

OTHER PUBLICATIONS

U.S. Appl. No. 12/163,878, Supplemental Preliminary Amendment filed Sep. 17, 2008, 3 pgs.
U.S. Appl. No. 12/163,878, Preliminary Amendment filed Jun. 9, 2011, 7 pgs.
U.S. Appl. No, 12/163,878, Restriction Requirement dated Oct. 18, 2011, 7 pgs.
U.S. Appl. No. 12/163,878, Response filed Nov. 17, 2011 to Restriction Requirement dated Oct. 18, 2011, 10 pgs.
U.S. Appl. No. 12/163,878, Non Final Office Action dated Jan. 17, 2012, 26 pgs.

(56) References Cited

OTHER PUBLICATIONS

U.S. Appl. No. 12/163,878, Response filed Apr. 17, 2012 to Non Final Office Action dated Jan. 17, 2012, 35 pgs.
U.S. Appl. No. 12/163,878, Final Office Action dated May 14, 2012, 8 pgs.
U.S. Appl. No. 12/163,878, Response filed Aug. 14, 2012 to Final Office Action dated May 14, 2012, 11 pgs.
U.S. Appl. No. 12/163,878, Examiner Interview Summary dated Aug. 16, 2012, 3 pgs.
U.S. Appl. No. 12/163,878, Notice of Allowance dated Aug. 23, 2012, 5 pgs.
U.S. Appl. No. 12/163,973, Preliminary Amendment filed Sep. 4, 2008, 27 pgs.
U.S. Appl. No. 12/163,973, Supplemental Preliminary Amendment filed Sep. 17, 2008, 3 pgs.
U.S. Appl. No. 12/163,973, Restriction Requirement dated Apr. 1, 2011, 4 pgs.
U.S. Appl. No. 12/163,973, Response filed May 2, 2011 to Restriction Requirement dated Apr. 1, 2011, 8 pgs.
U.S. Appl. No. 12/163,973, Non Final Office Action dated Aug. 2, 2011, 19 pgs.
U.S. Appl. No. 12/163,973, Response filed Oct. 28, 2011 to Non Final Office Action dated Aug. 2, 2011, 22 pgs.
U.S. Appl. No. 12/163,973, Notice of Non Compliant Amendment dated Jan. 3, 2012, 3 pgs.
U.S. Appl. No. 12/163,973, Response filed Feb. 3, 2012 to Notice of Non Compliant Amendment dated Jan. 3, 2012, 9 pgs.
U.S. Appl. No. 12/163,973, Final Office Action dated Jun. 7, 2012, 19 pgs.
U.S. Appl. No. 12/163,973, Response filed Sep. 7, 2012 to Final Office Action dated Jun. 7, 2012, 14 pgs.
U.S. Appl. No. 12/163,973, Advisory Action dated Sep. 27, 2012, 3 pgs.
U.S. Appl. No. 12/163,973, Response filed Dec. 27, 2012 to Final Office Action dated Jun. 7, 2012 and Advisory Action dated Sep. 27, 2012, 13 pgs.
U.S. Appl. No. 12/163,973, Notice of Allowance dated Mar. 25, 2013, 9 pgs.
U.S. Appl. No. 12/193,711, Preliminary Amendment filed Sep. 5, 2008, 19 pgs.
U.S. Appl. No. 12/193,711, Restriction Requirement dated Jan. 5, 2011, 9 pgs.
U.S. Appl. 12/193,711, Response filed Feb. 4, 2011 to Restriction Requirement dated Jan. 5, 2011, 12 pgs.
U.S. Appl. No. 12/193,711, Supplemental Response filed Feb. 7, 2011 to Restriction Requirement dated Jan. 5, 2011, 12 pgs.
U.S. Appl. No. 12/193,711, Non Final Office Ation dated Apr. 11, 2011, 22 pgs.
U.S. Appl. No. 12/193,711, Response filed Jul. 11, 2011 to Non Final Office Action dated Apr. 11, 2011, 47 pgs.
U.S. Appl. No. 12/193,711, Non Final Office Action dated Sep. 26, 2011, 27 pgs.
U.S. Appl. No. 12/193,711, Response filed Dec. 22, 2011 to Non Final Office Action dated Sep. 26, 2011, 38 pgs.
U.S. Appl. No. 12/193,711, Final Office Action dated Mar. 14, 2012, 38 pgs.
U.S. Appl. No. 12/193,711, Response filed May 14, 2012 to Final Office Action dated Mar. 14, 2012, 47 pgs.
U.S. Appl. No. 12/193,711, Advisory Action dated Jun. 5, 2012, 6 pgs.
U.S. Appl. No. 12/193,711, Response filed Jun. 14, 2012 to Advisory Action dated Jun. 5, 2012, 17 pgs.
U.S. Appl. No. 12/193,711, Notice of Allowance dated Jul. 9, 2012, 7 pgs.
U.S. Appl. No. 13/674,526 Preliminary Amendment filed Nov. 12, 2012, 25 pgs.
U.S. Appl. No. 13/674,526, Non Final Office Action dated May 16, 2013, 20 pgs.
U.S. Appl. No. 13/674,526, Response filed Oct. 16, 2013 to Non Final Office Action dated May 16, 2013, 28 pgs.
U.S. Appl. No. 13/674,526, Final Office Action dated Nov. 20, 2013, 19 pgs.
U.S. Appl. No. 13/674,526, Response filed Mar. 20, 2014 to Final Office Action dated Nov. 20, 2013, 12 pgs.
U.S. Appl. No. 13/674,526, Notice of Allowance dated Mar. 31, 2014, 7 pgs.
U.S. Appl. No. 13/674,526, PTO Response to Rule 312 Communication dated Jul. 14, 2014, 2 pgs.
U.S. Appl. No. 13/674,576, Restriction Requirement dated Jun. 28, 2013, 6 pgs.
U.S. Appl. No. 13/674,576, Response filed Sep. 30, 2013 to Restriction Requirement dated Jun. 28, 2013, 9 pgs.
U.S. Appl. No. 13/674,576, Non Final Office Action dated Dec. 4, 2013, 12 pgs.
U.S. Appl. No. 13/674,576, Response filed Jun. 4, 2014 to Non Final Office Action dated Dec. 4, 2013, 14 pgs.
U.S. Appl. No. 13/674,576, Notice of Allowance dated Jul. 10, 2014, 7 pgs.
U.S. Appl. No. 13/674,576, PTO Response to Rule 312 Communication dated Oct. 20, 2014, 2 pgs.
U.S. Appl. No. 13/674,612, Preliminary Amendment filed Feb. 5, 2013, 8 pgs.
U.S. Appl. No. 13/674,612, Non Final Office Action dated May 8, 2013, 21 pgs.
U.S. Appl. No. 13/674,612, Response filed Oct. 8, 2013 to Non Final Office Action dated May 8, 2013, 19 pgs.
U.S. Appl. No. 13/674,612, Final Office Action dated Dec. 30, 2013, 19 pgs.
U.S. Appl. No. 13/674,612, Response filed May 30, 2014 to Final Office Actio dated Dec. 30, 2013, 18 pgs.
U.S. Appl. No. 13/674,612, Notice of Allowance dated Jun. 9, 2014, 7 pgs.
U.S. Appl. No. 13/947,143, Preliminary Amendment filed Oct. 22, 2013, 36 pgs.
U.S. Appl. No. 13/947,143, Notice of Allowance dated Jul. 14, 2015, 18 pgs.
U.S. Appl. No. 13/947,143, PTO Response to Rule 312 Communication dated Oct. 19, 2015, 2 pgs.
U.S. Appl. No. 14/339,154, Non Final Office Action dated Feb. 19, 2016, 13 pgs.
U.S. Appl. No. 14/339,154, Response filed Jul. 19, 2016 to Non Final Office Action dated Feb. 19, 2016, 12 pgs.
U.S. Appl. No. 14/339,154, Supplemental Amendment filed Jul. 29, 2016, 3 pgs.
U.S. Appl. No. 14/339,154, Final Office Action dated Sep. 30, 2016, 30 pgs.
U.S. Appl. No. 14/509,895, Preliminary Amendment filed Oct. 9, 2014, 16 pgs.
U.S. Appl. No. 14/509,895, Non Final Office Action dated Dec. 3, 2015, 17 pgs.
U.S. Appl. No. 14/509,895, Response filed Jun. 3, 2016 to Non Final Office Action dated Dec. 3, 2015, 16 pgs.
U.S. Appl. No. 14/509,895, Final Office Action dated Aug. 11, 2016, 17 pgs.
U.S. Appl. No. 14/551,624, Preliminary Amendment filed Nov. 25, 2014, 16 pgs.
U.S. Appl. No. 14/551,624, Non Final Office Action dated Dec. 14, 2015, 12 pgs.
U.S. Appl. No. 14/551,624, Response filed Jun. 14, 2016 to Non Final Office Action dated Dec. 14, 2015, 13 pgs.
U.S. Appl. No. 14/551,624, Notice of Allowance dated Aug. 5, 2016, 8 pgs.
U.S. Appl. No. 14/949,518, Preliminary Amendment filed Nov. 23, 2015, 3 pgs.
U.S. Appl. No. 14/949,518, Supplemental Preliminary Amendment filed Jan. 15, 2016, 37 pgs.
U.S. Appl. No. 14/949,518, Preliminary Amendment filed Jul. 22, 2016, 8 pgs.
U.S. Appl. No. 14/949,518, Notice of Allowance dated Aug. 23, 2016, 15 pgs.
U.S. Appl. No. 14/949,518, Response filed Sep. 19, 2016 to Notice of Allowance dated Aug. 23, 2016, 10 pgs.

(56) References Cited

OTHER PUBLICATIONS

U.S. Appl. No. 14/949,518, PTO Response to Rule 312 Communication dated Sep. 29, 2016, 2 pgs.
U.S. Appl. No. 14/949,518, 312 Amendment filed Oct. 3, 2016, 4 pgs.
U.S. Appl. No. 14/949,518, PTO Response to Rule 312 Communication dated Oct. 13, 2016, 2 pgs.
U.S. Appl. No. 15/474,721, Preliminary Amendment filed Jun. 12, 2017, 12. pgs.
U.S. Appl. No. 15/474,721, Non Final Office Action dated Jun. 18, 2018, 14 pgs.
Microsoft Computer Dictionary, 5th Edition, Microsoft Press, Redmond, WA, (2002), 64-65.
Abowd, Gregory D, et al., "The Family Video Archive: An annotation and browsing environment for home movies", MIR '03, Berkeley, CA, [Online]. Retrieved from the Internet: <http://delivery.acm.org/1 0. 1145/980000/973266/p1-abowd.pdf?key1 =973266&key2=9710583711 &coll=&dl=acm&CFID=15151515&CFTOKEN= 618461>, (Nov. 7, 2003), 8 pgs.
Bloehdorn, Stephan, et al., "TagFS—Tag Semantics for Hierarchical File Systems", WWW 2006, Edinburgh, UK, (May 22-26, 2006), 1-6.
Patel, Shwetak, et al., "The ContextCam: Automated Point of Capture Video Annotation", UbiComp 2004, LNCS 3205, Springer-Verlag, Berlin, Germany, (2004), 301-318.

\* cited by examiner

Module A

| PAST / | PRESENT / | FUTURE / |
| --- | --- | --- |
| Statistics | Immediate Direction | Plans |

Vertical Viewing of Time-Sector Activities

DAY VIEW:

SECURITY FOR MOBILE AND STATIONARY ELECTRONIC SYSTEMS

This application is a Continuation of U.S. patent application Ser. No. 14/509,895, filed Oct. 8, 2014, which is a Continuation of U.S. patent application Ser. No. 13/674,612, filed Nov. 12, 2012, which is a Continuation of U.S. patent application Ser. No. 12/193,711, filed Aug. 18, 2008, now U.S. Pat. No. 8,311,513, issued on Nov. 13, 2012, which is a Continuation-In-Part of U.S. patent application Ser. No. 12/163,878, filed on Jun. 27, 2008, now U.S. Pat. No. 8,326,353, issued on Dec. 4, 2012, and Ser. No. 12/163,973, filed on Jun. 27, 2008, now U.S. Pat. No. 8,495,020, issued on Jul. 23, 2013, each of which claims priority under 35 USC 119(e) to Provisional U.S. Patent Application No. 60/946,618, filed on Jun. 27, 2007, and Provisional U.S. Patent Application No. 60/965,104, filed on Aug. 17, 2007, all of these applications are incorporated herein by reference for any purpose. U.S. patent application Ser. No. 12/193,711 also claims priority under 35 USC 119(e) to Provisional U.S. Patent Application No. 60/965,104, filed on Aug. 17, 2007, which is incorporated herein by reference for any purpose.

FIELD OF THE INVENTION

At least one embodiment of the present invention pertains to electronic devices for communication, entertainment and/or organization such as advanced mobile phones and other devices, and more particularly, to a device with customizable functionality and form factor. At least one embodiment of the present invention pertains to a electronic assistant system. The automated assistant provides automated, proactive and anticipatory services for the user.

BACKGROUND

Consumer electronic devices such as mobile electronic devices have undergone significant technological advances in recent years. Availability of advanced silicon technology, processing power, memory and advanced input/output (I/O) and display systems as well as an increasing level of communication bandwidth including next generation wireless cellular as well as WiFi/WiMax wireless broadband technologies enable the building of more-sophisticated devices.

Currently the majority of device innovations concentrate around increasing the computing capability of wireless handsets. In some cases, wireless handsets of today are more powerful than supercomputers of decades ago. More memory, processing power and bandwidth are available today, and the end consumer is able to generate and receive orders of magnitude more information compared to just a few short years ago. However, innovations in the areas of customization, organization and advanced services remain behind the computational power increases. In fact, since the first major PDAs were introduced nearly 20 years ago, there has been little done to solve the organizational needs of consumers besides having access to an electronic version of a paper calendar. Despite the many available electric devices, the majority of the population is still relying on paper calendars due to their ease of use, reliability and lower cost and the few additional benefits offered by their electronic counterparts.

The architecture of advanced mobile devices in the prior art is a highly integrated solution which does not allow for modularization and detachability of components. The goal of most advanced mobile phone designs is to maximize the computing power of the device to support as many features as possible and allow for future programmability and application development. This dictates a very high level of integration. At the core of this architecture is a high-powered integrated processor that controls all processes within the mobile device. The integrated processor incorporates multiple micro-processing cores and digital signal processors enabling the device to run as a general purpose machine. The architecture generally utilizes a hybrid approach to control the various components and programs running on the device. Overall it employs a PC-like environment with a general purpose operating system (OS) which is capable of running any number of programs which comply with its OS standards.

On the other hand, it needs to incorporate mechanisms for support of real time applications such as phones. Building a general-purpose engine to accommodate future programming and application capabilities as well as making the device broadly applicable to a large number of usage scenarios by various device manufacturers inherently requires a significant amount of overhead, significant wasted memory and computing resources, both passively as well as during runtime, to accommodate mostly unused features. It also significantly increases the effective number of clock cycles per useful operation, the clock frequency required to run the device in order to obtain a reasonable response time for critical application steps, resulting in significant power consumption and cost.

To accommodate the general-purpose characteristic of the architecture, a significant number of compromises are made, and as a result, the performance of frequently used features can suffer due to interruptions and accommodations made for such general-purpose items. In some cases, this has led to phones that take a long time to boot up, thus jeopardizing the main features of the device. In some cases, they drain the device battery to an unacceptable level, disabling critical functions such as emergency calling as well as increase the turn-on time and device response time to a point of noticeable difference and delay in human interaction, especially upon starting up the device, eliminating the highly desired instant-on feature of the device.

FIG. 1 shows the block diagram of an example of the current architecture. The integrated processor includes a number of sub-processors, such as general purpose programmable computing cores and digital signal processors, memory blocks, and drivers for a large number of peripheral devices which may be attached to the device. Advanced mobile devices are designed to provide maximum integration and provide maximum programmability. The functionality needed by the majority of mobile consumers, however, does not include an arbitrarily large number of features and applications.

SUMMARY

One aspect of the technique introduced here is a scheduling system for a mobile device, including a memory to store calendar events and a scheduler to automatically organize the events based on at least one of temporal, geographical, contextual availability, user-preference, past activities, usage pattern, proximity to other users or events, or combinations thereof. The scheduler can be accessible via a mobile device, electronic access device, the internet, phone, or combinations thereof. The scheduler can include a multi-user scheduling capability with multi-level access control allowing authorized groups or individual users the ability to schedule without viewing calendar detail, with view all or part of calendar detail, with modify contents of calendar, or combinations thereof. The scheduler can merge availability of multiple user calendars for viewing among a shared group. The scheduler can perform scheduling functions on the network, solely on clients' mobile devices or a combination thereof based on user requirements or availability of network or mobile device. The scheduler can detect change/delay in a schedule based on cross-referencing temporal, geographical, contextual information, user input, or combinations thereof and to generate an automatic, real-time notification to affected appointments and renegotiate schedules on the fly. The scheduler can provide one-step access to information, documents, contacts, emails, locations, or combinations thereof from inside the calendar for each appointment entry. The scheduler can provide live schedule progress entry, automatic notification, and adjustment to future appointments. The scheduler can include a request scheduler to initially prioritized and to sent to the automated network server through a broadband connection. The scheduler can communicate with an automated server to contact a service provider via phone and negotiates a schedule or completes requested transaction through a voice menu, using voice recognition. The scheduler can provide one step access to user-defined and automated personal services.

An aspect of the technique described herein includes an automated visual symbol display to highlight a current time position in the schedule.

An aspect of the technique described herein includes a scheduler to perform user-defined and automated services from a group consisting of automated information access, event and appointment scheduling, ordering, reservation, account inquiry and payment, and combinations thereof on a mobile device, electronic access device, the internet, phone, or combinations thereof.

An aspect of the technique described herein includes a request scheduler is to communicate with an automated server that communicates with the relevant servers on a computing network and negotiates a schedule, uploads or downloads information or completes requested transaction and reports the results back to the scheduler.

An aspect of the technique described herein includes a scheduler that can generate at least one of personalized alerts and news based on user-defined criteria based on at least one of temporal data, event-based criteria, financial data, usage pattern, current/future activity/proximity, or combinations thereof.

An aspect of the technique described herein includes a scheduler to provide a continuously updated alerts and/or news ticker line on a screen of a mobile device.

An aspect of the technique described herein includes a scheduler to pull advertisements, coupons, promotions from vendors to a mobile device based on at least one of user preference, activity, usage pattern, current/future proximity/activity, or combinations thereof.

An aspect of the technique described herein includes a scheduler to generate automated user-defined or machine-generated statistics in an electronic device based on past activities in multiple categories.

An aspect of the technique described herein includes a scheduler to track progress on user or machine-defined tasks in the mobile device.

An aspect of the technique described herein includes a scheduler is provide one-step access to progress tracking in various time groupings or categories.

An aspect of the technique described herein includes a scheduler that includes a live directory for a mobile device whose entries include temporal, location and contextual data including at least one of relationships, contact history, link to contact history, or combinations thereof with entries automatically updated.

An aspect of the technique described herein includes a scheduler that includes one step access to relevant directory detail information.

An aspect of the technique described herein includes a scheduler that provides one-step access to contacting entries on a personal list through various communication messaging including voice call, email, multimedia messaging, or combinations thereof.

An aspect of the technique described herein includes a scheduler that includes drag and drop directory entries to specific category listings.

An aspect of the technique described herein includes a scheduling method for a mobile device, including storing a calendar events and automatically organize the calendar events based on at least one of temporal, geographical, contextual availability, user-preference, past activities, usage pattern, proximity to other users or events, or combinations thereof. An aspect includes accessing the automatically organized calendar events via a mobile device, electronic access device, the internet, phone, or combinations thereof. Organizing can include multi-user scheduling with multi-level access control allowing authorized groups or individual users the ability to schedule without viewing calendar detail, with view all or part of calendar detail, with modify contents of calendar, or combinations thereof. Organizing can include merging availability of multiple user calendars for viewing among a shared group. Organizing can include detecting change/delay in a schedule based on cross-referencing temporal, geographical, contextual information, user input, or combinations thereof and to generate an automatic, real-time notification to affected appointments and renegotiate schedules on the fly. Organizing can include automatically generating visual symbol display to highlight a current time position in a schedule. Organizing can include providing a live schedule progress entry, automatic notification, and adjustment to future calendar events. Organizing can include performing user-defined and automated services from a group consisting of automated information access, event and appointment scheduling, ordering, reservation, account inquiry and payment, and combinations thereof on a mobile device, electronic access device, the internet, phone, or combinations thereof. Organizing can include initially prioritizing events and to sent to the automated network server through a broadband connection. Organizing can include communicating with an automated server that communicates with the relevant servers on a computing network and negotiates a schedule, uploads or downloads information or completes requested transaction and reports the results back to the scheduler. Organizing can include providing a live directory for a mobile device whose entries include temporal, location and contextual data including at least one of relationships, contact history, link to contact history, or combinations thereof with entries automatically updated.

An aspect of the technique described herein includes a mobile device, with a processing element, a memory operatively connected to the processing element, and wherein the processing element is to perform automated security breach monitoring and multi-level security breach handling procedure based on at least one of user location, activity, proximity, environmental and biological information, or combinations thereof. A processing element can presents cloned data to a user when a security breach is detected. A processing element can erase the memory by repeatedly writing a predetermined security pattern on all memory. A processing element can allow access to all user communication and messaging including landline and mobile calls, voice messages, email, and multimedia messaging. A processing element can determine location and context dependent receipt of calls and messages in a mobile user's environment. A processing element can provide a single access to all user communications and messaging. A processing element can receive mobile-originated phone calls with location identification in addition to caller identification information. A processing element can receive multimedia messages embedded in voice communication and messaging.

An aspect of the technique described herein includes a mobile device, that includes single telephone number associated with the mobile device is further associated with multiple mobile phone devices to receive and send voice or data calls and access the same user data. The mobile device can include additional cellular communication capability is built in various locations including a vehicle or a dwelling.

An aspect of the technique described herein includes a mobile device with a processing element that allows a user to customize interface functionality, location, look and appearance of buttons, and combinations thereof.

An aspect of the technique described herein includes a mobile device that provides a single access to all messaging, content, past statistics, present schedule, future plans and/or automated services in one screen.

One aspect of the technique introduced here is a mobile device that includes a core engine to control operation of the mobile device, and a plurality of modules coupled to the core engine, where each module is dedicated to perform a different one of a plurality of functionality classes of the mobile device, and each of the plurality of modules contains its own processing element and memory. The mobile device has user-customizable functionality according to a user's needs and/or desires. The mobile device may be in the form of a multi-function mobile electronic system with distributed memory and processing elements. Such system can include functionally distinct and independently operable intelligent sub-systems (e.g., modules) which together form a multi-functional mobile electronic system while sharing information with and/or through a master subsystem (e.g., a core engine). The sub-systems can also share a data exchange block. The sub-systems can further share tag information with and/or through the master subsystem. The system is easily extendable to add additional functionality by adding additional functionally distinct and independently operable sub-systems.

Another aspect of the technique introduced here is a mobile device with a user-customizable physical form factor. The mobile device may be in the form of multi-function mobile electronic system with distributed memory and processing elements, with the ability to attach and detach from the main system chassis (housing) at the manufacturing stage, assembly stage, post-packaging, or post-sale stage. The functionally distinct and independently operable intelligent sub-systems together form a multi-functional mobile electronic system while sharing tag information with and/or through the master subsystem via shared connectors, with applicable control signals to enable such sharing.

Another aspect of the technique introduced here is a mobile device with one or more detached intelligent displays for communication to, and/or as access to, mobile device and/or other devices. Further, a mobile device can be shared through use of such intelligent detachable displays. Independently operational small module displays can be combined to form a large display for the mobile device. The mobile device may include, or have associated with it, a plurality of independently operable display devices, which are combinable to form a single larger display device for the mobile device.

Another aspect of the technique introduced here is a time-based information system (TIBIS) with event-based storage, access and retrieval functionality, which can be used in a mobile device such as described above and/or other type of processing system. The TIBIS can include information storage and organization (i.e., a file system) that is based on time instead of file locations in a directory. Further, it can include temporary storage and organization of event, information tags, or content in user-specified or machine-defined time intervals in a short-term memory (STM). It further can include long-term or permanent storage and organization of events, information tags, or content in user-specified or machine-defined time intervals in a long-term memory (LTM). Such long-term or permanent storage and organization of event, information tags, or content may be implemented with no ability to rewrite the memory. The STM may be implemented as local non-volatile memory of the mobile device. The LTM may also be implemented as non-volatile memory, which may be local memory of the mobile device, which may be removable, or it may be remote memory on a network.

The TIBIS can include a method for capture, storage and retrieval of information in an information storage device such as a mobile electronic system based on a multi-category tagging mechanism covering temporal, geographical/location, context as well as user-defined concepts. This can involve generation, storage, distribution of multi-modal tagging of events in an electronic apparatus such as a mobile information device. It can also include a method for fast hardware-based search and retrieval of information based on the multi-modal tag system. The TIBIS provides information archiving based on time-based organization without disk fragmentation, the need for multiple backup, or the possibility of tampering with data.

One aspect of the techniques introduced here is a method of capturing and scheduling user-requested personal services via a mobile device, an electronic access device or the worldwide web.

Another aspect of the techniques introduced here is a method of automated information exchange via any common format for the purpose of scheduling individual calendar entries via a mobile device, telephone or world wide web initiated data or voice communication channel.

Another aspect of the techniques introduced here is a mobile device enabling the sharing of schedules among a set of users of services with dynamically updated timing and event information as included in a user's profile.

Another aspect of the techniques introduced here is a mobile device service enabling proactive collecting of information relevant to the user based on user input, past activity, current schedule and/or future plans.

Another aspect of the techniques introduced here is a mobile device performing security breach anticipation and a multi-level security breach handling procedure based on user location, activity, proximity, environmental and/or biological information.

Another aspect of the techniques introduced here is an operating environment for an electronic device with ability to customize user-interface functionality, location, look and appearance of buttons.

Another aspect of the techniques introduced here is an operating environment for an electronic device with of viewing and access of all communication, content and event and services at once.

Another aspect of the techniques introduced here is an operating environment for an electronic device enabling instant viewing of past statistics, present schedule and future plans.

Another aspect of the techniques introduced here is an operating environment for a mobile device with News and Alerts ticker line showing all "user-relevant" News and Alerts, continuously updated.

Another aspect of the techniques introduced here is a method of defining and viewing Alerts/News based on $, T, E (money, time, event) in a mobile device.

Another aspect of the techniques introduced here is an operating environment for a mobile device with organization of lists of groups and one-step method for contacting them.

Another aspect of the techniques introduced here is a directory for a mobile device with temporal, location and contextual data for each entry including but no limited to relationships, known since, call/message history.

Another aspect of the techniques introduced here is a method of transmitting and receiving location identification information in a mobile calling environment.

Another aspect of the techniques introduced here is a location and context dependent receipt of calls and messages in a mobile user's environment.

Another aspect of the techniques introduced here is a method of receiving calls to one phone number on multiple devices and method of receiving calls to multiple phone numbers on one device in a mobile user's environment.

BRIEF DESCRIPTION OF THE DRAWINGS

One or more embodiments of the present invention are illustrated by way of example and not limitation in the figures of the accompanying drawings, in which like references indicate similar elements and in which:

FIG. 18B illustrates one example of the directory detail;

DETAILED DESCRIPTION

Figure 1:
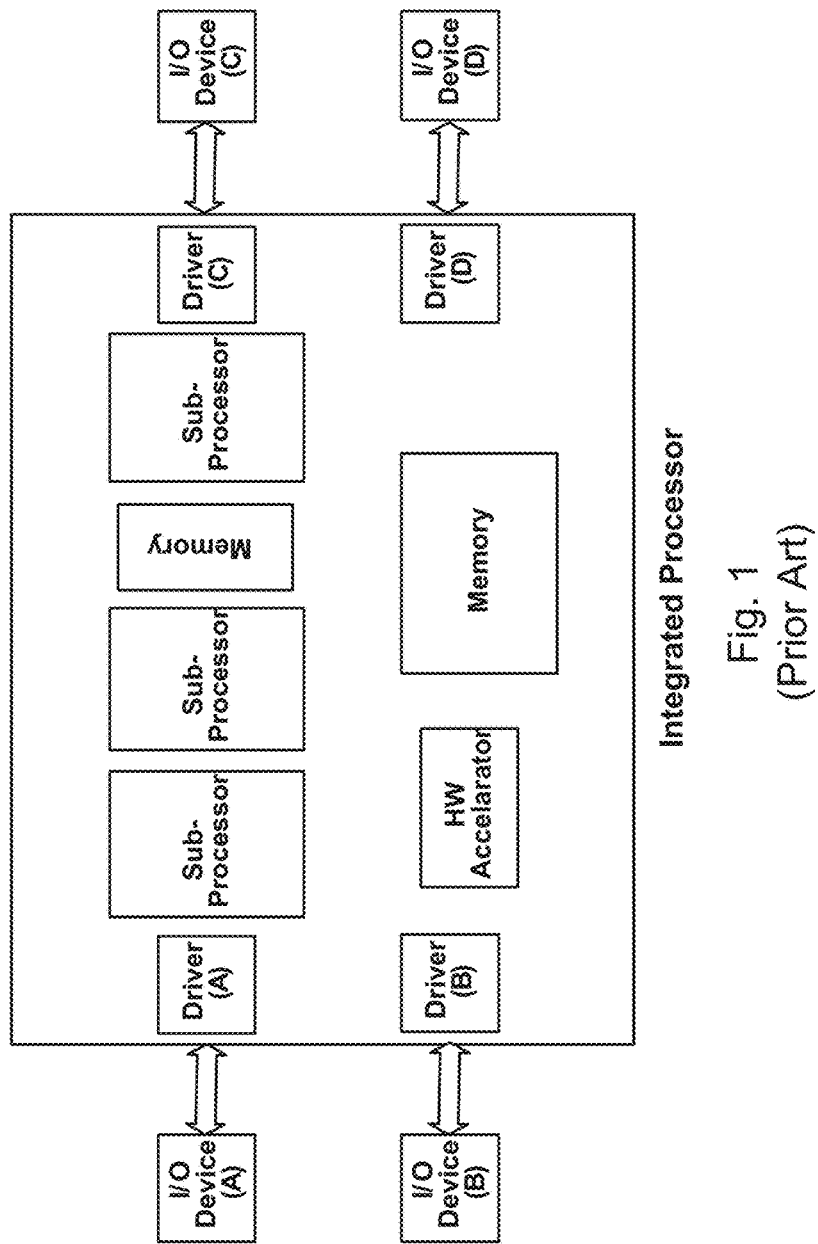
FIG. 1 is a block diagram showing the architecture of a mobile device in the prior art.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

A "mobile device", as the term is used herein, means any device that is designed to be worn by a person, carried in an article of clothing or personal accessory (e.g., a purse), or easily carried in one hand by a person. As noted above, the functionality needed by the majority of users of mobile devices does not include an arbitrarily large number of features and applications. Having the technology for massive computation assembled at many places, it is desirable to alleviate the mobile device from area- and power-consuming functionality that is available almost everywhere. In its place, it is desirable to make the mobile device perform the functions that are essential for mobility (e.g. voice, text, video capture, storage and display, etc.) in the most robust fashion.

The present invention provides a robust solution for addressing the organizational needs of mobile consumers by providing, among other things, a new customizable mobile device, optimized for mobile usage, which provides customizability and optimizes power, performance, and cost. A time-based intelligence system (TIBIS) is also introduced, which allows for robust storage, access, and processing of information on the mobile device. The techniques introduced here include an automated mobile assistant system ("active secretary") which provides proactive and anticipatory services and life-management solutions for the consumer on the go. The automated assistant system incorporates security features at the mobile device and on the server side to provide additional security and privacy for consumers. Although the customized mobile device presented is the preferred embodiment for TIBIS and the automated assistant, the inventions presented are applicable to other programmable devices such as smart phones, PDAs and other computing devices.

(1) Customizable Mobile Device (1A) Mobile Device with User-Customizable Functionality The present invention offers consumers the ability to choose the functionality and form factor they desire in a mobile device. The mobile device incorporates a number of modules. Each module is dedicated to perform a specific type of user-level functionality, such as voice communication, text, video capture, storage, display, location determination, games, etc. "User-level" functionality means functionality that is directly perceivable by a human user of the device.

The approach introduced here allows users the flexibility of using the components they need and none of the ones they do not need, allowing for customizability and reduction in cost and power dissipation.

The customized mobile platform introduced here allows people to communicate, entertain, and organize their mobile life. The mobile device uses "ultra thin client" architecture with custom-designed dedicated hardware for functions that need to be performed on the handset. The design removes the need for a multitude of programmable multi-function cores. This architecture results in high performance, fast response time, and very low-power consumption. In addition, this architecture allows users access to a rich set of customized applications based on their needs from the network, as needed.

One aspect of the customized mobile device is a modularized architecture for a mobile device ("Modularized Mobile Architecture"). The modularized nature of this architecture allows for the ability to choose the functional modules that are combined to make a mobile device. This gives the ability to exchange and upgrade the functional modules over time. For this functionality, customization and flexibility, a level of service is established with the customer (user) making the device of their choice and giving the customer the ability to upgrade easily over time. For example, one functional module may be a communication module, which can be upgraded if a faster communications technology becomes available to the user, without the need to discard the entire mobile device.

Figure 2:
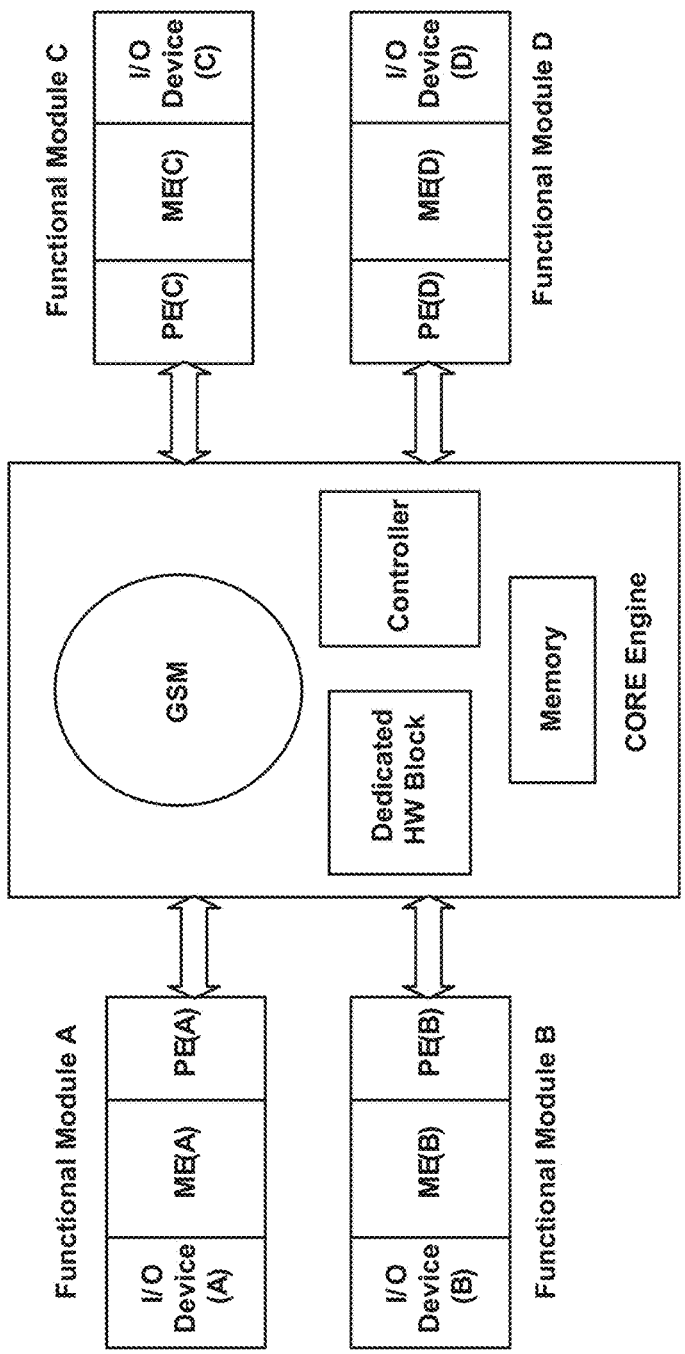
FIG. 2 is a block diagram showing an example of the architecture of a mobile device in accordance with the techniques introduced here.

FIG. 2 shows a block diagram of the Modularized Mobile Architecture according to one embodiment. The architecture separates out the functional blocks for each major device function and removes large, power consuming general purpose processors as well as the accompanying shared memory hierarchy. Each functional module has its own dedicated processing element (PE) and memory element (ME). The PE in each functional module can be, for example, a programmable microcontroller, application-specific integrated circuit (ASIC), programmable logic device (PLD), or other similar device or a combination of such devices. The ME in each functional module can be, for example, random access memory (RAM), read-only memory (ROM), flash memory, or other type of memory, or a combination of such types of memory.

The functional modules can include, for example, any one or more of: a communication module (e.g. 3G), audio module, video module, GPS module and game module. By optimizing the PE to the specific functions being performed by its functional module, it is possible to reduce the underlying area and power consumption of each functional module. Performance of each PE is better than the unified processing case with an integrated processor due to function specialization as well as the reduction in area, which facilitates timing requirements, placement and reliability of the PEs within each module. In some cases the performance and area savings are such that they could allow for choosing an older generation process technology while still maintaining the performance requirements, which results in reduced manufacturing costs and overall component cost of the device.

By providing separate memory for each functional unit, the majority of issues with memory bottleneck are eliminated. Each functional module has its own dedicated memory and MEs are not shared resources, as is the case in traditional architectures. In other words, instead of separate memories for Instruction and Data for the whole system, this architecture allows for separate memory for each application-specific area for the mobile space.

This approach has many advantages over traditional architectures. While it allows for robust information sharing mechanism among functional modules, it is possible to make improvements to the choice of technology used for the memory blocks to properly optimize for the type of data being stored in that specific memory element. Depending on the type of stored data and usage patterns, it is possible to vary the block size and read and write specifications of each memory element. The architecture preserves and enhances the functionality of each individual functional unit while allowing these units to communicate with extremely low overhead.

The core engine is an efficient hardware-optimized engine that facilitates the communication between the modules and provides the central functionality of the mobile device. The mobile device is designed to accommodate specific functionalities for the mobile environment rather than provide unlimited programmability. The significant manipulations of data that occur in the mobile device are a set of operations designed for the functionality of the device, such as the following:

CAPTURE
STORAGE
RETRIEVAL
SEARCH
DISPLAY
TRANSMIT

Figure 3:
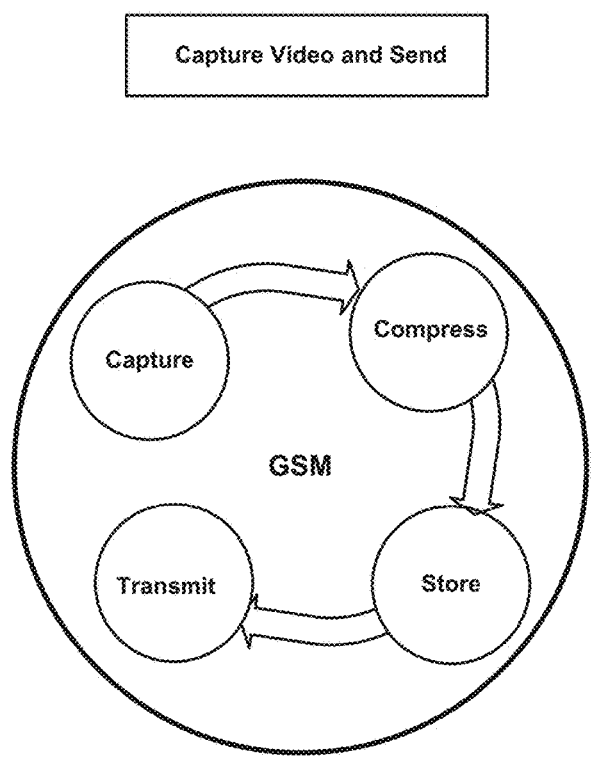
FIG. 3 illustrates an example of the operation of the giant state machine (GSM)

Making these operations extremely efficient and not allocating resources for unused functionality greatly reduces cost, increases performance and reduces power utilization. In a simplified manner, the core engine implements a Giant State Machine (GSM) which is designed to control the device functionality in very high speed in hardware. An example of such an operation is capturing an image from the camera module and sending the image out to the wireless communication module, which involves Capture, Compress, Store and Transmit operations. The GSM orchestrates these operations by generating the appropriate control signals. FIG. 3 shows the GSM operation for this example.

The Modularized Mobile Architecture allows for robust and intelligent "sharing of information" among functional modules instead of "sharing resources", and it resolves one of the major overheads associated with management of shared resource. A major part of the tasks performed by a traditional operating system (OS) is resource management and interrupt control. This allows the system to manage access to shared resources such as memory. In the Modularized Mobile Architecture introduced here, the significant computational overhead associated with a traditional OS as well as the memory requirements to store active as well as passive components of such OS is eliminated.

The memory architecture is designed so that a small portion of the memory contents in each functional module, namely a set of extracted and stored "tags", are communicated to the core engine and to other functional modules as needed (the memory architecture is described below in relation to TIBIS). As a result, a very robust interface is developed between the Core Engine and each functional module.

Figure 4:
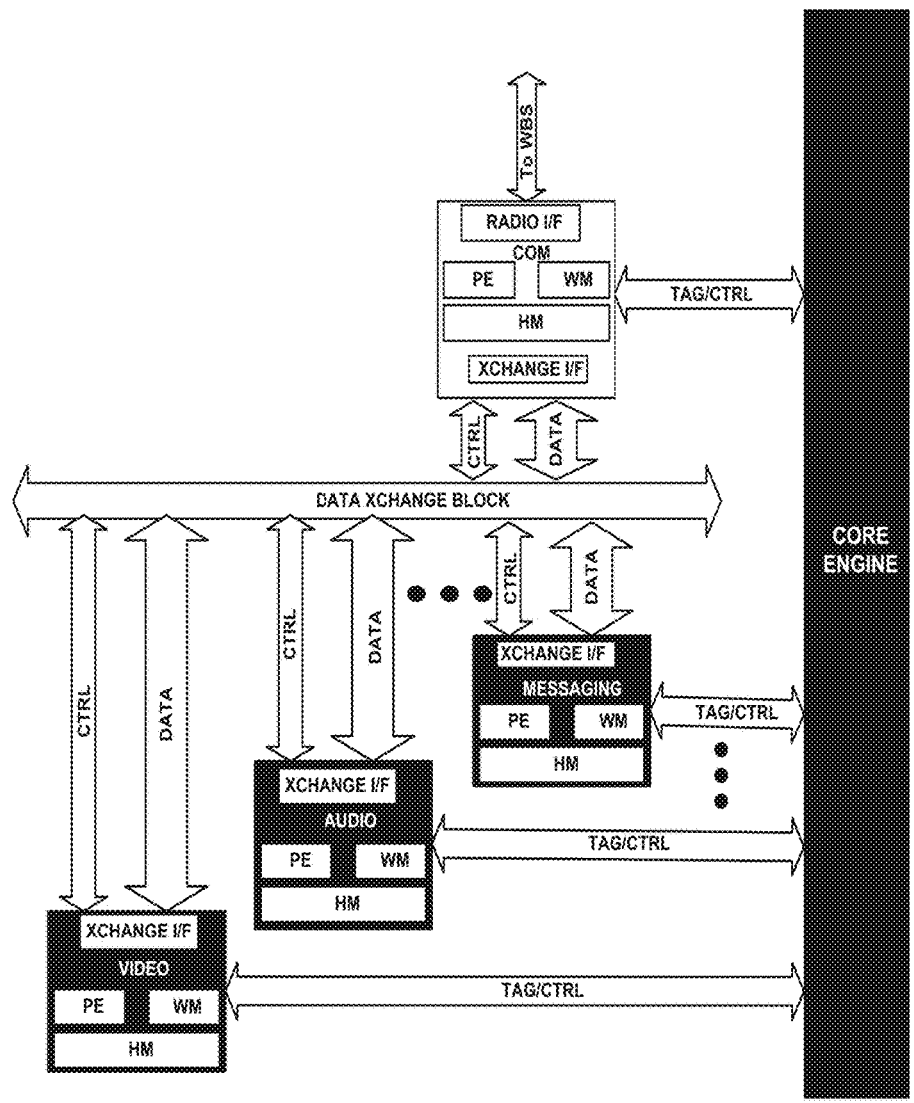
FIG. 4 illustrates the data flow between various functional modules and the core engine in a mobile device.

FIG. 4 illustrates the data flow between various functional modules and the core engine in a mobile device, according to one embodiment. The ME in each functional module is divided between working memory (WM) and Horizontal Repository Memory (HM). WM is preferably a form of RAM, while HM is preferably a form of nonvolatile memory, such as flash memory. Each functional module communicates directly with the core engine, and the core engine orchestrates any required interaction between functional modules. The core engine also generates the required controls and master permissions for module designation for transmit and receive on the data exchange block. The data exchange block is a bus designed for fast, efficient transfer of data among modules as necessary. An exchange interface unit is included in each functional module to allow for this robust communication. The bit width, impedance, signal integrity and data transfer rates are optimized for a given cost model, performance requirement, and available connector technology.

In one embodiment, programmable elements are included in the exchange interface unit in each module to allow for flexibility in the design. This programmability allows the signaling parameters to be adjusted depending on the requirements for the best available technology. For example, it allows for sufficient buffering of data for proper assembly and disassembly and timing of data to match the best available signaling for the data exchange block. In one embodiment, data exchange block and the core functionality of the core engine are combined to form a separate device where individual mobile devices via appropriate connectors connect to the device and can share, download and upload information to perform a version of the functionalities described herein. The mobile devices can use compatible connectors to the device or they can use standard connectors such as USB or other appropriate connectors and the device includes the converter circuitry to connect to the data exchange block.

While the individual memory blocks shown in FIG. 4 can be physically separate memory devices, this is not a requirement, and the memory units can all or partly reside on the same physical memory device; however, each memory block is distinctly assigned to a functional module, hence, there is no sharing of the same block of memory. Each functional module may contain one or more HM units depending on the functionality the module encompasses. These HM blocks can also reside in physically distinct memory blocks or segregated memory blocks within the same physical memory. Initially the memory units are assigned based on the application as well as user requirements. Memory can be dynamically re-allocated based on user or system requirements. For example, when a functional module is not being used, the associated memory can be allocated to other modules, or if a functional module has a need for expanded memory usage and there is unused memory assigned to other functional modules, it can be re-allocated. In addition, the modular architecture allows for the ability to upgrade the memory for each functional module as needed.

(1B) Mobile Device with User Customizable Physical Form Factor

The mobile device architecture introduced above can integrate various electronic modules into a single customized device. The Modularized Mobile Architecture allows for customization of device functionality based on user preferences. This customization can occur at any of several levels:

1. The modularized architecture can be applied to the design of the mobile device at the chip level. Each functional block is optimized and the chosen modules are all implemented on one chip. This allows for customization at the chip level and results in highest performance but least flexibility.
2. The choice of modules can be made at the package level, where selected functional modules fabricated on small micro-boards are assembled to produce the device. Alternatively, advanced packaging techniques are used to integrate each functional module on a single package (e.g. multi-chip-module, ball-grid-array (BGA) package, etc.). Selected functional modules are assembled to build the customized mobile device. This level of customization is done at the factory and offers customization to the user without altering the manufacturing process. In this implementation, the device is customizable by the user at purchase order time and the modularity of the design is exploited at the factory to provide the user the customized solution desired; however, the device is not physically detachable by the user, so its flexibility is limited since the user can not reconfigure the device after delivery.
3. The third method of delivering customization is the most flexible. In this approach, the functional modules and the mobile device core housing are delivered to the user and the user can attach or detach some of the modules at the point of use. This allows for the customization to occur both at the functional level as well as the physical level and offers the most flexible option.

The customized mobile device allows users the flexibility of using the components they need and none of the ones they do not need, by allowing for the integration of a variety of modules that perform communication, computing, and a variety of input and output functions. This can result in lower cost and power dissipation. It can provide freedom from the choice of service provider by allowing the user to keep desired electronic components as well as stored information while having the freedom to change service provider (i.e., to change the communication module). It also removes the requirement of building multiple standard radio devices on the same mobile device (e.g. cellular, WiFi, Bluetooth); only radios that the user plans to use are added. It also provides an easy upgrade path for the components that the user desires with new nodes of technology without the need to replace the entire device.

Each module can be a functional module that is operable only within a mobile device, or it can be an independently (individually) operable component. Independently operable components have some level of user interface as needed by that module and can be used on their own. When a module is inserted into the mobile device, it has access to an expanded set of functionality for storage, display, I/O and communication facilities. While some modules can communicate directly (e.g., the audio module can be directly connected to the communication module), the modules are typically connected to the core engine on the mobile device for control and information sharing.

Figure 5A:
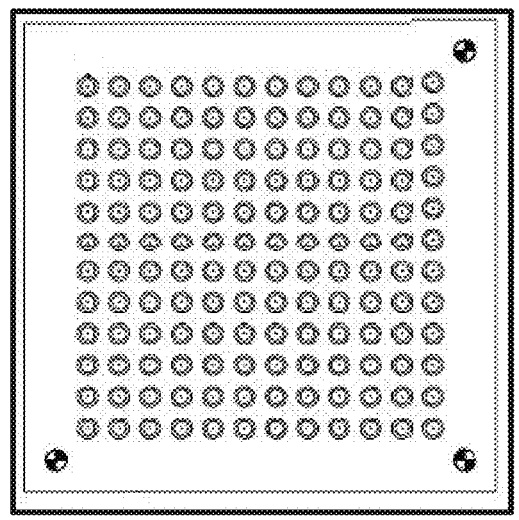
FIG. 5A shows a functional module in a micro-BGA package, such as may be associated with one embodiment.
Figure 5B:
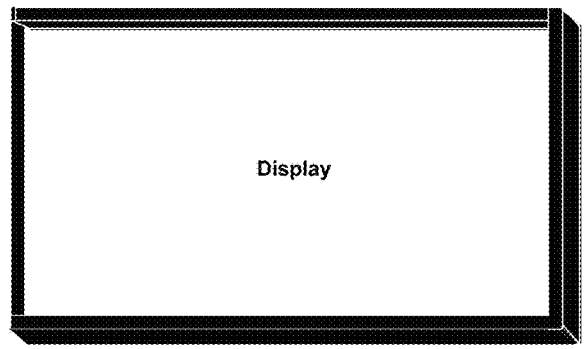
FIG. 5B shows an example of the display of a mobile device such as may be used in conjunction with the functional module in FIG. 5A.
Figure 5C:
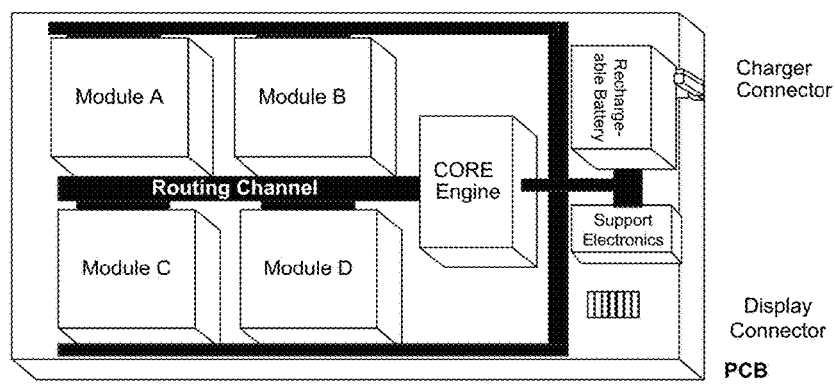
FIG. 5C shows an example of a circuit board on which are mounted various functional modules and a core engine.
Figure 5D:
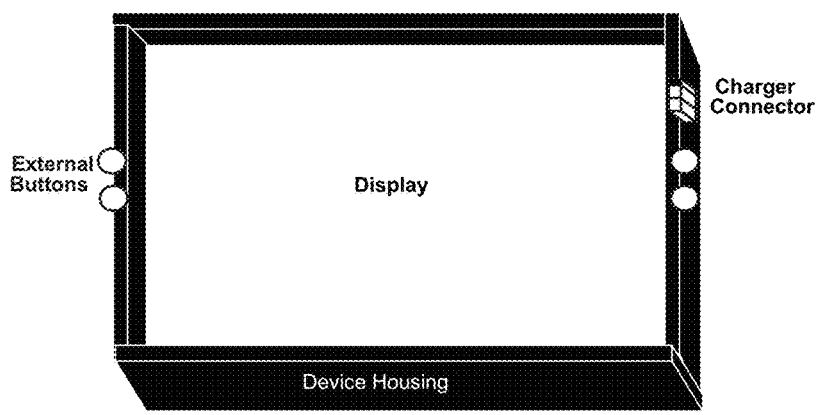
FIG. 5D shows an example of an external view of the assembled mobile device, according to the embodiment of FIGS. 5A through 5C.
Figure 6A:
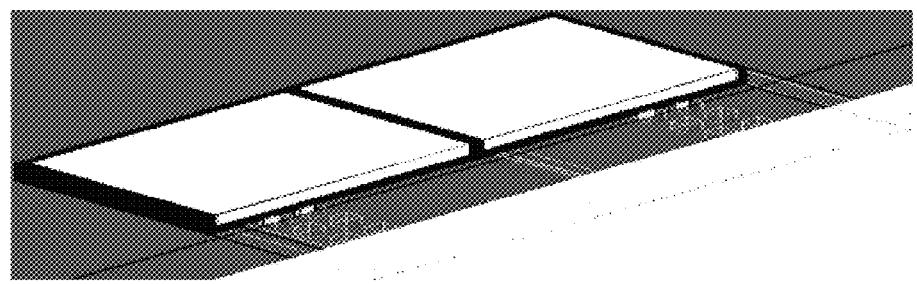
FIGS. 6A and 6B show embodiments of functional modules connecting to a circuit board at the factory.
Figure 6B:
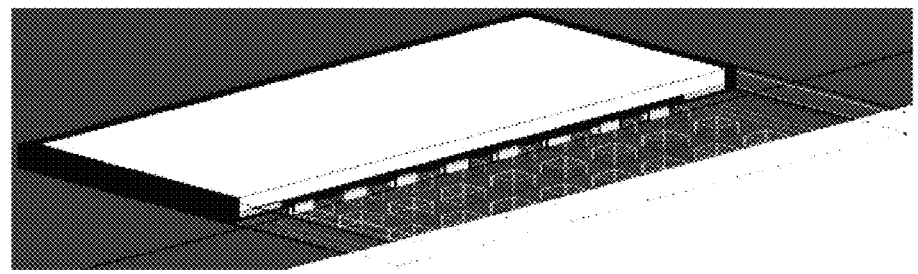
Figure 7A:
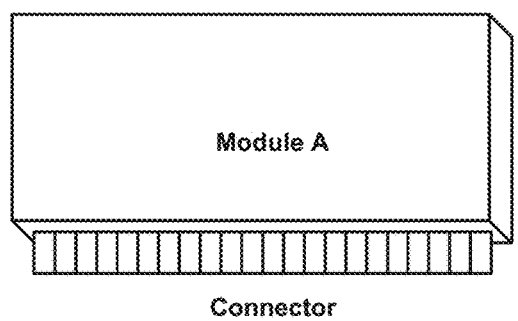
FIG. 7A shows a functional module in detachable form, such as may be associated with another embodiment.
Figure 7B:
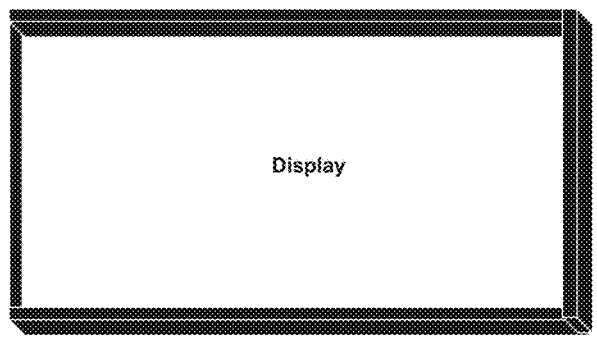
FIG. 7B shows a display device that may be used in conjunction with the functional modules in FIG. 7A.
Figure 7C:
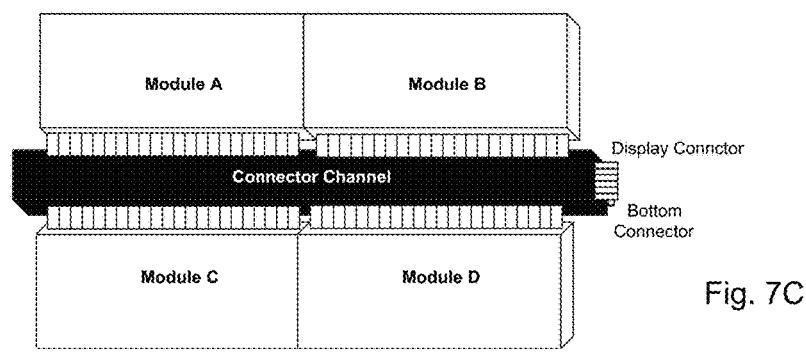
FIG. 7C shows multiple detachable functional modules connected to a connector channel.
Figure 7D:
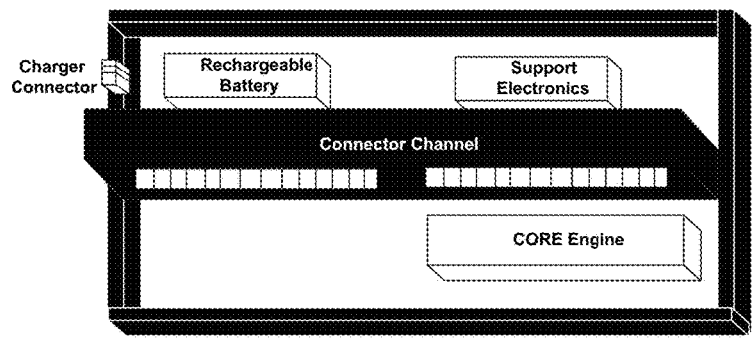
FIG. 7D shows a core engine and other components of the mobile device connected to a circuit board.
Figure 7E:
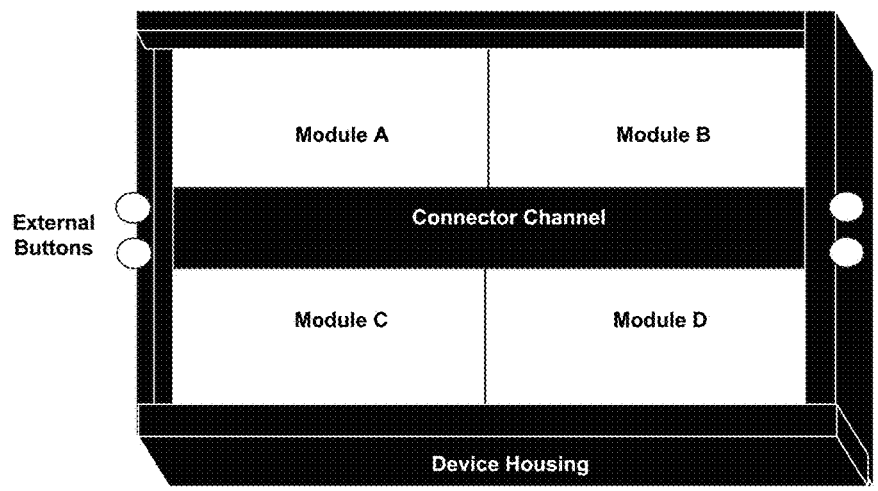
FIG. 7E shows the functional modules and connector channel of FIG. 7C mounted within a device housing.
Figure 7F:
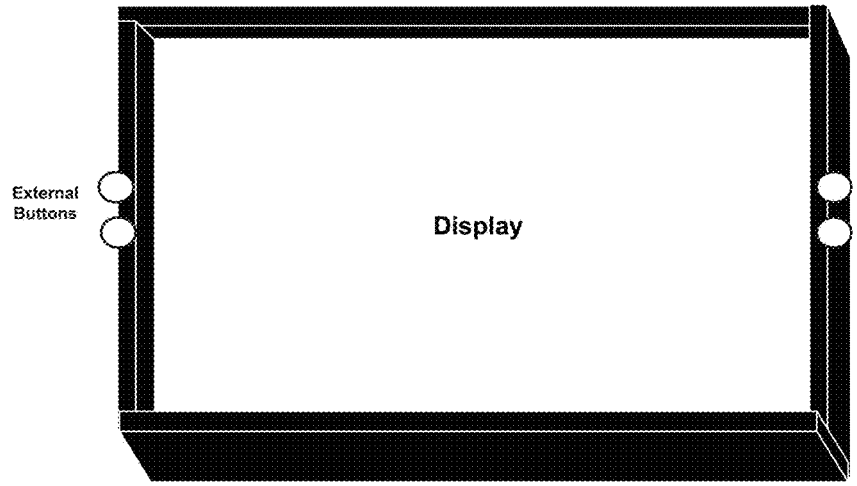
FIG. 7F shows an example of an external view of the assembled mobile device, according to the embodiment of FIGS. 7A through 7E.

FIGS. 5A through 5D show an embodiment of a mobile device which has functional modules integrated at packaging level. Each functional module is integrated in a micro-ball grid array (BGA) package. FIG. 5A shows a functional module in a micro-BGA package. The functional modules and the core engine are integrated on a printed circuit board (PCB). FIG. 5C shows an example of a PCB on which are mounted various functional modules and the core engine. The interconnections are made through the routing channels on the PCB. The PCB is then encased inside the mobile device housing. The display is placed on top surface of the device and attached to the PCB through the display connector. FIG. 5B shows an example of the display of the mobile device such as may be used in conjunction with the functional module in FIG. 5A. FIG. 5D shows an example of an external view of the assembled mobile device. FIGS. 6A and 6B show embodiments of functional modules connecting to a PCB at the factory.

FIG. 7 shows another embodiment of a customized mobile device, which has detachable functional modules. FIG. 7A shows a detachable functional module. In this embodiment, the functional modules do not have individual displays. Four modules are connected to the device through the connector channel placed at the center of the device. FIG. 7C shows multiple detachable functional modules connected to a connector channel. The core engine is placed on a PCB at the bottom of the device and is connected to the modules through the connector at the bottom of the connection channel. FIG. 7D shows a core engine and other components of the mobile device connected to a circuit board. The modules, connector channel, and PCB are housed inside the mobile device housing. An LCD display is placed on top of the device. FIG. 7B shows a display device that may be used in conjunction with the functional modules in FIG. 7A. FIG. 7E shows the functional modules and connector channel of FIG. 7C mounted within the device housing. FIG. 7F shows an example of an external view of the assembled mobile device.

FIG. 8 shows another embodiment of the customized mobile device with detachable components. In this embodiment, each of the functional modules has its own individual display device. The modules are slipped into the mobile device housing and connect to the connection channel as described above. On top of the mobile device, there is an opening in the top surface of the housing for the display units. These modules are independently operable and each module uses its own small display in the stand-alone mode of operation. The core engine keeps track of the modules that are connected and sends the appropriate control signals to the circuitry for resizing the image appropriately. Once the modules are connected to the mobile device, the core engine recognizes the individual display units that are connected to the device and resizes the screen so the mobile device has a single large display.

Figure 8A:
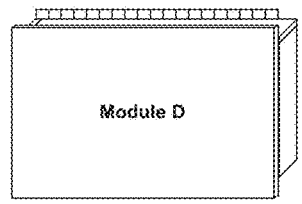
FIG. 8A shows an independently operable functional module with its own display, in detachable form.
Figure 8B:
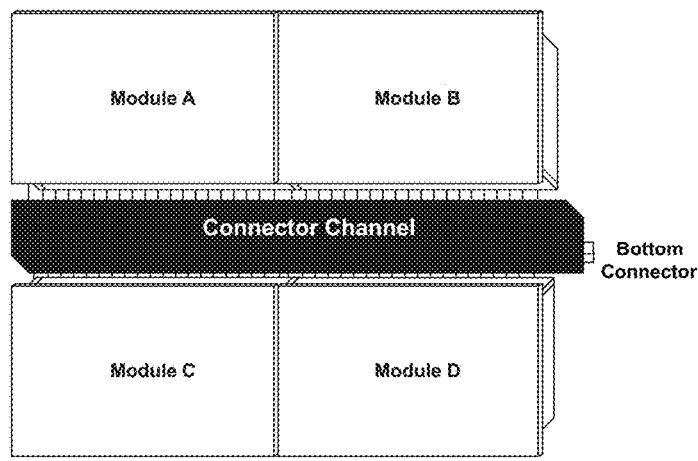
FIG. 8B shows multiple functional modules such as shown in FIG. 8A, connected to a connector channel.
Figure 8C:
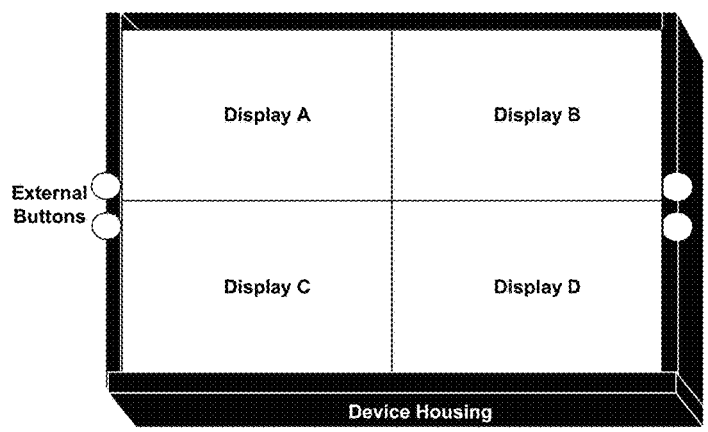
FIG. 8C shows an example of an exterior view of a mobile device which has multiple functional modules such as shown in FIG. 8A, each with its own display, which collectively can be operated as a single larger display.

FIG. 8A shows a detachable, independently-operable functional module with its own display. FIG. 8B shows multiple functional modules such as shown in FIG. 8A, connected to a connector channel. FIG. 8C shows an example of an exterior view of the mobile device which has multiple functional modules such as shown in FIG. 8A, where the individual display devices of the functional modules collectively can be operated as a single larger display.

All of the functional modules can be powered from the power supply of the mobile device. An independently operable module also has its own on-board battery which is recharged when the module is connected to the main unit.

The module connectors are designed to facilitate the connection between the functional modules and the core engine through the data exchange block. In the modularized architecture of the design, the data is exchanged between modules under the control of the core engine. The size and characteristics of the data buses from different modules may be different. Instead of designing a custom connector for each module, a unified connector is designed to support all available modules in a particular configuration. The choice of connector depends on the form factor and bus speed. One option is a high-speed serial bus with a small footprint. Another option is a parallel bus for ease of signal routing. In one embodiment, a custom low-profile, parallel edge connector is used. This gives the flexibility of supporting a large number of modules with varying bus sizes and facilitates interconnection between the modules and the main core. Data at the I/O interface of each module is assembled or disassembled to match the connector's data bit width and timing. The core engine facilitates the data exchange between the modules through appropriate control signals.

In addition to module choice, the user has the choice of device shape, size, and configuration. The device can have a variety of shapes, such as square or rectangular, round, or cylindrical. Modules can be assembled in any of a variety of ways, such as connecting sideways to another module or vertically as stackable disks.

Figure 9:
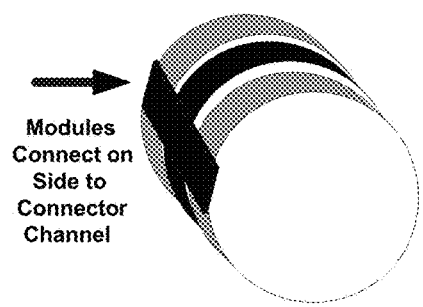
FIG. 9 shows a cylindrical mobile device with additional modules as stackable disks.

FIG. 9 shows an embodiment of a cylindrical mobile device with functional modules connected in a stackable configuration. In the stackable configuration, modules connect on the side to each other through the connection channel in the device housing. In another embodiment, the connections between the stackable modules can be on top and bottom of modules. The connectors are retracted mechanically before a module is connected or disconnected from the device. Modules can connect together directly as well as modules dropping into a device housing/carrier/chassis.

Figure 10:
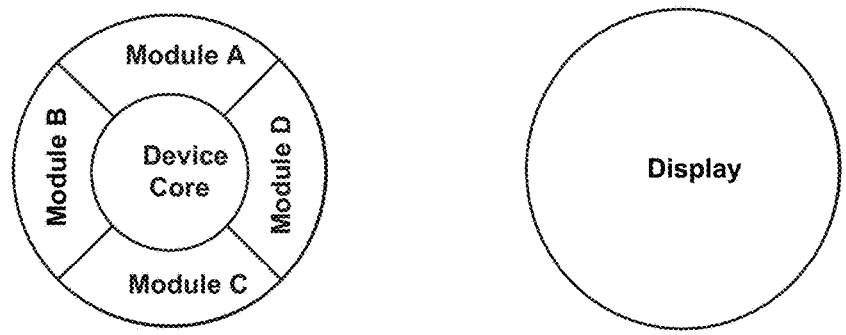
FIG. 10 shows a radial module configuration device with a central core and housing for additional modules around the core.

Other arrangements of modules are dictated by the desired industrial design of the mobile device. FIG. 10 shows a round device with a central core and housing for additional modules around the core. In this case, the modules are inserted inside the device housing and any unused module is left with an empty housing to preserve the overall look of the device.

The user also has the additional choice of having the assembled mobile device in a wrist-top configuration (worn as a watch), a clip-on configuration where it is worn on a belt or armband, a pendant configuration, as an ear-top device or a hand-held device.

Figure 11A:
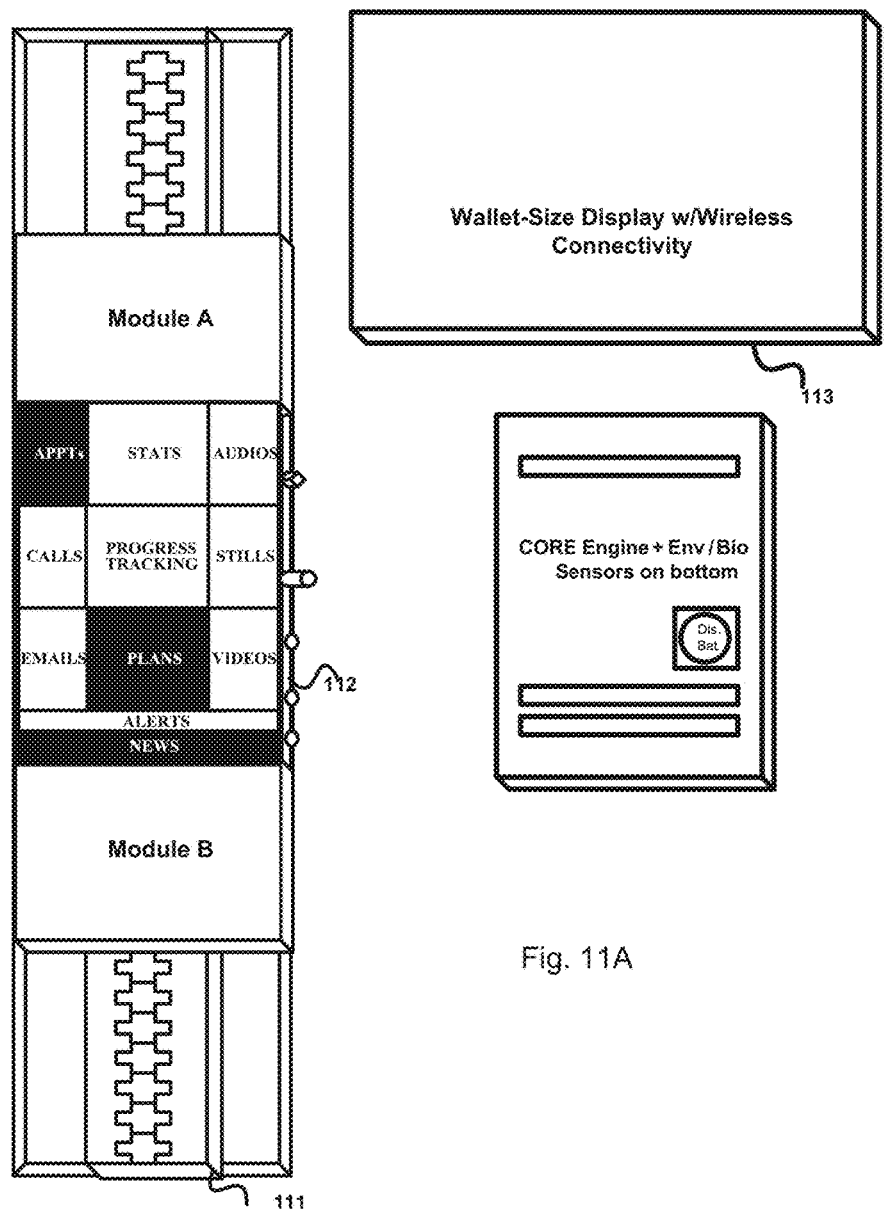
FIG. 11A shows a wrist-top mobile device with an additional detached display unit.

In one wrist-top configuration, such as shown in FIG. 11A, when a phone call is initiated or received, the unit slides out of the wristband 111 and the user holds the device to the ear. Alternatively, the unit includes an optional small pull-out microphone/speaker unit used during calls to keep phone calls private. FIG. 11A shows a wrist-top mobile device, with an example of different types of information/functions shown on the display 112 (e.g., "STATS", "CALLS", "EMAILS", "AUDIOS", "STILLS", "VIDEOS", "PROCESS TRACKING", "PLANS", etc.) The core engine plus environmental sensors and/or biosensors are located on the bottom of the mobile device. In this embodiment, the device has a small disposable battery which is primarily used in an emergency to power the communication module when the main battery is discharged.

In addition to modules that support common mobile functionality such as audio/video modules, GPS and games, the invention introduced here also supports other consumer electronics device functionalities that can be added over time, such as biosensors, health monitoring devices, environmental sensors, etc. The Modularized Mobile Architecture allows for the functionality of the modules to be developed and optimized independently and can easily integrate essentially any module by modifying the interface to fit the mobile device interface. As a result, the functionality of the device can be extended over time as new modules are added to the device.

While many detachable modules can be independently operable, that is not a requirement. For example, a single memory or display module may not be operable on its own, and there are modules that are supporting accessory hardware for another module. A "super module" can incorporate a number of module functions that are commonly used together.

In one embodiment, the MEs of each individual functional unit are removable and swappable. This allows for quick and fast transfer and sharing of data among devices, as well as quick personal security and backup feature.

Modules in detached mode which are connected to a communications module can be reconfigured over-the-air to support an array of functions in the stand-alone mode. This can be achieved through the use of field programmable logic as well as registers which can be updated remotely to allow for modified mode of operation of the module in a power efficient manner.

(1C) Detached Intelligent Display

Mobile devices are faced with a continuous need for larger display sizes for certain applications, such as viewing of photos, videos, surfing the web, etc. The large size of the display adds significantly to the size, power dissipation and cost of the mobile device. However, in most applications there is not a continuous need for a large display, such that the associated additional weight, size, and power dissipation are unnecessary. The technique introduced here overcomes this barrier by separating the requirements of the device from those of the display unit.

In this technique, the mobile device has a very small display or no display at all. This is the normal mode of operation, generally the mobile mode of operation. As a result, the mobile device is small and has low power dissipation. A group of larger displays are designed and made available to the user upon request. These displays vary in features such as size and display resolution. The initial display design is the size of a business card to be carried in a wallet and used in a similar manner. This display size is adequate for a large number of users in a mobile environment. This detached display can be connected to the mobile device via direct wire connection or via wireless link. FIG. 11A shows a wrist-top mobile device with a small onboard display with an additional detached wallet-sized display unit 113.

Another size display is a letter size display, which can be carried in the user's briefcase among other paperwork and file folders. When a need for such a display arises, such as for editing, viewing documents, photos or videos or presenting such material to a larger group, the letter size is the more appropriate usage model. As in the case of the wallet size display, the connection mechanism is established either via wires or wirelessly depending on the customer's selection at the time of ordering.

In the wireless mode, the display is turned on and is held by the user for viewing, totally detached from the unit. The mobile unit stays nearby, for example in a pocket, purse, or worn on the wrist. The user only holds up the display, which is smaller and less bulky, while having access to all the functionality of the mobile device.

The display is powered by its own rechargeable battery which is recharged with the mobile unit. The display is able to draw power from the handheld device through a wired connection. This is also the mode of operation if the display does not have its own battery (e.g., ultra-light model). In cases where the display unit has a charged up battery but the mobile device is low on battery charge, the mobile device can draw power from the display unit.

Since the display unit is totally separate from the mobile device, with appropriate security measures the user has the possibility to use any appropriate display units other than his own. This means that if for any reason the user does not have access to his display unit, the user can borrow, purchase or rent another display unit.

Data entry on the mobile device is accomplished through any of several methods, such as through a soft keyboard on a touch-screen display, a small physical keyboard that is stored in the wallet, which can also be attached to the display or other mechanisms such as motion or gesture input capability built into the display unit. In one embodiment, the display unit also incorporates other I/O functionality such as a microphone or speaker.

Figure 11B:
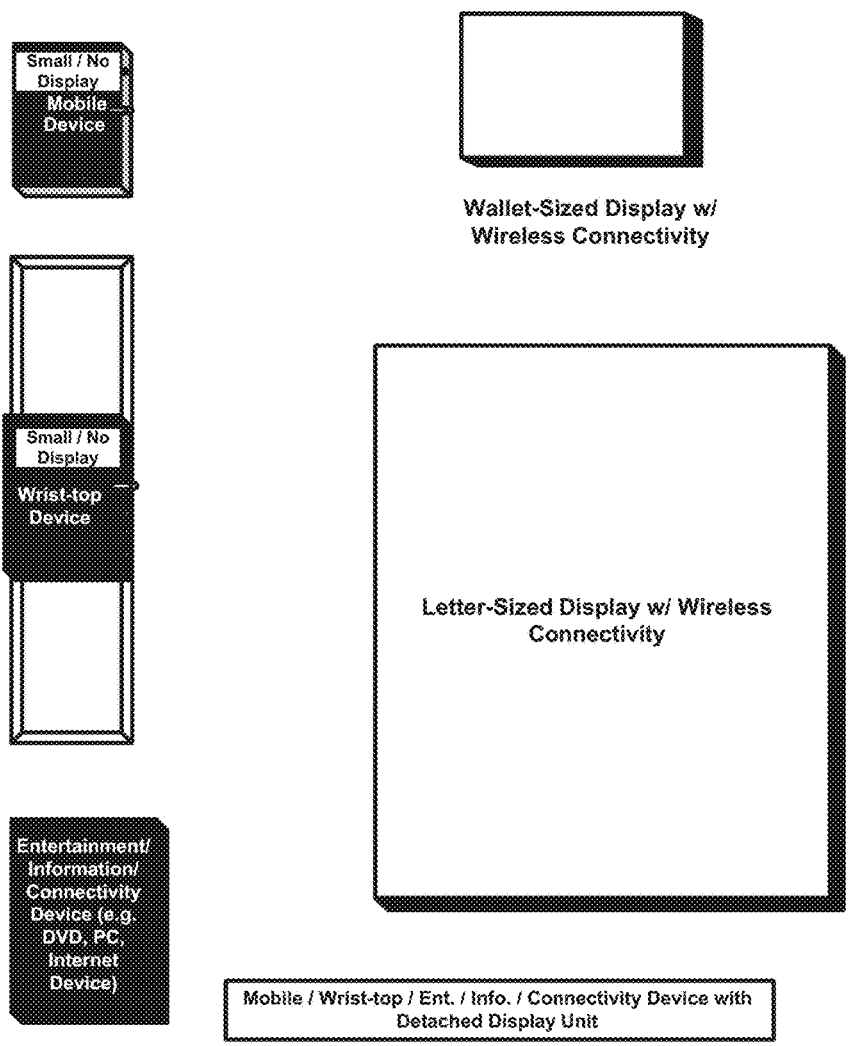
FIG. 11B shows a mobile, wrist-top, entertainment, Information connectivity device such as a DVD player, PC or internet gateway with detached display units.

In addition to mobile devices, the display can be used with any other electronic equipment, such as a DVD or game player which is equipped with the proper communication technology. In this scenario (FIG. 11B), the user can connect to any entertainment/information connectivity device such as a DVD player, a PC, or internet gateway, etc., and with proper authorization, can access and view the information/content on the display. In the wireless connectivity embodiment, the display unit includes a wireless receiver or transceiver. If the display unit is used only as a display device, only a receiver is used otherwise a wireless transceiver is employed. The choice of wireless technology depends on the required bandwidth, range, and the particular application. For most applications which require video transmission at short distances, a high bandwidth, short-range technology such as ultra-wideband is used. The wireless transceiver unit can be a customized design optimized for connectivity to a particular mobile device or a (detachable) standards-based wireless communication module for connectivity through a local or wide-area network.

Figure 11C:
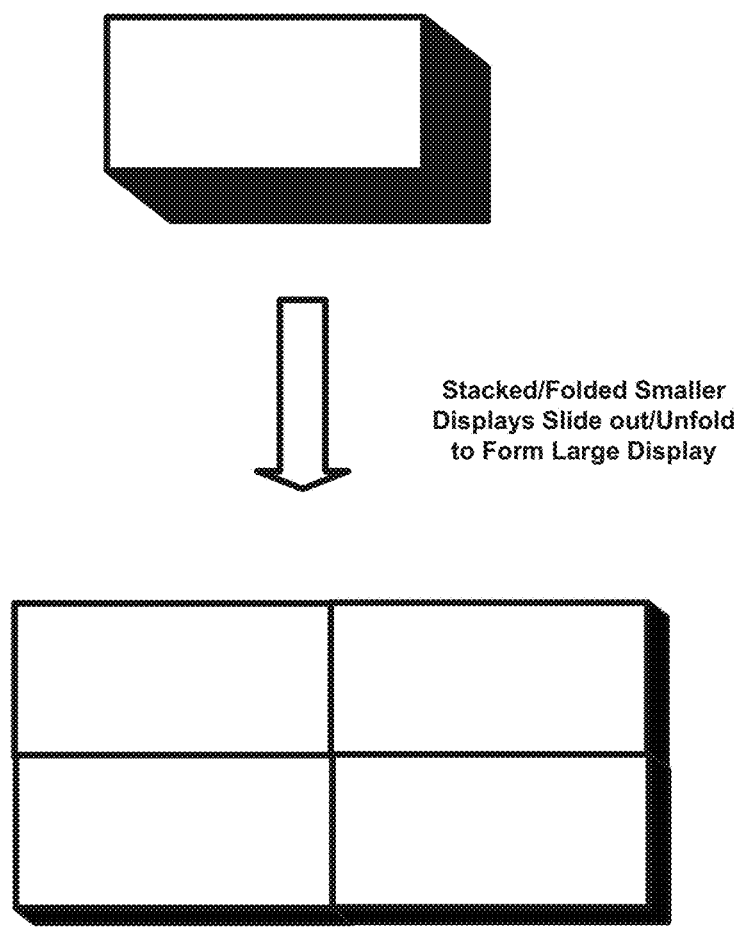
FIG. 11C shows smaller stacked units slide out (or unfold) and connect together to form a larger display.

In one embodiment, several small display units are stacked up (or folded) and only one display unit (e.g. the one on top) is active. When a larger display is needed, the smaller stacked units slide out (or unfold) and connect together to form a larger display (FIG. 11C.) Alternatively, additional small displays can be attached to an existing smaller display to form a single larger display. The device recognizes the addition of display modules and resizes the image to fit the larger aggregate display.

Figure 11D:
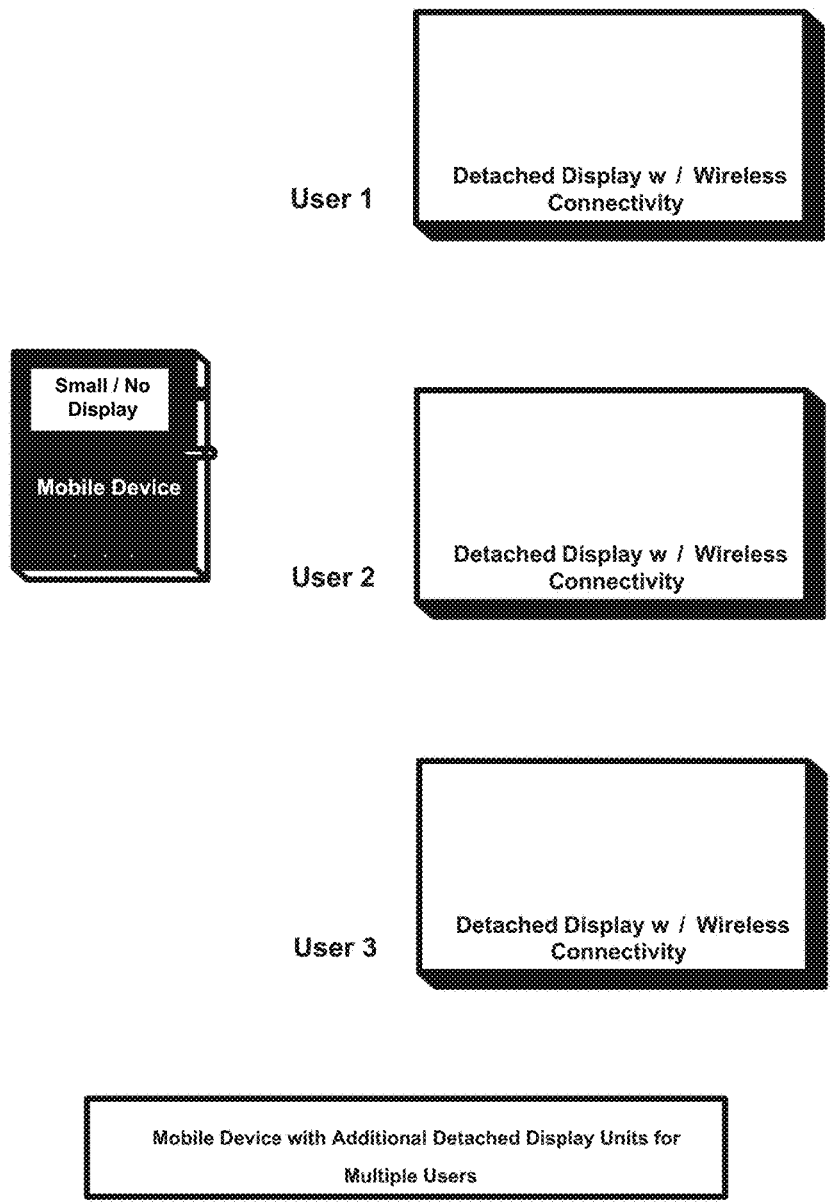
FIG. 11D shows mobile device with multiple detached display units, providing access to multiple users on a single device.

The detached display allows for a new usage model for sharing of information/shared viewing of content (FIG. 11D.) Multiple display units can be provided to users so they can access the information/content on a single device. Security measures allow for authentication of the display units which connect to the device. In addition to point-to-point connectivity, multi-cast connectivity can allow users to access the information on the device. The mobile device allows multiple detached displays to connect to the device at different access levels. Upon sensing the presence of the main access device and attempting to connect to the device, the main unit verifies the permissions of the display device and if access is granted, the display unit is registered on the main device and is configured with the proper access level. In one embodiment, the main unit acts as a broadcast unit and sends the same information to all display units—an example would be in a class demonstration or conference setting. In another embodiment, each display unit has individual access to send and receive information independently. The system allows for the individual display units to act as separate application windows on the mobile device (with proper security features which control guest access). As a result, each display unit can allow the user to independently access authorized services, such as web access, etc. This allows multiple users connectivity and content access without the need for individual devices. In such aforementioned embodiments, the display comes in detached form from the main unit. Some of the variations described herein are designed to be implemented post-fabrication and pre-final assembly and delivery to customer, through the use of programmable logic, allowing customization at reduced cost and time to market. This technology provides a robust solution to applications such as multiplayer gaming, presentations in classroom or conference settings, on-the spot access to mobile services, etc.

(2) Time-Based Information System (TIBIS)

The techniques introduced here include TIBIS, a time-based information system of data organization. TIBIS is particularly suited to implementation in a mobile device such as described above, while it is not limited to a mobile environment. Although the sophistication of file systems and their many different formats have continued to grow, the fundamental design element for these systems remain packing the most amount of information in the least amount of space and facilitate access to the information while providing data integrity based on the underlying memory hierarchy of the system. Available storage systems lack a higher level of awareness and intelligence, which is particularly evident in mobile device usage scenarios.

While content and general-purpose programming/flexibility for applications remains of primary concern in a PC environment, in a mobile environment the primary factor is time. People typically use mobile devices to have access to information on-the-go and to save time. Features of TIBIS allow a hardware and software environment to provide robust storage, integration, recognition, organization, recall and display of time-based activities and events in a user-customizable format.

Currently, most data is stored in electronic form in files. These files are organized in various directories or folders based on the type of file or the relationship of the content of files. The files have a time stamp associated with them. Other than looking up the time stamp when one looks at a file, the only other thing one can do with the time stamp is to sort the files based on time in a given folder or directory.

In addition, files are randomly written in different areas of memory. When a file is deleted, an area in memory becomes available where the file was written before. As more and more files are deleted, more area opens up in memory, but the open (free) areas are not contiguous. This results in fragmentation of data in memory.

With TIBIS, all files are organized based on time, with the granularity of time determined by the user. The user has control over periodic storing of specific information. Activities, multimedia files, etc. are organized in a time snap-shot. As new pieces of information are received or generated, they are written sequentially in memory. This requires a large amount of memory over time. TIBIS provides a way to ease the requirements on the size of memory and store only information that the user will need in the long-term, while allowing the user to continue to have a snap-shot of relevant information.

(2A) Memory Architecture

Figure 12:
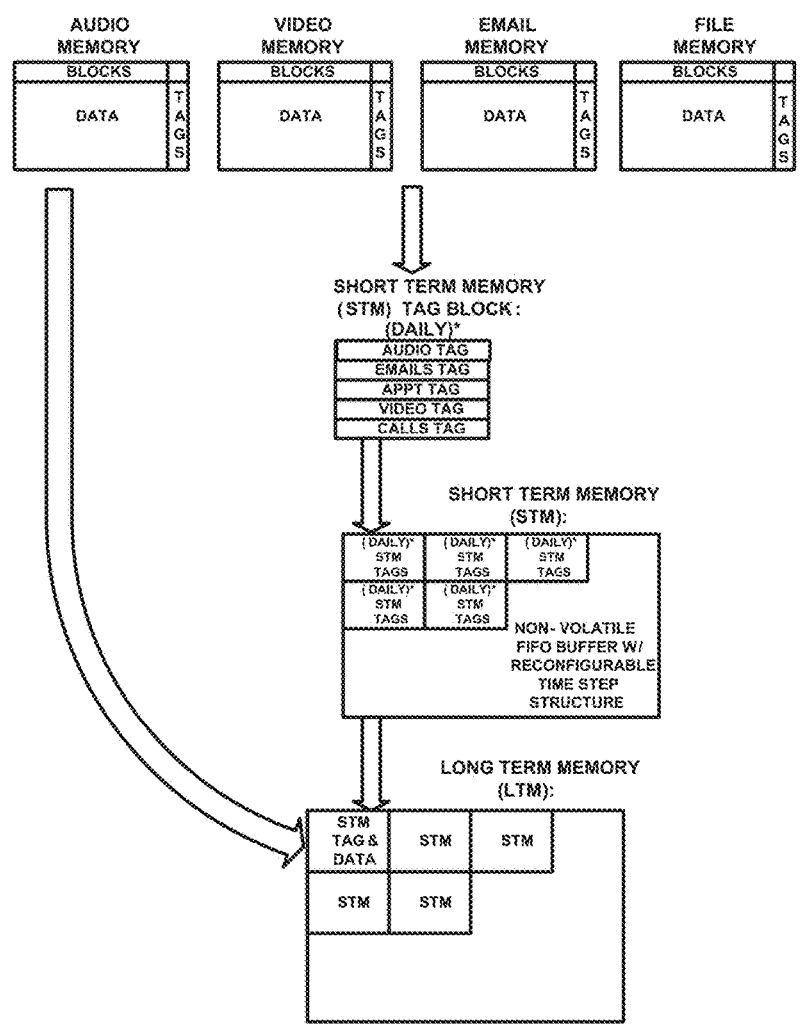
FIG. 12 is block diagram illustrating the Horizontal Repository Architecture.

FIG. 12 shows an embodiment of the Horizontal Repository Architecture (HM) of TIBIS. Each functional module (e.g., audio, video, etc.) of the mobile device (or other type of processing system implementing TIBIS) has its own separate memory. Each stored content item has a multi-modal tag which includes pertinent information (metadata) for that item, which is stored along with the item in a repository.

In implementing this unique storage and retrieval technology, HM units for each device are provided to match the device's storage and access requirements. This means that individual functions' memory can be changed over time, and different or same memory technologies may be used for different types of data storage and access requirements.

Figure 13:
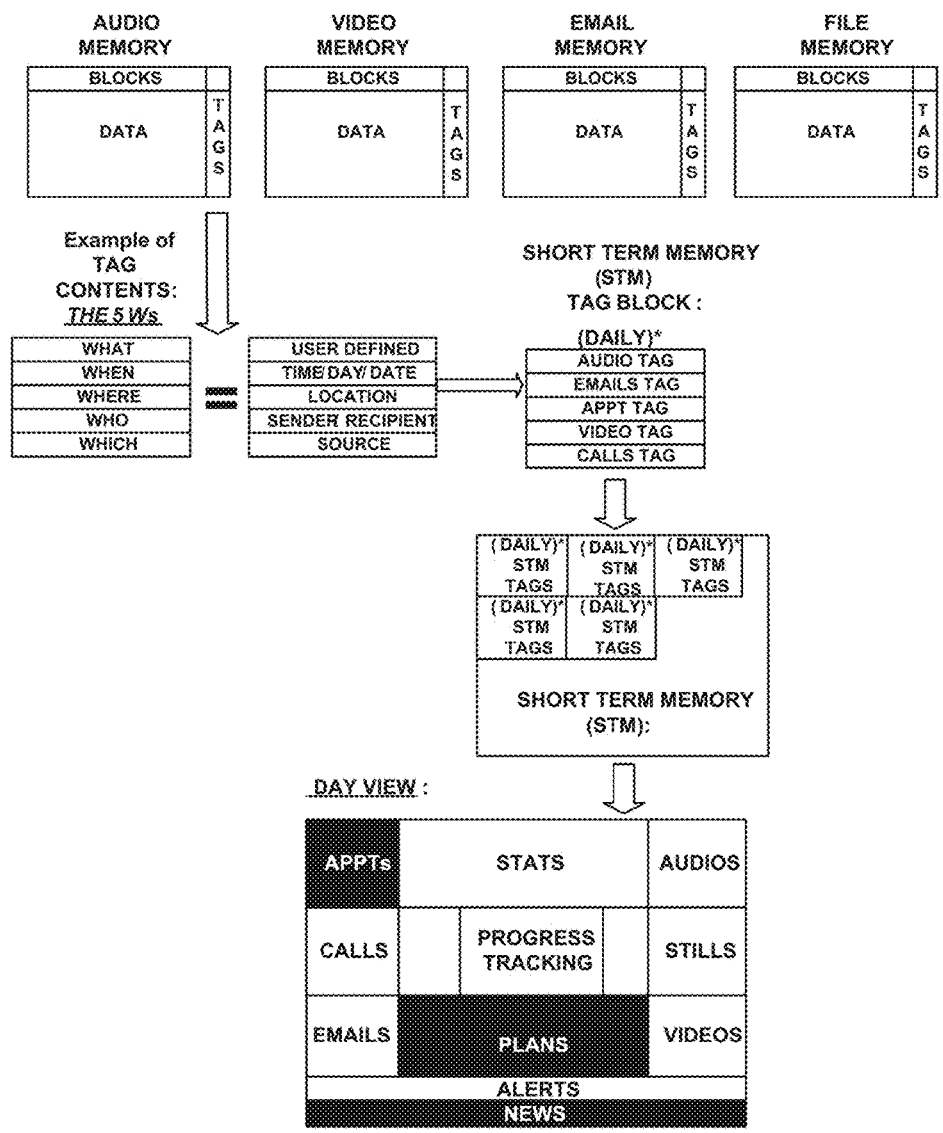
FIG. 13 shows an example of the generation and processing of tags in the time-based memory organization.

In addition to providing distinct and in some cases detachable, removable, expandable HM memory units, each stored item such as data, music, still photo or video is stored with a particular tag structure. FIG. 13 shows the generation and processing of tags in the time-based memory organization. Each tag is added to the actual stored element in a predetermined set of extended locations. A tag typically includes metadata that answers one or more of the five questions (5Ws): "what" (can be user-defined), "when" (e.g. time/day/date), "where" (e.g. location of the device), "who" (e.g. sender and/or recipient of a message) and "which" (e.g. source). Each function of the device (e.g., audio, video, etc.) generates its own type of tag. Note that there can be more tag categories than the above suggested five for certain applications. These tags can be based on information type, user selection, user activity, and usage model.

An example of a simplified tag generation scheme is as follows: Upon taking a photograph with the still camera module, the location coordinates are retrieved automatically via the on-board GPS module or other location determining mechanism. This information is then cross-referenced against the personal address space of the user as well as the calendar information to determine the exact location where the user is likely to be. This can be further clarified by posing a question to the user for a final clarification. The "actual" verified location is then part of the tag associated with the photograph. Further, the time and date is known, which is cross-referenced against the user's calendar and "dates of importance" file in the user preferences directory. This clarifies the exact occasion and can be even further clarified by posing a question to the user. This information also becomes part of the tag. In trying to retrieve or recall the photo, the user only needs to remember a part of the tag to be able to access the desired photo or information in general.

Further features of the tag can include character recognition as well as pattern, voice, and image recognition. Upon storage, a subset of all such available modalities of the data element becomes part of the tag. Over time tags are allowed to change automatically based on user preference or usage pattern. For example, a tag can be dynamically modified to include such things as presence of a certain person in a photo, at a time when such recognition is completed which can be much later than the time of capture or storage. The system allows for such automated as well as dynamic updates with or without user input.

As a further illustration of such method, assume a simple storage element (data element) for a module is, for example, 256 bits and a memory word for data alone is 16 bits, then it takes 16 rows [for illustrative purposes, each memory word is shown as one row] of data to store this element. If the design parameters allow up to 20 bits for the data and tag space per word, then up to 64 bits can be used for a tag (4 bits*16 words). If the storage element is 1 Kb for the same overall bit width of 16+4, then one needs 64 words to store that element. In this case one can have up to 256 bits for a tag.

In general, the tags are uniformly designed so that for most data types and functional modules, one can go up to a certain maximum tag width. For example, if all one needed is 64 bits, then for the rest of the words, the tag can be either repeated or driven to an agreed upon level. The implementation is design dependent. The ratio of data element size [function/module dependent] to data word size [design dependent] determines the number of memory words (rows) it takes to store such a data element.

In certain embodiments, a tag's width is determined by the ratio of maximum tag size required for a given module to the number of memory words required for each data element. In this case the tag and data are proportionally assembled and disassembled. In other embodiments, the tag may get appended to the first or last data word and recognized with an end-of-element flag. In yet another embodiment, the tag always gets stored in its entirety and then the data element begins.

In certain embodiments, the tags are fixed in size and the memory word size and depth is a design parameter based on each module's typical element size and timing requirements for the control signals. In some cases, the row of data to tag ratio is determined specifically for each functional module and data type. Hence, customization happens at the module level even for memory. In some cases, the size of the tag is dynamically allocated while additional bits allow for user or machine-generated updating or extension of tags over time. These may include user preference, usage pattern, or other criteria.

(2B) Store-Well, Retrieve-Well

The current state of the Internet is an excellent example of what happens when all sorts of information is made available to everyone; the problem is how does one find what one is looking for. Design of the next level of search algorithms, semantics web, video search, etc. is well under way, and undoubtedly there will be improvements. It remains a fact, however, that information is being added to the Web at a far greater rate than the rate at which the algorithms are improving.

This problem can be addressed for relevant information generated or accessed by a user by an integrated solution that will now be described. For organization and storage, the solution introduced here provides a mechanism to collect enough information from the user, physical location, context and time to be able to automatically store the information in an appropriate manner and retrieve it easily without resorting to a complex and computationally intensive search. Even though it is comfortable to talk about "locations" when discussing files and information (something inherited from folders in file drawers days), it is becoming irrelevant and quite limiting to discuss locations when there are millions of files and bits of information generated every hour. It is more appropriate to understand the uniqueness of each multimedia file as it is received/acquired and store it in a way that future retrieval is seamless to the user and archiving, backup, deletions, etc. happen automatically. Such an approach increases productivity while reducing security and accessibility issues.

Figure 15:
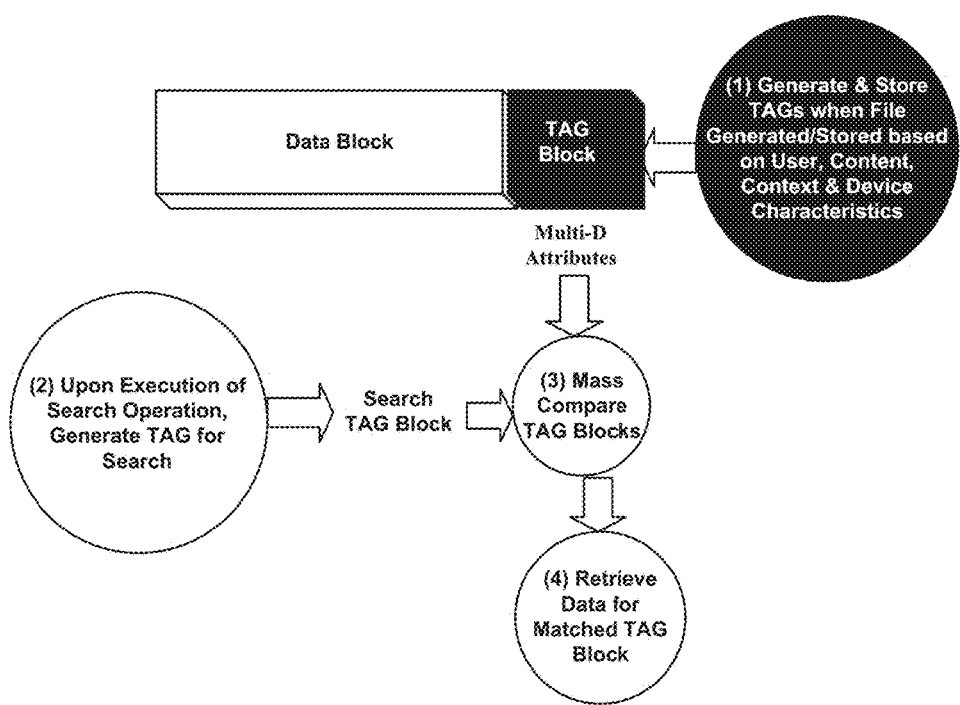
FIG. 15 illustrates an example of an algorithm for tag and content searches.

As described above, based on information type, user selection, activity and usage model the system generates and updates multi-dimensional tags for each piece of information (e.g. audio file, etc.) that the system handles. For each search/inquiry, a corresponding search tag is generated. The search tag is compared with the stored information tags. In some instances this is done by hardware, resulting in a very fast search. Content addressable memory (CAM) or other content search technology can be used to provide a high-speed implementation. A combination of hardware and software implementation can be used for the tag and content searches in certain instances, depending on the specific nature of the search. FIG. 15 illustrates the intelligent storage, search and retrieval technique described here, according to one embodiment.

(2C) Time Based Architecture

TIBIS removes static applications and content from being the central factor in device architecture. Instead the primary design element of the system is capturing and providing "relevant", "useful" and "timely" event information to the user. Each time snap-shot contains a record of all activities the user chooses to record, store, and/or track for the selected time granularity (e.g., daily, hourly, weekly.). A time snap-shot records relevant information, such as physical location coordinates of the mobile device (or other type device that is implementing TIBIS), information received, transmitted, captured, created or opened by the device, conversations of the user, etc. The information includes multimedia data such as audio, video, email, text, etc. The system has provisions for a set of information repositories that include all files of the appropriate type (e.g., an audio repository includes all audio files generated, received or stored by the user) as described earlier in section 2(A).

In addition to the previously described Horizontal Repository (HM) used for content and tag storage, the TIBIS system is organized around two types of memory. One is called the Short-Term Memory (STM) and the other Long-Term Memory (LTM). Initially, information is recorded sequentially in STM. The STM block granularity and time duration is determined by the user and can be very short or very long, depending on the application and user preference (e.g. seconds, hours, days, etc.). During a predetermined amount of "inspection" period, the user has the option of erasing from STM any information deemed unimportant (e.g. an incoming junk email, erroneous file, etc.). In one implementation, the inspection period is chosen to be the amount of time it takes for the STM memory to be filled. At the conclusion of the inspection period, any remaining data is sequentially written to LTM. Any data/tag that is erased from STM memory causes its corresponding content/tag to not be written in LTM. Once data is written in LTM, it can no longer be changed. In a generalized implementation, the option to give the user the ability to erase LTM can be provided by special permission.

As can be seen in FIG. 12, all of the tags from each function's memory are collected for the selected time period and stored together as a super-block, or "time snap-shot", in STM. At the appropriate time (e.g., when STM is reaches a pre-defined time limit), in one embodiment the user is prompted to examine the tags and determine which contents and tags they wish to preserve. In the absence of additional user input, the mobile device makes the decision based on an initial programming default. In the aforementioned embodiments, the chosen contents of STM along with the accompanying data as chosen by the user are written to LTM, and STM is cleared or overwritten. In another embodiment, the data moves through a window of a given STM cycle, e.g. 30-days, while at the same time each time snapshot (e.g. daily) is transferred to LTM in a first-in first-out (FIFO) output manner. The time snap-shot has links to any blocks of data in the relevant repository that is accessed in the given time period. When data is moved to LTM, content and its corresponding tags are saved in the LTM entry or the user can choose to keep only the pointer to the content in the repository. In one embodiment, once content is moved to LTM, the content is either cleared from or kept in the repository based on a user-defined preference list in an automated fashion.

Figure 14:
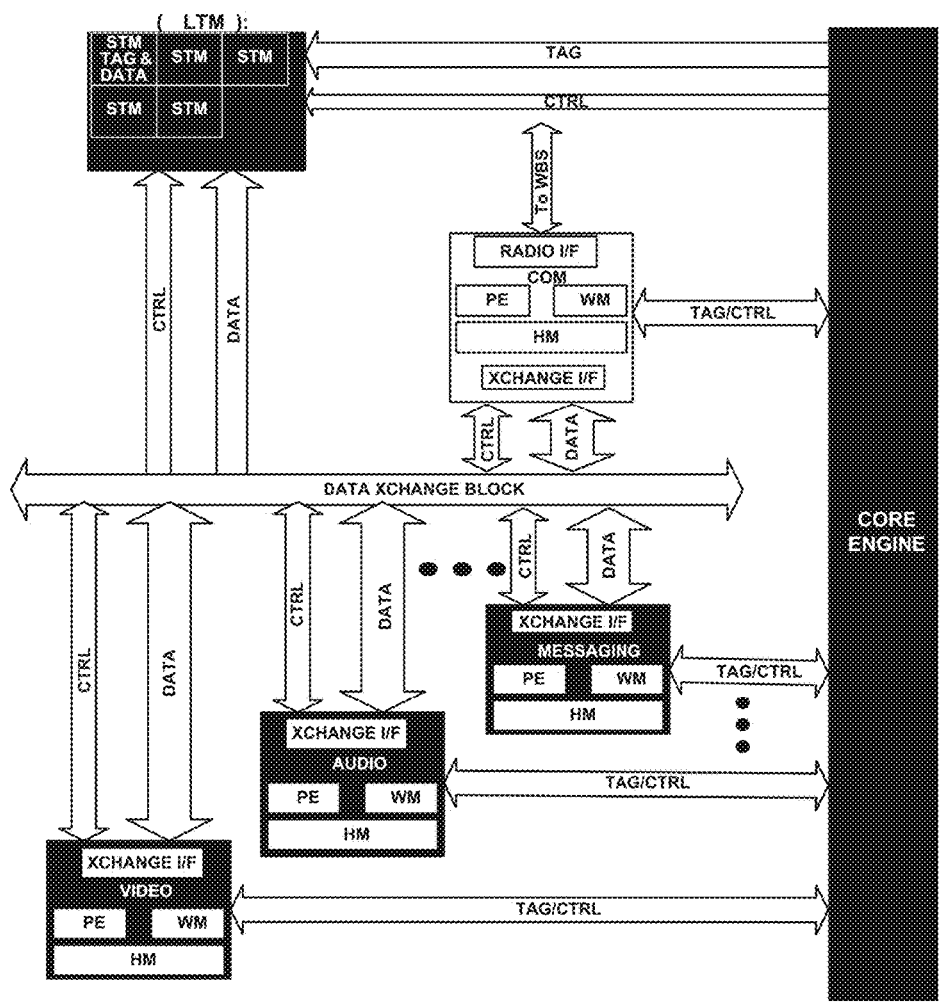
FIG. 14 shows the data flow of the modularized mobile architecture with a time based information system (TIBIS)

FIG. 14 shows the data flow of the Modularized Mobile Architecture with TIBIS, according to one embodiment. FIG. 14 is essentially identical to FIG. 4, except that it further shows the LTM in relation to the core engine and the functional modules. In at least some embodiments, the STM is implemented as memory that resides within the core engine. Further, in the illustrated embodiment the LTM is separate from the core engine and is coupled to the data exchange block through separate control and data lines and to the core engine through separate control and tag lines. In other embodiments, the LTM is implemented as memory within the core engine. The LTM can be designed as a removable module, so that it can be saved for archiving purposes as needed.

For a given time period, all appropriate functional module tags are collected into a single tag block, called the STM block. STM is comprised of the collective STM blocks. The contents of STM can therefore be used to provide a complete "day view" to the user for multiple days, or similar view for any other selected time period. Upon a request for retrieval of data, a fast search mechanism is then able to retrieve the data element by hardware, and in some cases software, by comparing only the tags of data elements. In case a tag comparison results in multiple hits, the reduced set of data elements (tag hits) is then subjected to a further search reducing complexity and time of retrieval.

In addition, this memory architecture is designed to allow for user programmability of memory configuration, hybrid time-sector tagging of memory [ability to individually or hierarchically add additional tags to time slots or grouping of time slots], dynamically varying the time granularity, and finer resolution time snap-shots inside another snap-shot.

In this system, problems with memory fragmentation are resolved, since no rewriting is done in previous segments of memory and data is always written in contiguous sections of memory. In addition, since the memory is written based on time, one needs to backup any part of memory only once, since contents of past memory cannot be modified (except where the user is given the option of deletion). Therefore, periodic backups of data or changes to the data are not needed.

TIBIS provides data security and facilitates information audit. Since the system stores time snap-shots, it is straight-forward to review past activities and information. The system enables auditing of past information and activities such as financial transactions, medical records, etc. easily.

TIBIS enables one to view a snap-shot of one's life by providing an automated temporal, location & context-based digital journal of user information. This information can be stored in a non-volatile memory space on user's mobile device via a removable storage mechanism or on a network storage area connected to the user's device wirelessly or a network storage area connected to the user's information device via the worldwide web. In this case, a digital life journal consists of user's events, activities, appointments, locations, communications (calls, messaging, etc.), documents, multimedia content, all including the 5 W tags mentioned earlier in addition to any other user-defined categories for any given time period. This can be used for personal, business, or legal purposes.

One of the tasks handled by the core engine is assembling the STM blocks and coordinating the transfer of information to the LTM blocks. In addition, once the tags are generated and STM blocks are assembled, the core engine has access to a set of well-organized information which forms the basis of efficient operations for robust organization and planning. The inventions described herein are employed to implement an automated assistant system. This system creates a robust organizational tool and provides proactive and anticipatory services and life management solutions for consumers.

Mobile devices periodically send a signal to the base station to register their location. This is done through periodic location procedure. This is a requirement even when the device is in a stationary mode. This information is used to properly route incoming calls (mobile-terminated calls) to the proper mobile station. When a call comes in, the mobile switching center (MSC) initiates a page over a number of cell sites where the user's signal was last registered (e.g. 10) and if not successful, the number of cell sites is increased in order to locate the mobile device. In this invention, when a mobile device is stationary for a long period of time, a notification is sent to the base station to indicate that the device is stationary and it's location is fixed. This can be done automatically by the device after detecting being stationary for a period of time or initiated by the device when deciding to go into stationary mode for a period of time or automatically based on user's anticipated activity as described earlier. The device will then stop periodic registration with the network, resulting in power savings on the device. In addition, the network only keeps track of the current location in it's registry, freeing up space at the MSC. In one embodiment, the signaling to the base station is accomplished by setting a one bit flag (0: normal mode, 1: stationary mode.) The bit used can be any unused bit in the signaling structure. In one embodiment, it is one of the unused bits in the mobile phone identifier (ESD) which is allowed to be modified by the device. Once the device enters stationary mode, the bit is set to 1 and when it changes location, the bit is set back to 0. In one embodiment, the device periodically checks and if fading happens, it switches over to another cell and reports it's new location.

In mobile devices, once the device registers with the nearest available cell station, if it is not initiating a call, it goes into idle mode. It stays in this mode until a call is initiated by the mobile or an incoming call is routed to the mobile device. In this mode, the device constantly listens for page signals sent from the base station so it can receive incoming calls. During the idle period, it is imperative to have very low power dissipation since the device is in this state for a very long time. In idle mode, the mobile device listens to the pre-assigned paging channel, receives the information sent on that channel and compares that to the known sequence that would indicate the page signal is intended for the mobile. This involves receiving the entire page sequence and comparing the outcome with the known sequence. In this invention, power dissipation is significantly reduced by designing the system to only listen to part of the page signal (a period much shorter than the total timeslot for the entire page sequence.) If a match is found in the appropriate sequence, the next level of the sequence is checked and if that also is a match, the next level is checked until the entire sequence of the page data is checked for a full match. The size of the reduced time slot (number of bits) and the number of successive partial page matches are determined by the maximum time for page signal to be detected by the receiver as given by an established standard or acceptable performance. The power dissipation is further reduced by employing a simple dedicated hardware (collection of XORs) instead of using the processor to do the matching of the page sequence. This significantly speeds up the matching process and significantly reduces power dissipation since the processor will be off until an incoming call is detected. In certain embodiments, the partial wakeup signals generated during this process can be used to trigger internal wake-up mechanisms within the system to ensure full system readiness by the completion of a full match.

(3) Automated Mobile Assistant System

The techniques introduced here include a mobile automated assistant system which performs automated assistant tasks for the user. The system comprises a multi-dimensional, multi-modal and multi-user scheduling environment which performs automated tasks on behalf of a user of a mobile device or a registered user on an internet based service or alternatively a user of services who communicates with the main service processing center via various telephone or voice calling methods.

Figure 17:
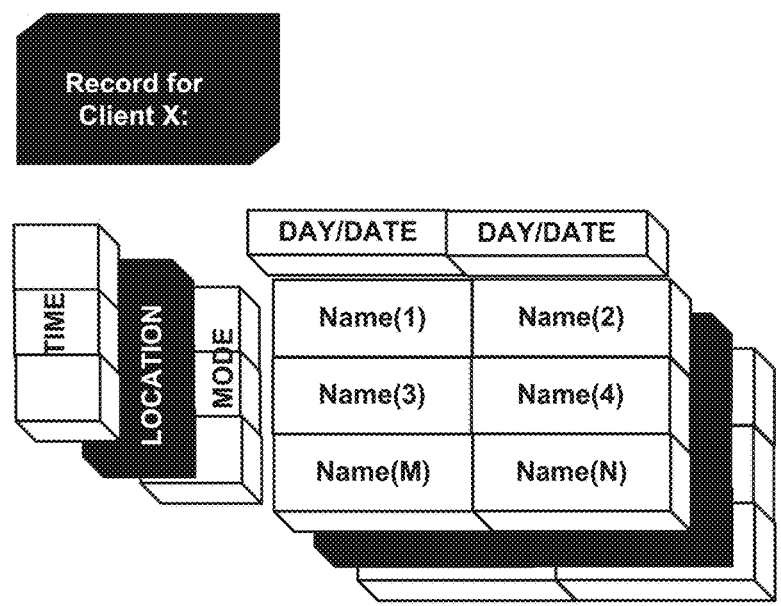
FIG. 17 shows an example of a multi-dimensional record for one client.

Using the present multi-dimensional scheduling environment a scheduling record for each client is constructed as shown in FIG. 17. FIG. 17 shows an example of multi-dimensional record for one client. Name1 to Name N are the engagements for the client. Each client's schedule is allowed to exhibit various modes such as "travel", "business", "athletics" which take into consideration the HOME base for each mode and perform proactive distance and driving calculations and notifications as well as proactive reservations, contacts notifications to name a few.

Although various members of the scheduling system are not necessarily sharing their information, the system is able to match users' and businesses' time schedules and report on possible meeting times, event times or proactively schedule those in prospective clients' time schedule.

Figure 18:
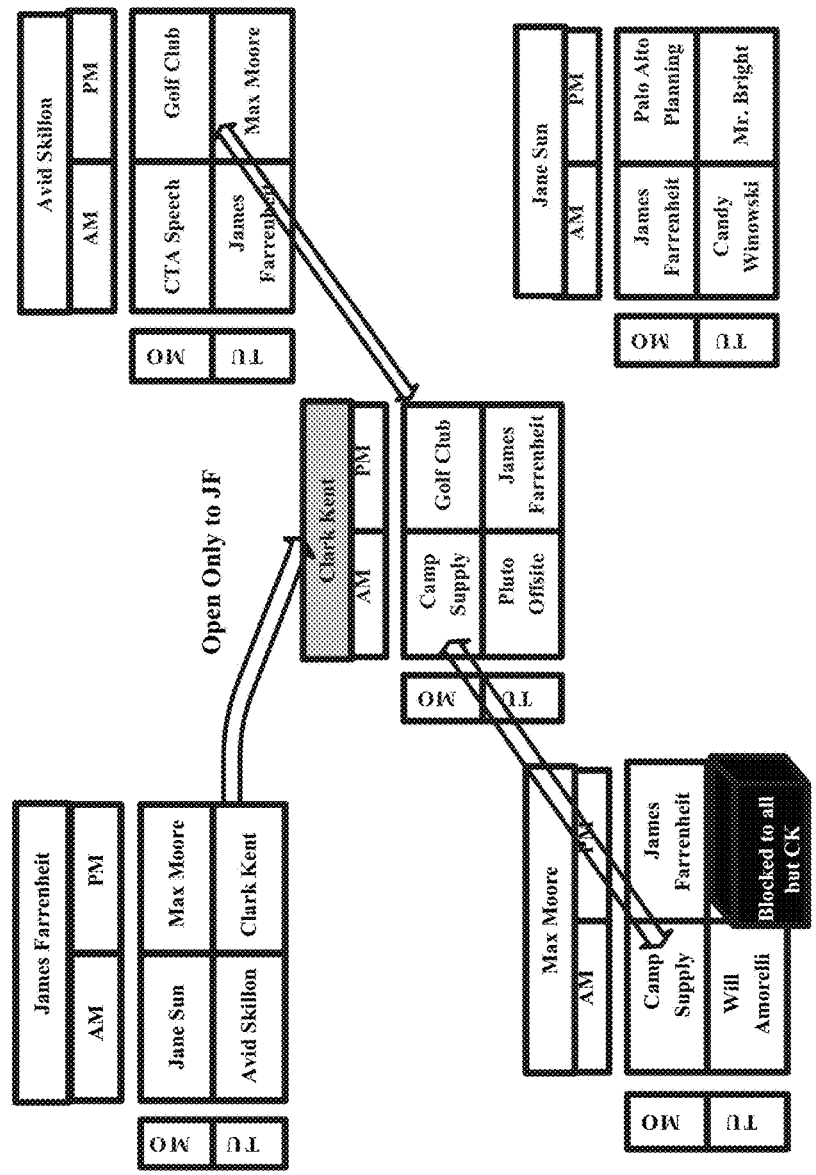
FIG. 18 shows a cluster of client databases.

The principle upon which the matching algorithms work is based on a cluster of client databases which together comprise a web of synchronized clusters. FIG. 18 shows a cluster of client databases. Access to schedules is based on user authorization, authorized time frames, or proactively based on proximity and location. There are two levels of sharing that are implemented in this scheduling system:

(1) Allowing certain users in a group to share the entire schedule on the calendar, including accompanying documents, information and tags. The user is permitted to block certain timeframes/documents as private even to this group. An example could be the user's immediate family members. In one embodiment, members of the group can add items to the user's schedule.

(2) Allowing specific timeframes to be open to sharing with certain authorized users including an authorized subset of accompanying documents, information and tags. The user is otherwise and at other timeframes blocked to other users of the system. An example could be certain business associates. Members of this group are not generally permitted to add items to the user's schedule.

These levels can be extended to encompass more sophisticated multi-level permissions as the application area warrants. Upon request, the system can produce a merged view for a designated group of users who have elected to share their schedules such as a family, a work group or a social group.

In the example shown in FIG. 18, the cluster of client databases allow James Farrenheit to view Clark Kent's schedule directly, while Clark Kent can get two meetings scheduled with two other users without viewing their schedules via the system due to the common location and time of their presence. User Max Moore's schedule in certain time/locations is blocked to all except Clark Kent.

Figure 19:
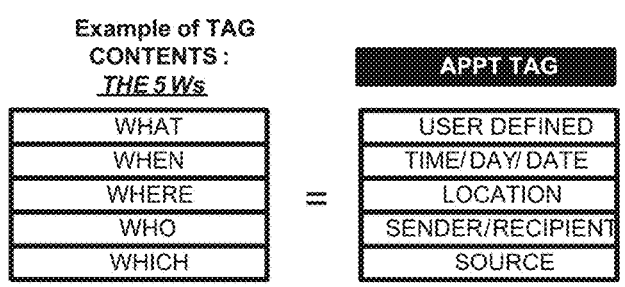
FIG. 19 shows elements of a scheduled item.

Referring to FIG. 19, each entry in a user's schedule is accompanied with a multi-dimensional tag, which in one embodiment is a five-element tag describing answers to the five key questions: "what", "when", "where", "who" and "which" described previously. FIG. 19 shows elements of a scheduled item. Additional tag categories can be included if desired.

This information is automatically generated at the time of creation of each data entry into the system and stored in local memory for the appointment subsystem. This is referred to as Horizontal Memory (HM) as described earlier in this document. The HM stores the full content accompanied by a set of specified tags such as the ones described earlier in this section.

Using this level of abstraction, the schedule shown to the user can be used to organize items via any of these five different categories. This also enables aggregation of reports on schedules based on each of the categories for past evaluations or future planning processes. These fields, called APPT TAG in FIG. 19, can be implemented with consideration given to the available storage space as well as possible number of sources available. Some fields may require less storage and some allocation can be made to future expansion capabilities.

Figure 20:
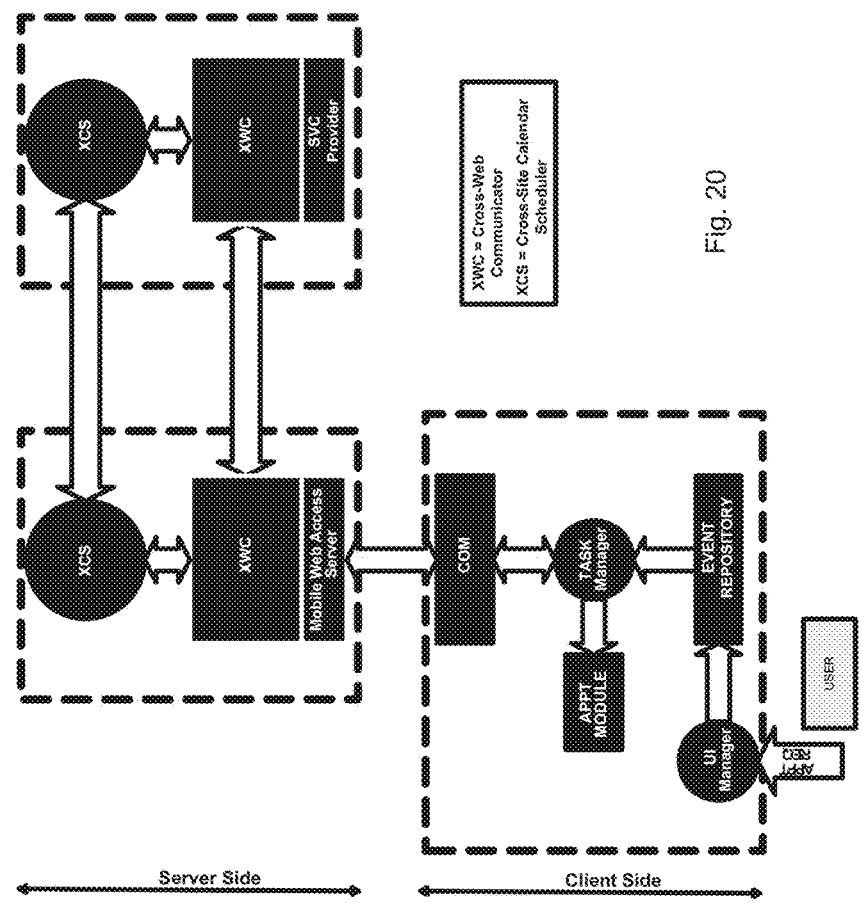
FIG. 20 illustrates an example of automated service processing.

As shown in FIG. 20, a Cross-Website Communicator (XWC) is installed on the mobile access server and on targeted websites across the network (e.g., the Internet) that allows for the mobile access server to automatically communicate with other sites and facilitates automated tasks such as scheduling, reservations, etc. The XWC on each site has access to the appropriate data on its site and is therefore able to enable negotiation of various arrangements to arrive at a suitable solution. The XWC also identifies the level of access to data from incoming users and services and can choose which level of data is appropriate to be shared with the incoming requests and what type of scheduling and other services are allowed for each requestor. In one embodiment, the XWC links the access server network to customers' third-party service providers' network.

Still referring to FIG. 20, a cross-site calendar scheduler (XCS) performs algorithms for doing automated scheduling of events, appointments, etc. Each site has a priority-coded calendar with proper access control which is supplied by the XWC installed on the site. When an authorized entity (with the proper authorization) requests an appointment, the calendar is made available to the requester who in turn will compare the availability with that of the requester's calendar and finds the suitable match, readjusts the availability of the time slot on both calendars and resends the updated calendar. The matching and calendar updating can occur at either side depending on what makes sense (e.g. the number of users who may be accessing calendars at the same time). The preferred embodiment is to do the calendar matching and reservation on the network/stationary site where multiple users may need to access a specific calendar at the same time. In those cases, once a calendar or section of calendar is accessed for one user, other users are blocked from access until the calendar or section of calendar that is being used is updated and released.

Negotiation Algorithms:

One of the embodiments of this system is to schedule via the phone or the web the best match for time among two person's or entities timetable via a negotiation algorithm. Two such cases are demonstrated below. It should be noted that the phone version is equipped with voice recognition and automated call placement and receive capabilities at the access server network end. On a third party service provider's end, this may or may not be available. In case it is not available, options in the automated calling and voice features are designed to walk the person on the other end of the call to conveniently make choices and let the access server network know the best possible appointment option.

Phone-Link's Simplified Algorithm:
  From an "Appointment Schedule" request:
  1. Lookup destination contact information (contact list, web, 411 call, previous calls list, etc.) & their auto-call line (as set up by Phone-Link directory)
  2. Pick first best available timeslot for the particular appointment based on preferences & travel times
  3. Make call & request time based on first best time and/or non-blocked time/days
  4. Negotiate until mutual free time-slot is reached
     Send first available time-slot
     If OK, schedule; otherwise:
     Receive other side's first available
     Check availability of owner's time
     If owner available, schedule
     If unavailable, send second best available and/or ask for their second best available & repeat
  5. Notify owner of the agreed time and ask for change requests to be entered as future Appointment Schedule requests
  6. Update all related directories as indicated by dependency setup file Web-Link's Simplified Algorithm:
  From an "Appointment Schedule" request:
  1. Lookup destination contact information (contact list, web or previous site visits' list) & Auto-Link URL (as set up by Web-Link™ directory)
  2. Pick first best available timeslot for the particular appointment based on preferences & travel times
  3. Connect to site & request time based on first best time and/or non-blocked time/days
  4. Negotiate until mutual free time-slot is reached
     Send first available time-slot
     If OK, schedule; otherwise:
     Receive other side's first available
     Check availability of owner's time
     If owner available, schedule
     If unavailable, send second best available and/or ask for their second best available & repeat
  5. Notify owner of the agreed time and ask for change requests to be entered as future Appointment Schedule requests
  6. Update all related directories as indicated by dependency setup file Direct Match Algorithms:

Another class of algorithms may be preferred where, instead of a negotiation scheme, the two parties exchange a series of data-oriented schedules, possibly in the form of a graphical representation of the users' timetables. One such example is provided below:

Example Algorithm:
  1. Lookup destination contact information
  2. Set up communication link
  3. Send out requested action (e.g. Person A's schedule in graphical data form)
  4. Recipient pulls out requested schedule
  5. Upload your schedule (Graphical calendar shows open slots (e.g. Green color), closed slots (e.g. Red color), negotiable slots based on priority (e.g. Orange color)
  6. Recipient system compares the two calendars and matches two available slots that overlap, sets up the appointment for that time slot, changes the color to red (unavailable)
  7. Sends the updated schedule back to the requestor
  8. Update all related directories Principles:

Time Schedule Design:

All of the above works when the initial Time Schedule is constructed with automated scheduling in mind. This means based on the construction and personalization of intelligent Preferences and Profiles system, the environment is constantly collecting and updating the information so that all key factors regarding scheduling from a human perspective are taken into account. Therefore, the intelligent construction of the Time Schedule is very important.

Proactive:

All functions are aware of the other parts and are able to gain intelligence from what is happening in other areas from hardware as well as software. If the memory usage in some part of the device is too high, it can alert the user and in some cases proactively move data across partitions to prevent loss of information. It can also use information history of activities, such as number of hours exercised to alert the user to allow the device to schedule trainer or doctor appointments. It can also prompt user based on other parameters such as usage model, current or future location proximity, co-location with another user on contact list, etc.

Secure:

Every device is tagged for a specific owner with his or her own customization and personality. This prevents theft and use of device by unauthorized persons. In addition to the ability to remotely disengage the device from any access in case of knowledge of theft, the device is cognizant of activities that are not within the preferences files of user's indication. It can detect such cases and make back-door verification of potential foul play quite timely and easily. This is described further in the Automated Security section.

As part of the system, users can get a phone access number for personal automated assistant services, such as the ability to call and confirm their schedule for the day or make appointments via an automated system. If needed, live help can be accessed. In addition, this system is available via the web and is also "active" meaning, changes and notifications can be made on the spot. These services are for times when the user does not have the mobile device with him/her or when network access in unavailable.

Under each category of tasks, the user is able to define the particular service, create appropriate shortcuts for such services which are directly hardwired into the device for robust performance. These service requests are processed by the UI manager and placed in the Event Request Repository shown in FIG. 16. The priority and timing of all service requests are managed by the Event Scheduler which schedules the next request to be processed by the Task Manager which then connects to the COM module to send the relevant information to the appropriate server (or an internal device module in case of some requests.)

Automated services to third party service providers are facilitated by processing of the requests on the mobile device and communicating the appropriate information to the web service (through the COM module) to fulfill the service request. The WC and the XCS are used to connect to desired service or information providers, download or upload information, and schedule events. This enables some of the automated services offered by the automated assistant system. FIG. 20 shows the automated service processing between the mobile device and a third party service provider. The example shown is for an appointment request on a third party site.

Figure 16:
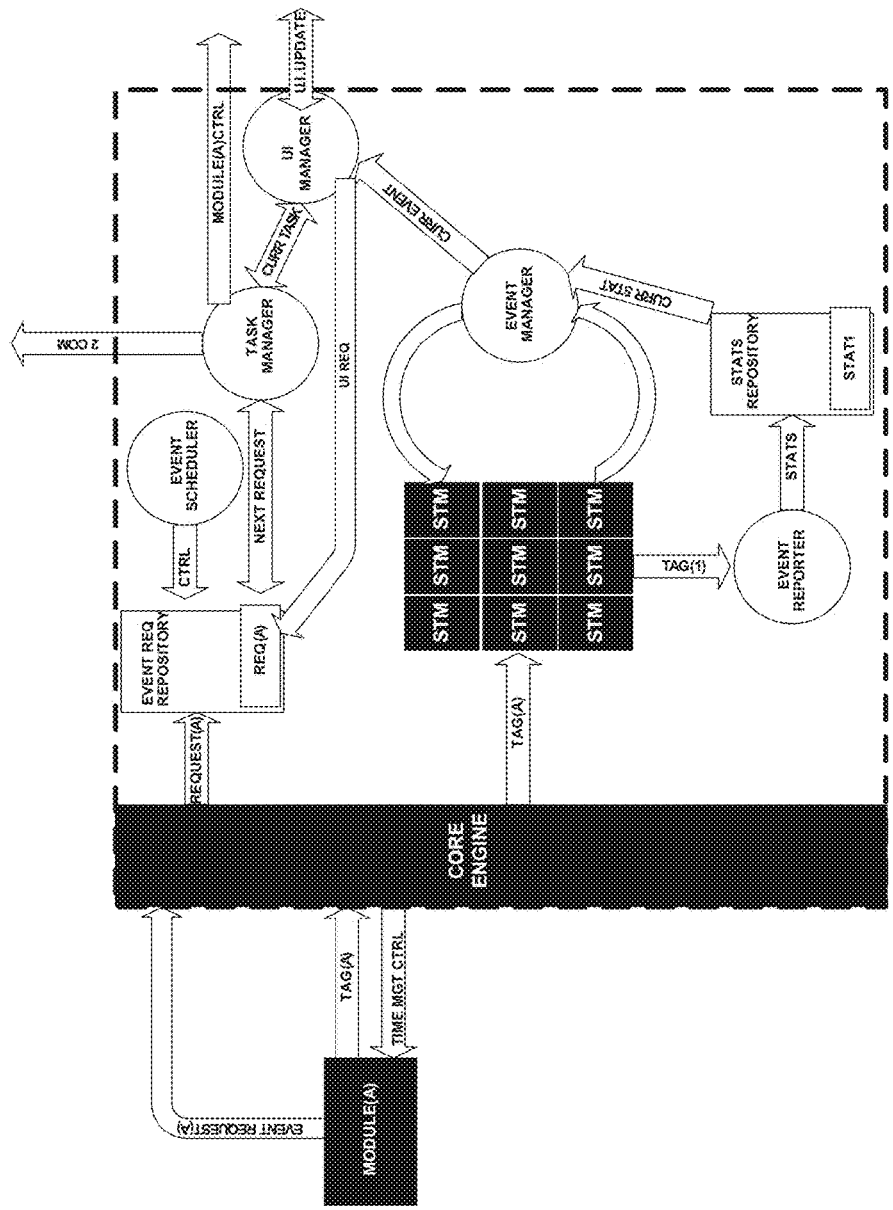
FIG. 16 shows the TIBIS operations facilitated by the core engine.
Figure 21:
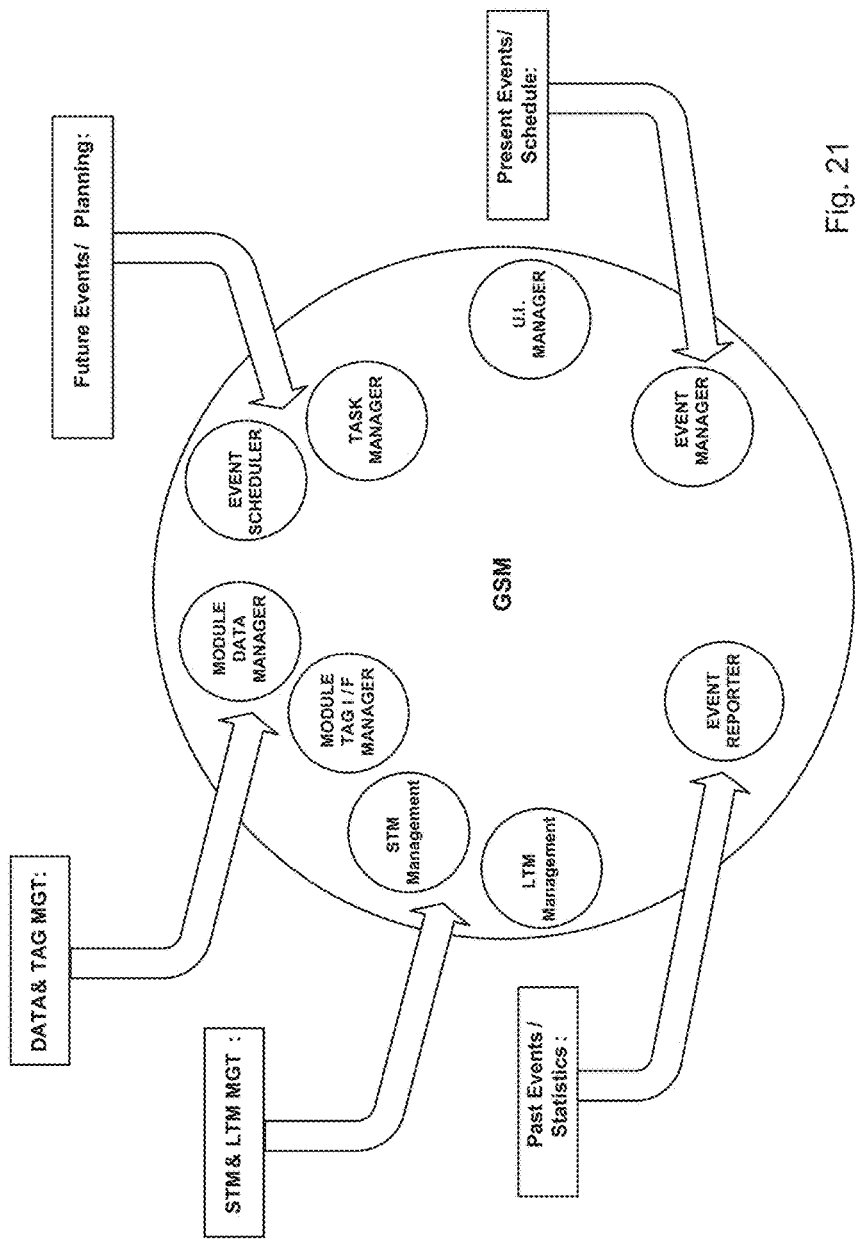
FIG. 21 illustrates the primary management functionality in the GSM in one embodiment.

The motivation behind this technique is to provide users with an "active organization tool." Currently digital electronics calendars offer slight improvements over traditional paper and pencil mechanisms. Some of the key element that distinguish this technique from existing techniques are that it is:

(1) Intelligent: context-aware, location-aware, and temporal-aware (2) Proactive: master-status with respect to update events, generate alerts and modify without prompting for user input (3) Anticipatory: designed to map future events into present and near-term tasks These characteristics are achieved in this embodiment via the TIBIS described earlier in this document. The overall engine controlling the control path of one embodiment of a device is depicted in FIG. 21, which shows the primary functions performing the essential operations in the device are predominately in hardware, which is implemented either in programmable or fixed logic and is accompanied by the appropriate memory blocks to accommodate the user-interface working memory as well as dedicated display memory areas. This intelligence engine is made up of a set of hardware assist functionalities embedded inside the GSM block in the core engine. FIGS. 16, 21 show the operations that are facilitated by the core engine. The main building blocks of interest are:

Event Reporter: Collects information from stored tags and generates statistics on specific categories.

Event Manager: Monitors all current and short term plans and updates the timing schedule. It also takes care of erasing STM contents based on user preferences and handles current stats and updates the UI manager.

Event Scheduler: Monitors all module and machine generated requests for automated actions and places entries in event request repository for scheduling.

Task Manager: Collects all requests for automated tasks and contacts the communications module for data, voice communication when available to perform automated tasks, as well as updating the user.

Module Data Manager and Module Tag Manager: Generate control signal to release data to/from the modules and send and receive tag information from specific modules to the main core engine to perform TIBIS related tasks.

User Interface (UI) Manager: interfaces all time/event management functions to the user interface blocks driving this information to the user interface based on user request profiles.

The device UI is driven by a display driver controlled by UI Manager. The UI Interface block takes direct input from (1) UI Manager controlled by the Task Manager and the Event Manager. These functional blocks manage the past stats and future planning tasks and update the user interface directly with relevant user information (2) User defined preferences in UI user registers that are updated upon boot-up of the device and at regular user-defined intervals without booting up the device.

Figure 22:
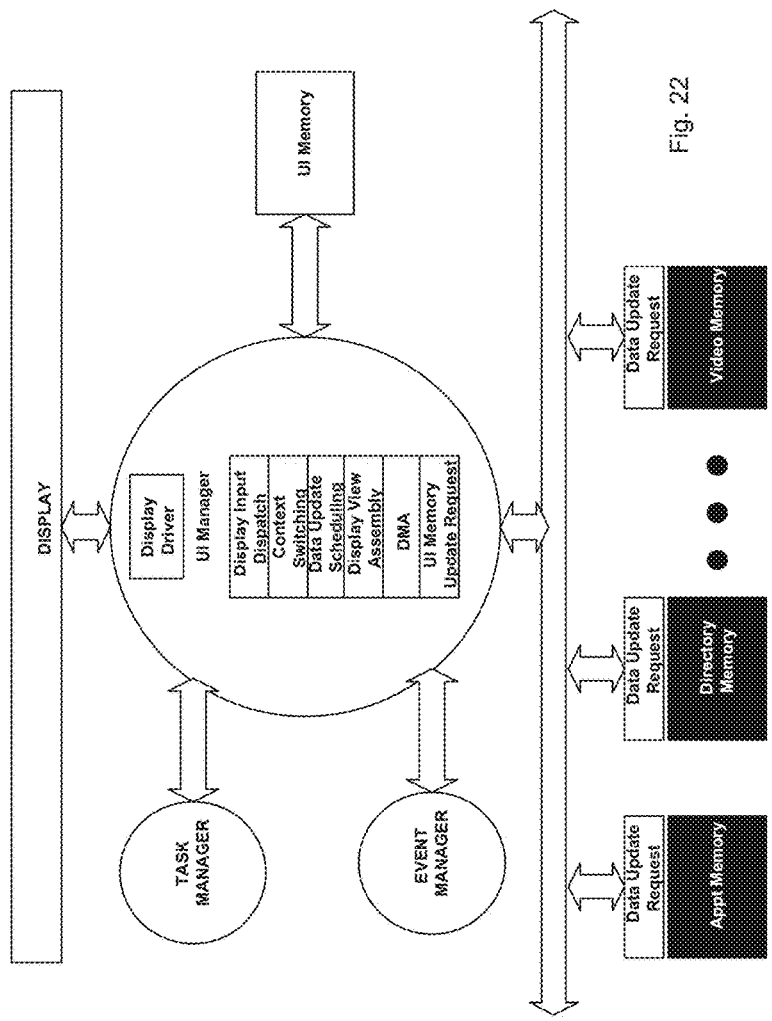
FIG. 22 shows the functional blocks of the UI manager in one embodiment of an automated assistant system.

The UI Manager block takes the prioritized tasks and events as well as statistics ("stats") and "plans" supplied by the elements in the GSM and displays the information according to a pre-selected format onto the display. This information resides in a dedicated local memory for UI. The UI manager also has access to communication and content repository memories and tags and can display relevant information, events, and contents that are of interest to the user simultaneously on one screen. Note that similar to an appointment, other communications, events, contents, statistics, and planned tasks have their own specific memory (HM) with the associated tag system. Among other functions, the UI manager provides display input dispatched, context switching, data update scheduling, display view assembly and UI memory update request handling. FIG. 22 shows functionality of the user interface (UI) of a device for the automated assistant system.

Figure 23:
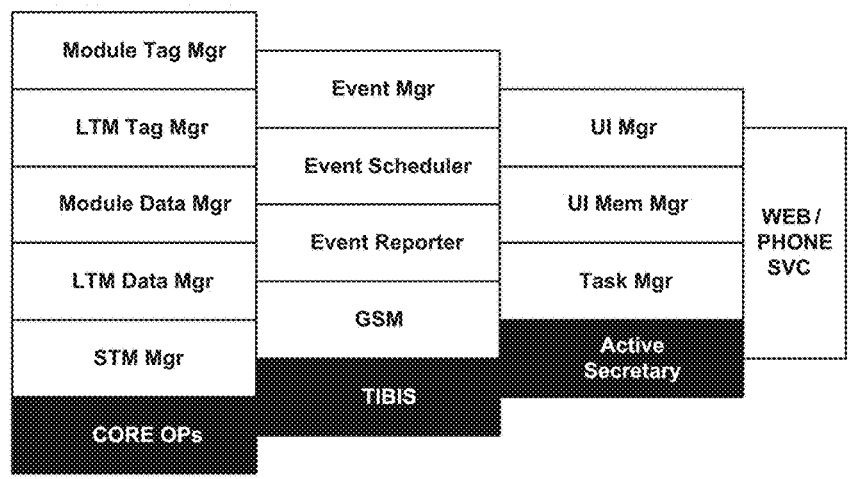
FIG. 23 shows a system level-view of hardware and software elements in a mobile device in accordance with the techniques introduced here.

FIG. 23 shows an overall system level view of functions of a mobile device such as described above, according to one embodiment. All operations within the mobile device can have a combination of software and hardware elements, with the core engine operations being primarily hardware-based. The Core engine operations manage functional modules as well as STM and LTM. The TIBIS engine encompasses the GSM operations within the core engine and manages the relevant operations for event handling. The Active Secretary component orchestrates the initiation and management of tasks and proper presentation of information through UI management. The Active Secretary along with the web/phone services descried earlier provide the Automated Assistant functionality. In this embodiment, as you move from left to right, each level of operation builds upon the previous level.

Figure 24:
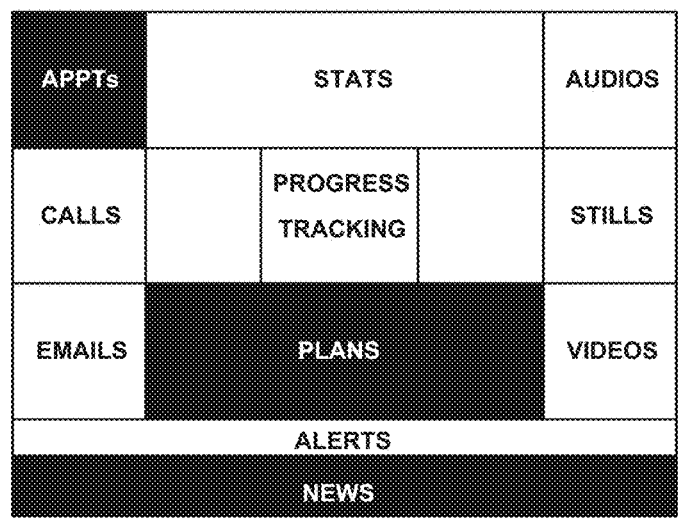
FIG. 24 shows a unified access view.

Referring to FIG. 24, the concept of past/present/future is built into the system. Past information provides statistics. The user is able to view summaries and statistics of user or machine-defined fields deduced from any tag field, time spent on activities, etc. Present information provides immediate direction for tasks and events, and future information is represented by plans set by the user or scheduled by the system based on user needs. FIG. 24 shows a unified access view presented to the user. This is the output of the UI Manager as received by a display (a touch screen in this case) of a device such as a mobile device.

As shown on FIG. 24, the user has access to all communication, user content, and events in one unified view on one screen simultaneously. This capability is explained further below in the unified communications section of this description. In addition, the user can access all relevant statistics, current schedule of activities and future plans from one screen in one step, as well as view progress tracking of plans.

Figure 25:
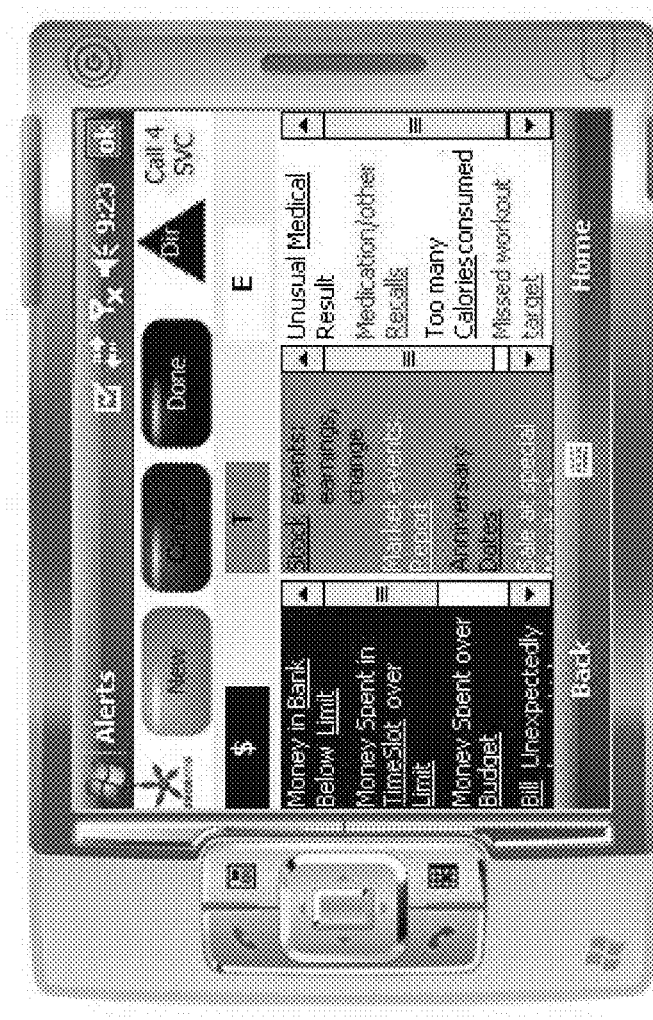
FIG. 25 shows an Alert/News setup screen.

The Automated Assistant System described above allows for providing a variety of automated services to the user. FIGS. 25-35 show examples of various display screens on a mobile device which illustrate various representative automated services that are enabled by a device running such a system. FIG. 25 shows an Alert/News setup screen for generation of Alerts and News items based on user-specified parameters or proactively generated based on usage pattern, current activity, physical proximity, anticipated activity or proximity based on future schedule or plans or other data. The Alerts and News are defined by a set of functions based on Money, Time, and Events. If the criterion is satisfied, an Alert or News item is generated and sent to the mobile device via a rolling ticker line.

The user sets up Alerts/News in 3 Major Categories of Money, Time & Event. The user chooses from a preselected list of action items and names, amount, etc. For example, the system can be set up to send an alert when a bill (e.g. monthly utility bill) goes above a set limit, chosen by the user, possibly implying some error in billing. If this happens, the device sends an alert message on the Alert ticker at the bottom of the screen. Upon specifying an Alert/News condition, the appropriate source for that condition is checked at predetermined time intervals. The particular parameter is checked against the Alert condition and if the condition is met, the appropriate signal is sent to UI manger which then generates or updates the Alert ticker line. Once the condition is cleared, the UI manager is notified and it removes the alert from the screen. In the example above, the source is the monthly utility bill and it is checked on a monthly basis. In the case of News, the source can be user or system-defined News or information outlets. The user can alternatively set up News and Alerts initially on the web. Under user direction, usage patterns, user location, user schedule, etc. the device is then enabled to find relevant advertisements or offers and display them for the user across the Alert bar. As an example, the user specifies certain airlines, geographic locations, and favorite accommodations. Any promotions or advertisements related to these specifics are funneled from the network's live advertising repository to the user's specific area on the network. These are then matched against the users schedule, other preference files and their daily context. Upon receiving a match on these checks, an alert notification is generated and sent to the UI manager for display. In another example, the user specifies interest in receiving promotions or advertisements from certain store, if user is within 2 miles of the store and only on Saturday mornings. The system then pulls the promotions from the store from its network repository and if the user-specified conditions are met, an alert is generated and sent to the UI manager or display on the alert bar.

Figure 26:
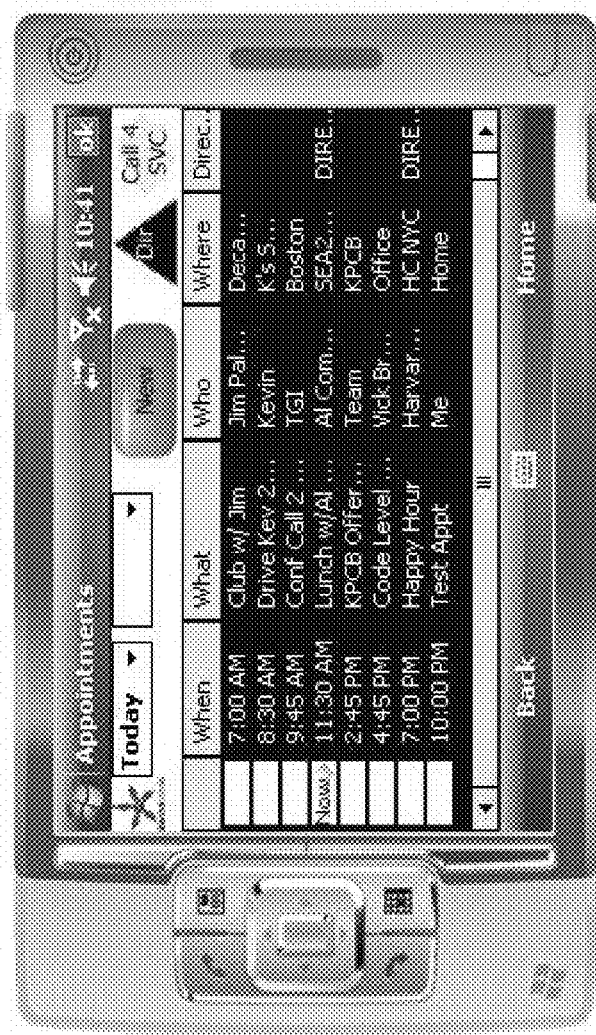
FIG. 26 shows a view of user appointments as seen on the display, including the "NOW" button.

FIG. 26 shows a view of user appointments as seen on the display. Titles of each appointment along with several user-selected fields represent some of the tags used in this case. The contents of the appointment are stored in appointments memory (in HM) accompanied by their respective tag fields. This information is processed, assembled, and fed to the data bus driving the display as part of the UI Manager block. The "Now" button is a dynamic pointer designating the closest calendar appointment to the current time of day which provides the user a useful visual cue to pay attention to the next item on their potentially busy schedule.

Figure 27:
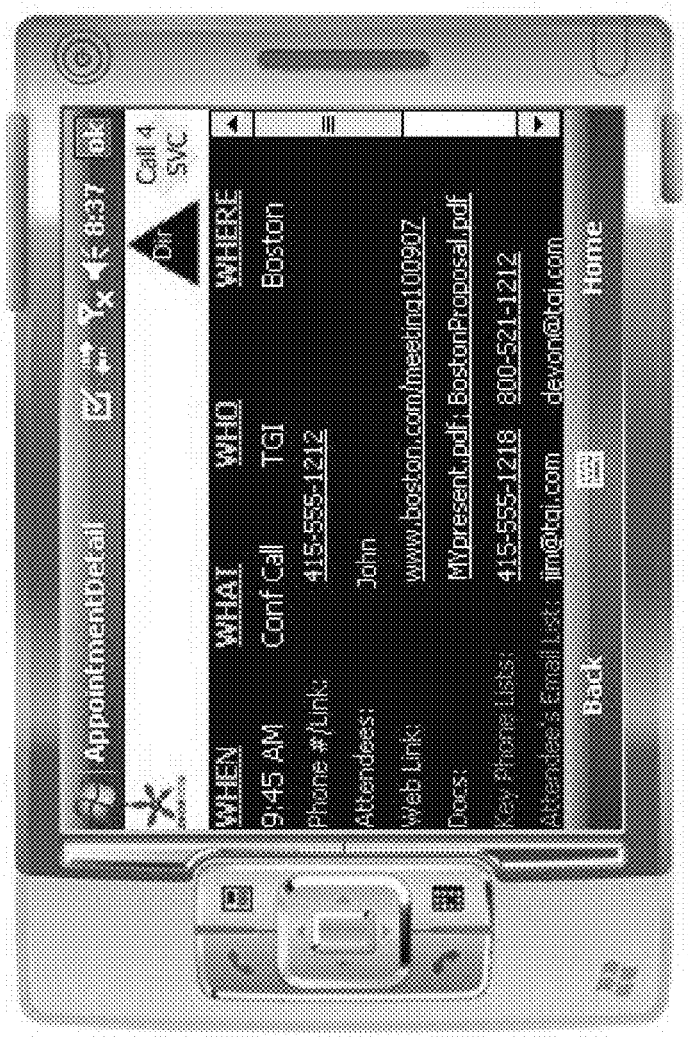
FIG. 27 shows the appointment detail for one appointment.

FIG. 27 shows an example of the appointment detail for one appointment. In one step, the user gets access to a list of details for the appointment and its relevant supporting documents. Additionally, another one-step process allows for the organizers and attendees to be contacted directly. This is accomplished seamlessly to the user due to proactive scanning of information received for specific fields. Upon detection, tags are automatically updated and the information is routed to the appropriate directory residing in the specific memory block. For example, contact information is routed to the Directory HM which has the capability of multiple viewing mechanisms, but more relevant to this case, is linked to all other datasets in a cross-reference manner. If a scheduled appointment is taking longer or the user is running late for an upcoming appointment, a user or system-generated notification is sent to all subsequent appointment contacts and the contacts are given the option to readjust/reschedule their respective appointments. System-generated notifications are based on cross-referencing temporal, geographic, and contextual information available to the system. Upon detecting a mismatch, the user is prompted to confirm delivery of notification. In a multi-user system, the system adjusts schedules and resolves schedule conflicts and sends update notifications.

The device collects relevant information about directory entries in the directory HM. The directory HM contains specific data on directory entries such as date and subject of last communication, relationship, known since, etc. Similar to the 5 W's of an appointment tag, each directory entry has multiple tags that convey the desired information to be collected. Some tags are static or modified only under user input such as a directory entry's biographical information. Other tags are automatically updated by the system, such as communication history. The system monitors appropriate HM entry tags that are linked to a particular tag field in the Directory HM. Upon any change in those fields, the system updates that tag field. This results in a live directory, where up-to-date information such as communication history and other relevant content are available to the user within the directory and can be accessed in one step. The user is enabled to search the contents of any given HM dataset. A fast search on each requested tag phrase is performed and the results are reported to screen.

Figure 29A:
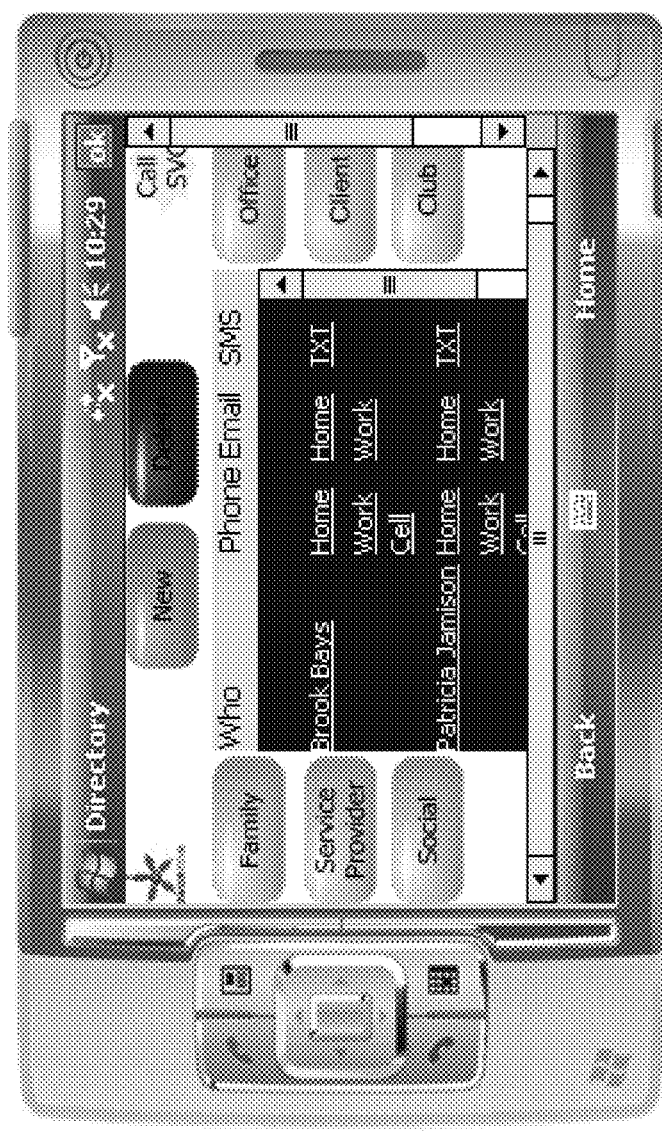
FIG. 29A and FIG. 29B illustrate one example of the directory listings.
Figure 29B:
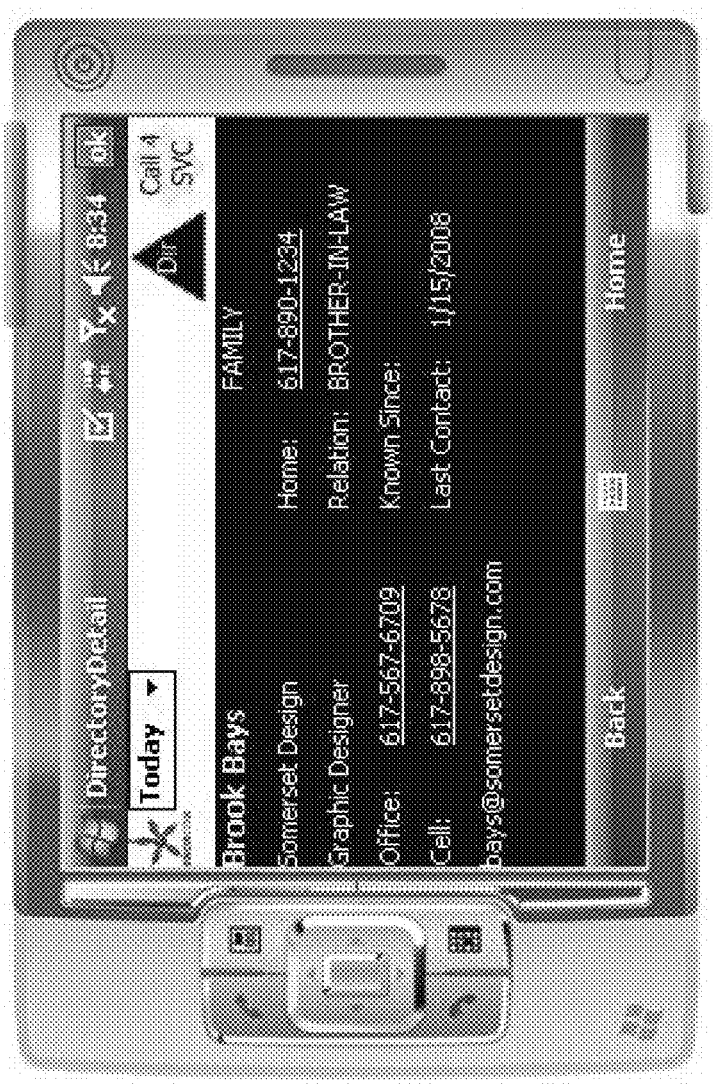

FIGS. 29A, 29B illustrate examples of a screen showing one embodiment of the directory listing and directory detail pages. The user can access desired information on any directory entry, including documents, emails, call records, contact history in one place with one button click without any need for searching for such information. Any directory entry can be dragged and dropped into the desired category (for example to the family category) and the corresponding updates are made such that in all other menus, the new information is presented (for example in the lists category of FIG. 35)

Figure 28:
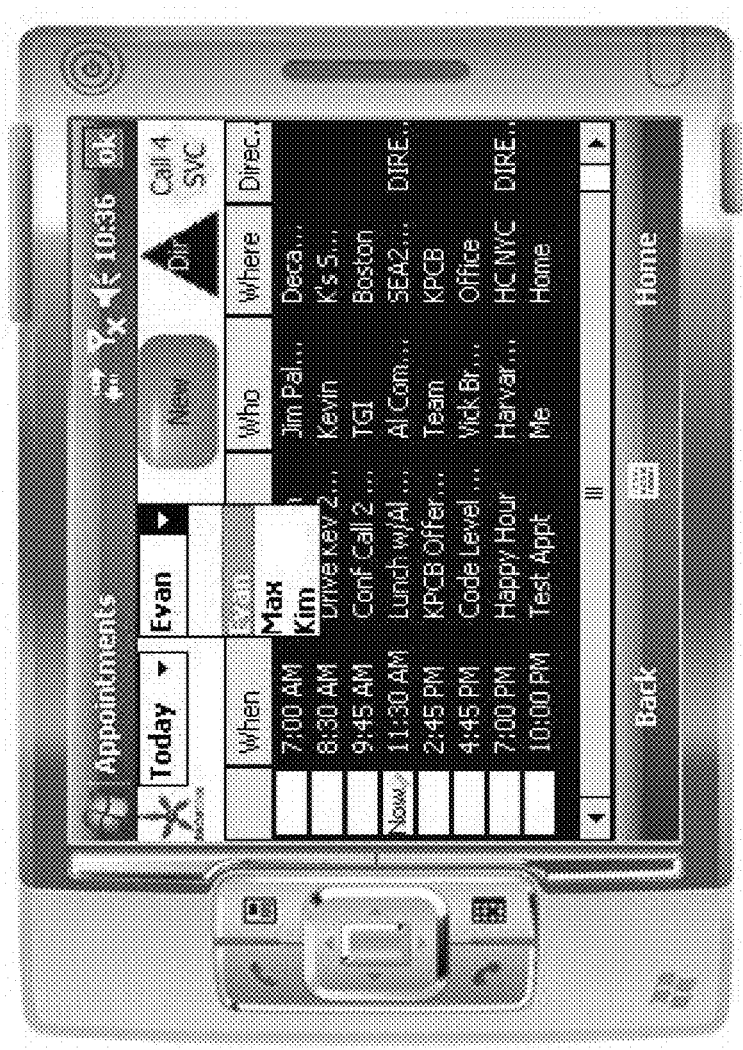
FIG. 28 shows a screen in which the user is able to view another person's schedule using a drop-down menu step.

The multi-user aspect of the scheduling system allows users to view a dynamic version of their selected group's schedule on the fly from their mobile device or the internet. In the following example, a user is able to perform this via a dropdown on top of the appointments page. This is accomplished by keeping user's information in cluster of client databases. In case of sharing requests, these databases form a web of synchronized clusters on the network. On the client side, this synchronization happens at scheduled intervals or upon finding unused communication time on client's device and sending specific appointment contents' updates to the other clients respectively. This can also be done upon request when the user asks to view this information live. Based on user selection, the information may be stored on the network or solely reside on the client's mobile device. There is an option for the user to drive the actual synchronization mechanism (via network, via client, live, offline (when not using the device) or at specific time each day or week.) FIG. 28 shows a screen in which the user is able to view another person's schedule using a drop-down menu step.

The automated assistant system offers a number of services. First, it organizes all useful information in easily accessible formats. For example, by clicking on the Doctor icon on the service menu, the user gets a complete listing of all of their health care professionals. The user can contact them by one-click, can set up an appointment (routine or urgent), can expense the cost of the visit, etc.

The services offered can include, for example, time management through automatic scheduling; for example setting up routine appointments with the doctor; automatic financial management; for example, monitoring all account balance, bill pay; automatic ordering; for example, ordering food from local restaurant. In one embodiment, these services are enabled though the use of WC kernel placed at websites which are connected to our automated service and cross-site calendar negotiating algorithms described earlier.

Figure 30:
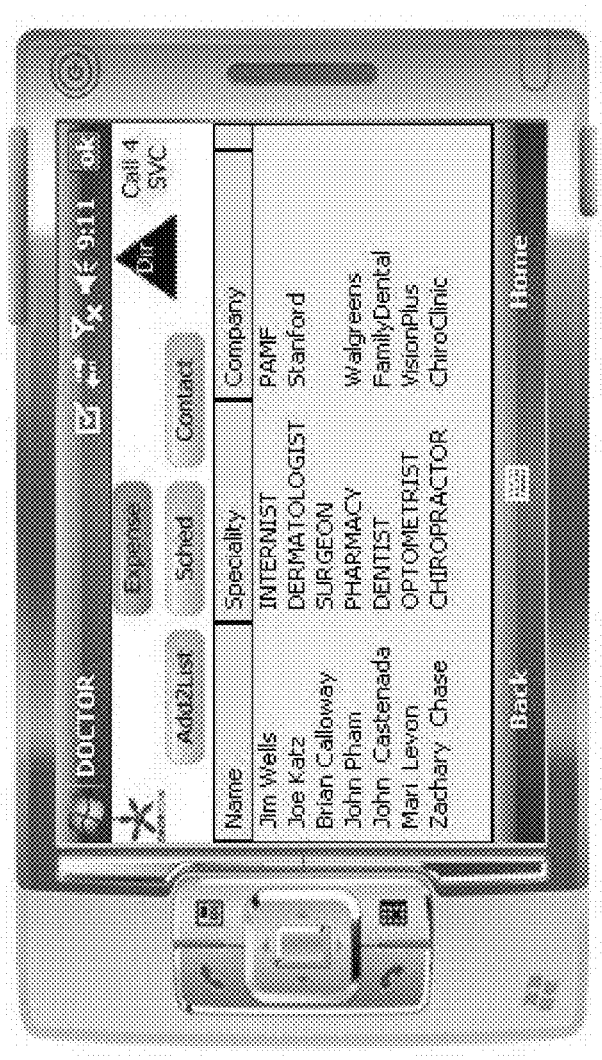
FIG. 30 illustrates a screen in which a user is able to view all medical contacts and perform key functions.
Figure 31A:
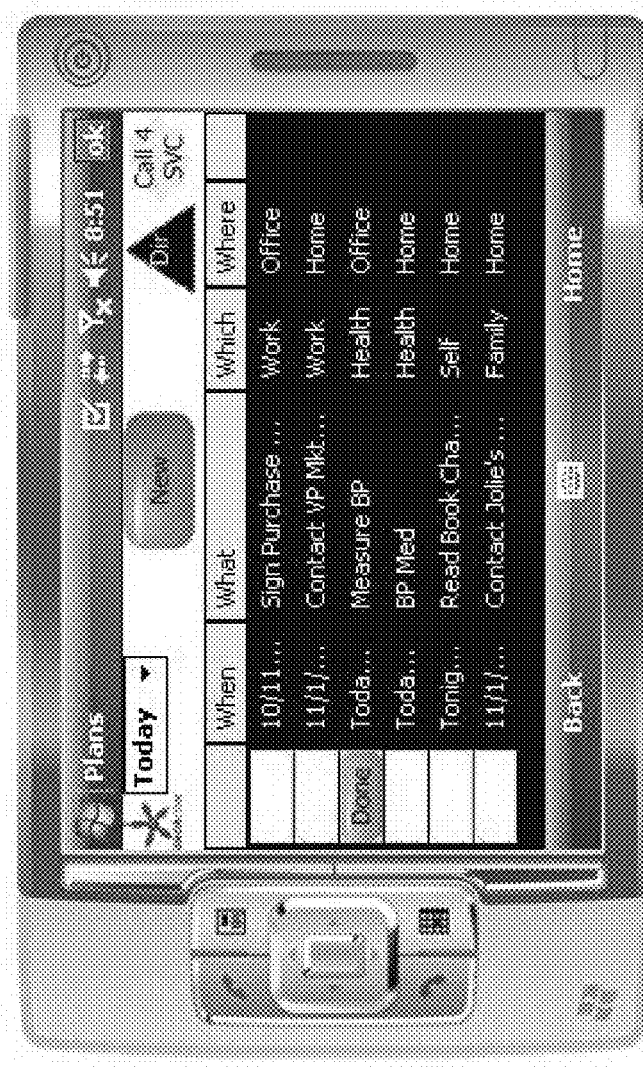
FIG. 31A illustrates a screen in which a user is able to setup, view, update, and track plans.
Figure 31B:
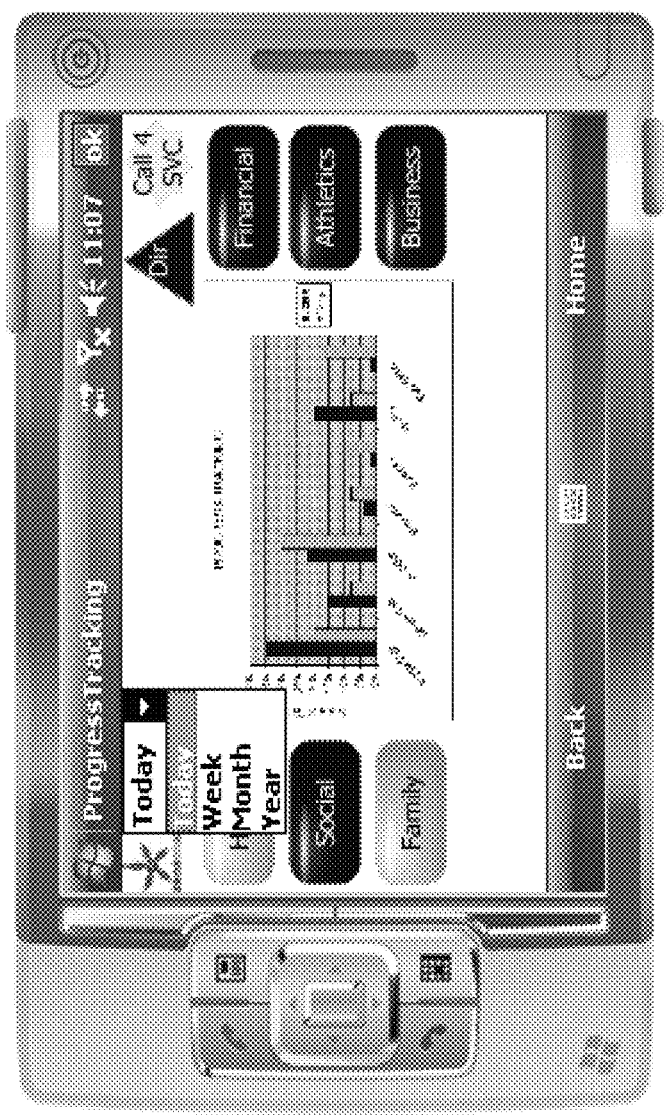
FIG. 31B illustrates a screen in which the user can view progress tracking for tasks in specific categories or time grouping.

FIG. 30 illustrates a screen in which a user is able to view all medical contacts and perform key tasks in one step. FIG. 31A illustrates a screen in which a user is able to setup, view, update, and track plans. When a task is completed, automatically by the system in case of a machine-tracked task or manually by the user, the word DONE appears on the line and the task is assumed to be complete. Progress on scheduled plans is then monitored by this data. FIG. 31B illustrates a screen in which the user can view progress tracking for tasks in specific categories or time grouping.

Figure 32:
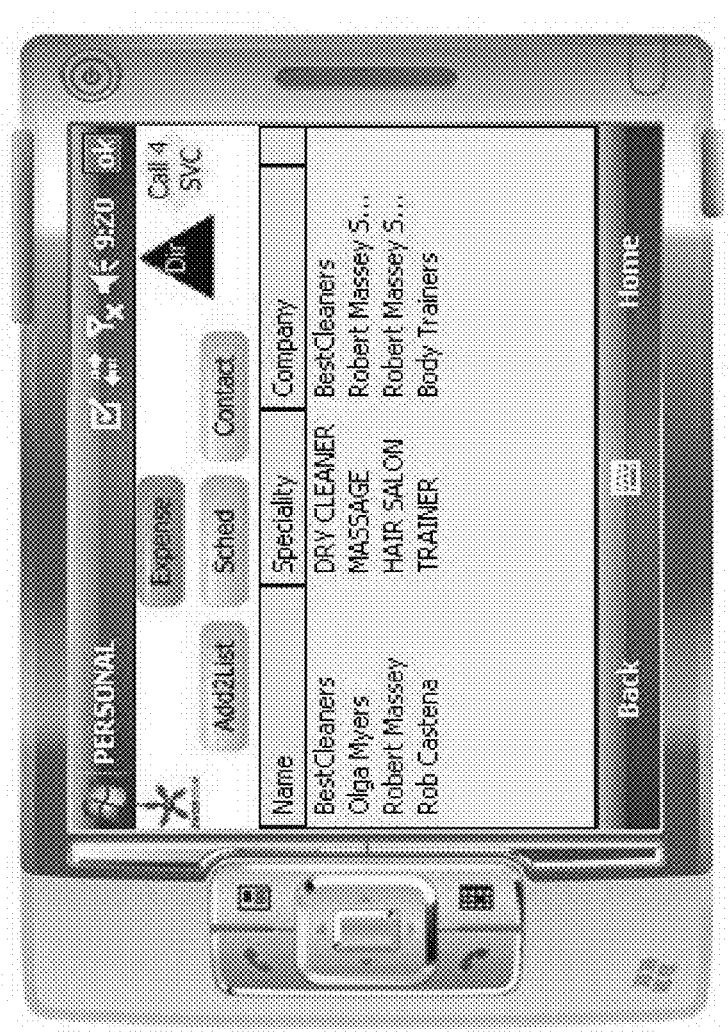
FIG. 32 illustrates a screen in which a user is able to setup, automatically schedule and contact multiple classes of personal services and expense costs.
Figure 33:
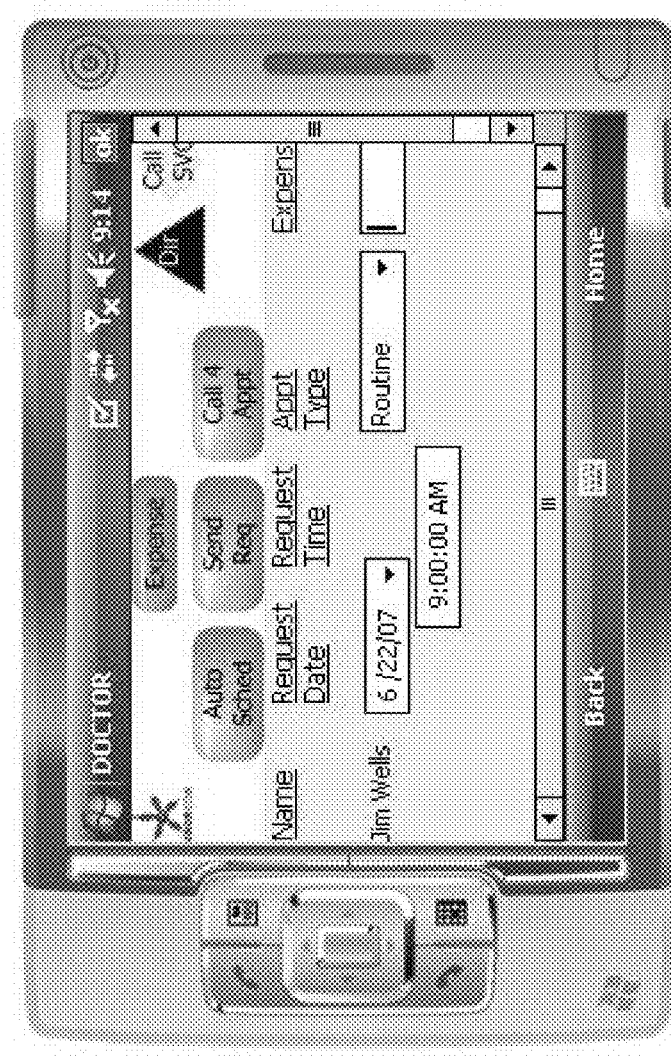
FIG. 33 illustrates a screen in which a user is able to setup multiple classes of automated appointments and expense costs.
Figure 34:
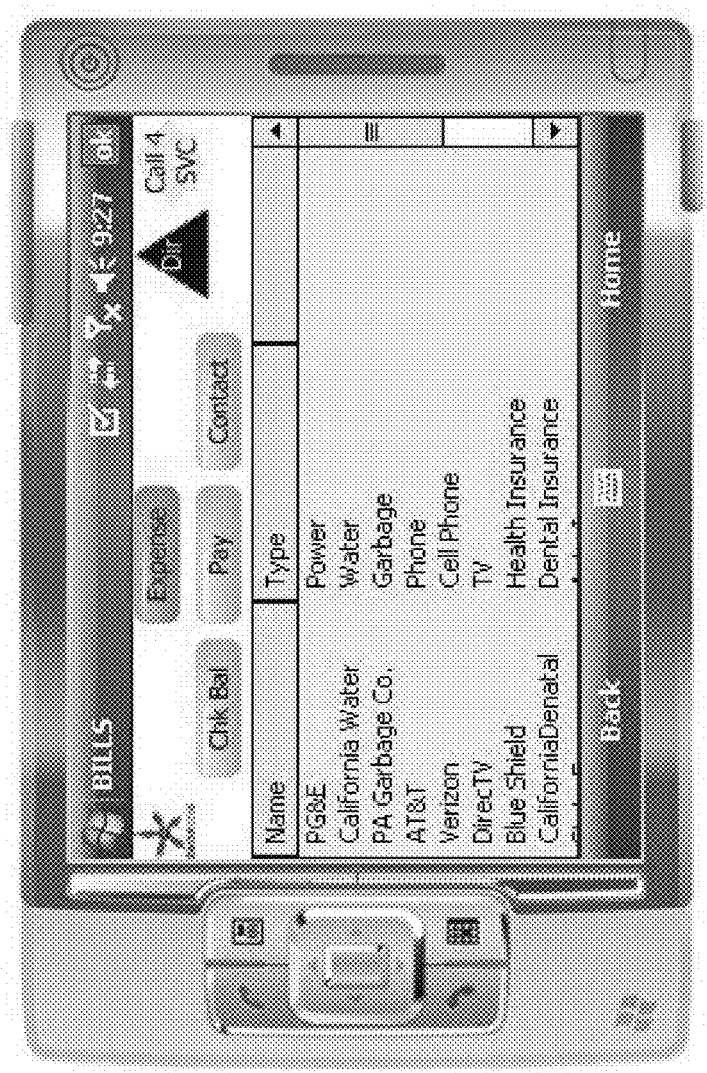
FIG. 34 illustrates a screen in which a user is able to manage bills and expense costs.

FIG. 32 illustrates how a user is able to setup and automatically schedule and contact multiple classes of personal services and expense costs. FIG. 33 illustrates how a user is able to setup multiple classes of automated appointments and expense costs. FIG. 34 illustrates how a user is able to manage bills and expense costs.

Figure 35:
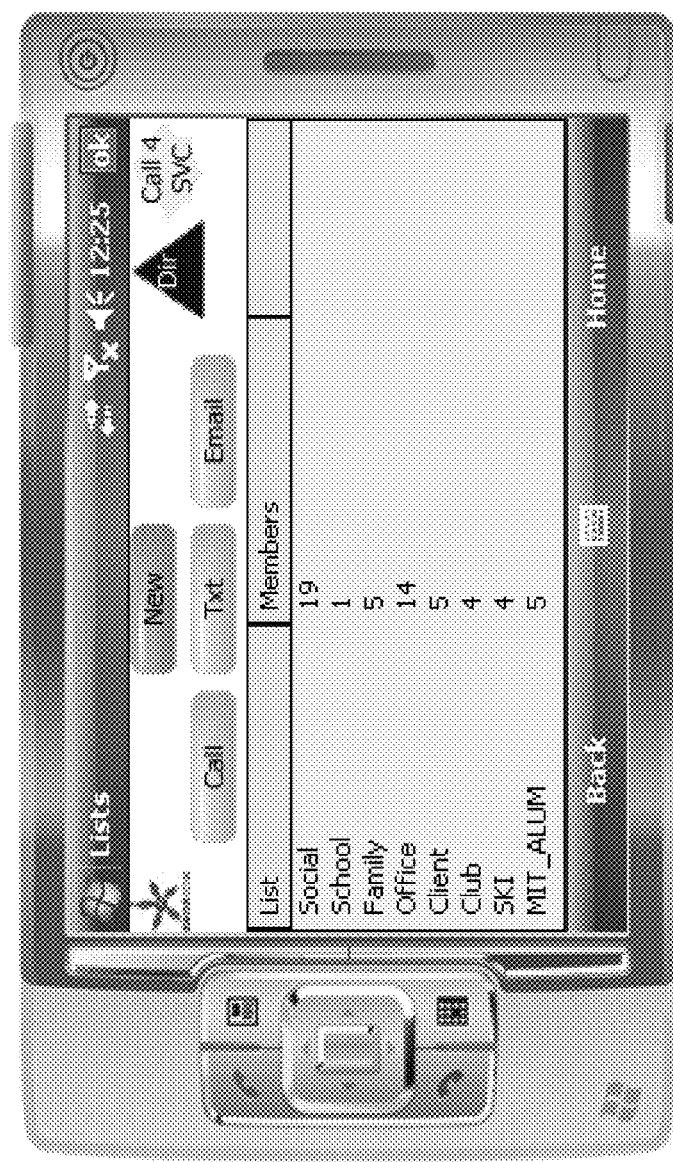
FIG. 35 illustrates a screen in which a user is able to set up, automatically contact, manage personal lists.

Automatic management of lists such as Christmas list, college alumni list, etc. is easily managed in this system. The directory collects information on various relationships and the device is able to setup lists based on specific user-defined properties found in the directory as well as via direct user input. The UI allows the generation of lists and a one step method of contacting people on the list through phone, messaging or email. In the case of voice calls, the system allows for the user to record a message. In one embodiment, the device calls all people on the list sequentially and the user talks on the phone, leaves a voice message, or leaves a voice message automatically with the contents of the pre-recorded message. FIG. 35 illustrates how a user is able to set up, automatically contact, and manage lists and relationships.

One of the automated tasks performed by the Automated Assistant is proactive security management. This level of security is offered through the information collected through the mobile device and available to the system about the user and his current and anticipated activities. The device is able to detect circumstances that are not on the regular time/space schedule or within the preference files of the owner of the device. Having a direct link between the location and temporal information of the TIBIS engine introduced earlier, the device generates a security level for the present time. Upon changes in any number of these parameters, the device generates a higher alert level. At each new alert level, the device is enabled to perform additional security checks that are only known to the owner of the device. The increased physical information and biological checks are then introduced and in case of a failure, the options predetermined by the user at setup time are undertaken. In one circumstance, the device goes into shutdown and locks the data on the device temporarily so it cannot be accessed but still available to recover. In another circumstance, it uploads the contents of the updated elements on the device on the network space which is assigned to the client and performs an immediate I/O access shutdown. In another circumstance it is to wipe out all the memory on the device via making it unreadable and unrecoverable by writing a predetermined security pattern on all accessible memory locations. In any of the circumstances the user or other properly designated authorities can be notified of the location coordinates and type of security breach via the cellular network or any available wide-area wireless network available to the device. In case of severe security alert levels, the panic signal is sent to the cellular network server whereby the notifications are then submitted from that access point and the device is rendered inoperable immediately while downloading its latest information to the network center server.

In another implementation, other parameters such as body temperature, moisture, heart-rate, etc. (depending on the capabilities of the device) are also monitored to protect against cases where the authorized user is under duress and is forced to provide the biological identification against his consent. When such conditions are detected and alarm is raised and either access is denied or access is granted but authorities are alerted or access is granted in a revised alarm mode with limited features or special provisions which allows the apparent operation of the device but the data provided access to is diverted to a "clone" database. The clone database can be similar to the actual database but without the ability to modify the real database, or the clone database includes fake data. The choice of action depends on the type of access requested and organizational and user preferences.

Figure 36:
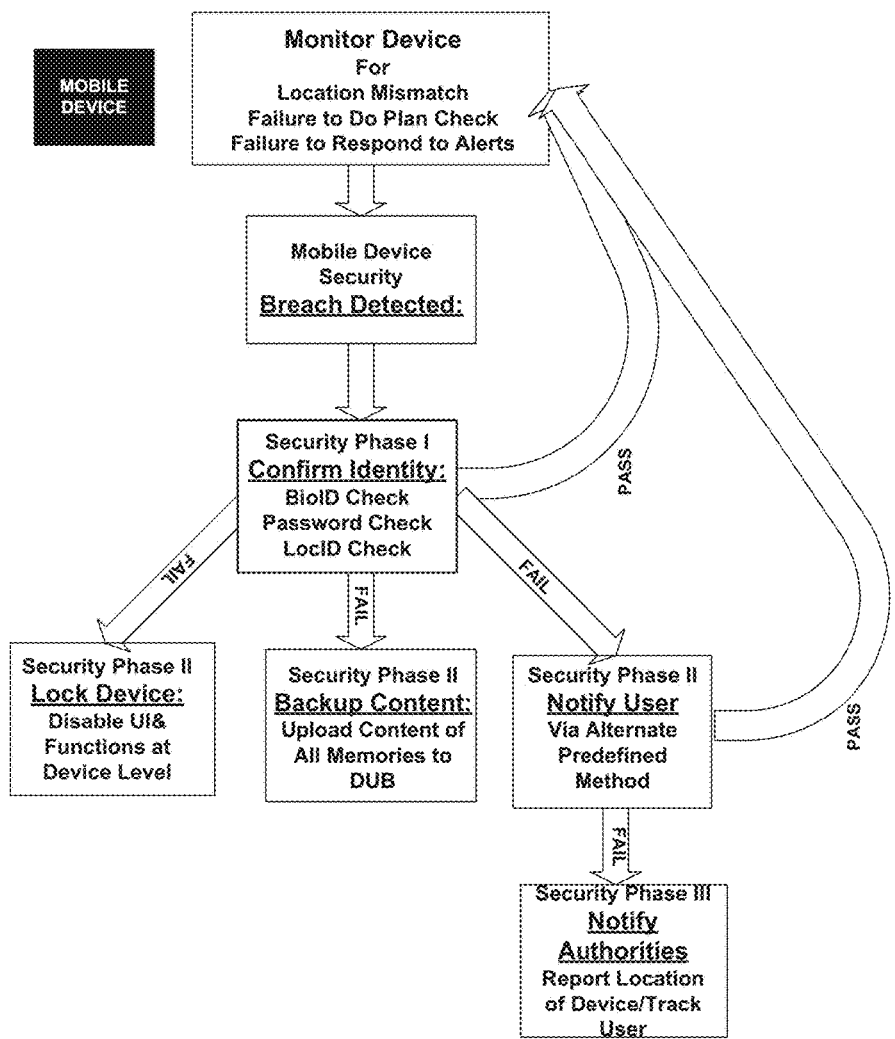
FIG. 36 shows an embodiment of security processes for a mobile device.

In one embodiment the device is continuously monitored while in others it is alerted for security breach due to specific events that arise during normal operation while unexpected due to usage protocol. The emergency procedure can be triggered by the user in an emergency. One embodiment's simplified top-level algorithm is depicted in FIG. 36, which shows security processes for a mobile device.

The system allows for users to define more complex services based on a combination of the automated services described earlier. The following is an example of one such automated service: The user enters prescription details into the device, or the information is automatically downloaded from user's medical record. The system orders the prescription through the pharmacy by automated call or through website. It confirms the availability of prescription (by automated check with pharmacy or receiving notification from pharmacy) and sends alert to user for pick up or arranges automated delivery. The system keeps track of refill information and automatically places refill order a few days before due date, it prompts the user for re-order approval if desired. The system saves and tracks all prescriptions taken in "past/tracking" metrics and expenses cost. The user has full access to prescription usage history. The system notifies user of any possible reactions of medications based on a search on a partner's medicine pairings directory. One of the optional modules for the mobile device is for health monitoring. If such an option is used, the system gathers vital signs and keeps track of this information along with the prescription usage history so the user and other health professionals have access to this information. The system transmits this information to the designated healthcare professional or emergency service in case of an adverse reaction or upon pre-determined schedule.

The Automated Assistant system is enabled via a customized operating environment. This operating environment for mobile and electronic devices allows for significant user input in the final appearance and functionality of user buttons within the use-case scenarios for a given device configuration.

The inventions described in this section, shown specifically for an advanced mobile communication device, are applicable to any mobile or stationary consumer electronic device which is predominately used to capture, send/receive, or access information and content.

There is an extended set of functionalities available to the user through direct hardware mapping of "button functionality" as well as "button locality" and "button visual and audio characteristics" so that without increased delay or additional code required for OS to accommodate such cases and without increasing power consumption, the user is able to "define" the operation and function of the buttons.

In one embodiment, part of the rendering of images of user display is implemented via programmable logic that is reconfigurable at the factory as well as in post-assembly stage that can add additional modes for the user views and options that the user is able to program directly and on the fly through the use of extended UI memory area and the GSM control blocks.

In one embodiment of this invention, the user is able to choose up to 15 different functional buttons to be displayed for each page of the interface. Each user button performs a specific user function and in some cases directs the user to additional choices/pages. The user is able to modify the placement, looks as well as the functionality associated with those buttons chosen from a larger set of available functional options that the device is designed to perform depending on user's need at the time. These buttons are later able to be reprogrammed as user's needs change. In addition to static buttons, the user is also able to choose dynamic buttons as well as other graphical or user-generated icons, contents, avatars to enable user access as well as provide for customization of the device environment.

Currently users are able to change only superficial levels of interface in a limited fashion such as colors and ringtones. The actual user interface parameters are dictated by standardized operating systems that for the majority resemble identical environments for everyone as in the personal computer desktop market. As the OS used on the device changes so does the basic parameters of the interface.

In this technique, the user is able to change the look and feel of the device based on a set of customized functionality the device is designed to run while providing for additional functions and buttons as new modules and programs are added to the system.

By making the user interface a primary "functionality" of the device and not part of a standardized operating system, this technique decouples the standard directory structure and file system from the user interface of the electronic device. The device user interface is designed for consumer mobile applications in its preferred embodiment and as such is optimized to minimize the number of steps necessary for performing functions on the go. By allowing the user to program the functions and sequence of buttons for their specific use-cases, significant time savings is achieved in performing user functions as well as a longer battery life can be achieved due to less time used on power-hungry display time when allowing the user to reach their most frequently used functionality by going through the minimum number of key strokes or touches or vice commands.

Figure 37:
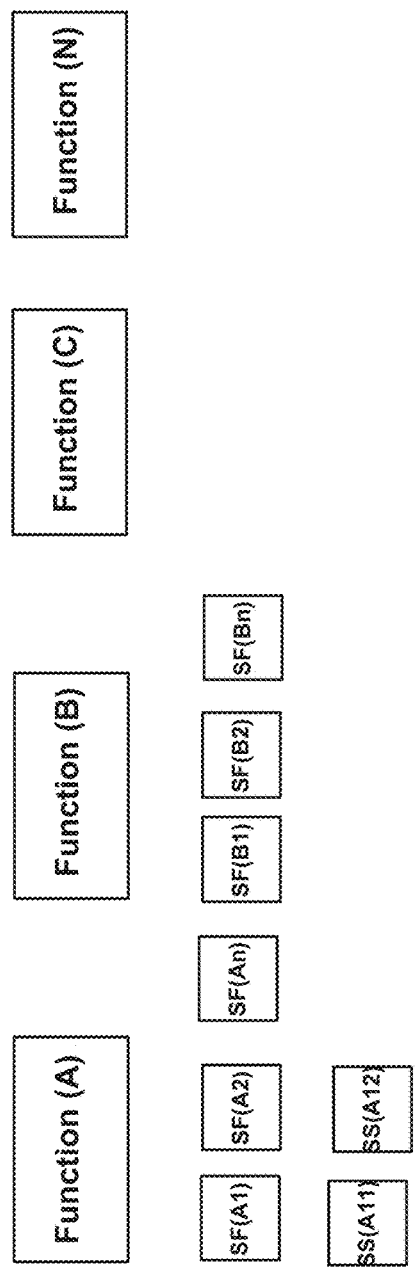
FIG. 37 shows multiple levels of functions in the user environment hierarchy.

FIG. 37 shows multiple levels of functions in the user environment hierarchy. In one embodiment, the functional options are viewable in a directory structure, site map or visual button display. In each case the user reviews the list as presented and prioritizes the functional choices to appear at each level of user interface. Additionally, the user can predefine the method of activation for each functional button (e.g., voice, touch, secure-touch, visual id, just to name a few).

Additional choices are available to the user depending on the specific contents of the page allowing for the same level of customization on an inter-page bases as well as the intra-page case shown above.

In one embodiment the user environment is presented to the user at the lowest level of the software stack; as a result, the changes made are robust and immediately available for use. This is in contrast to changes that need to take affect at the higher levels of abstraction. The performance and the corresponding mapping to device functionality are most efficient in this case.

Figure 38:
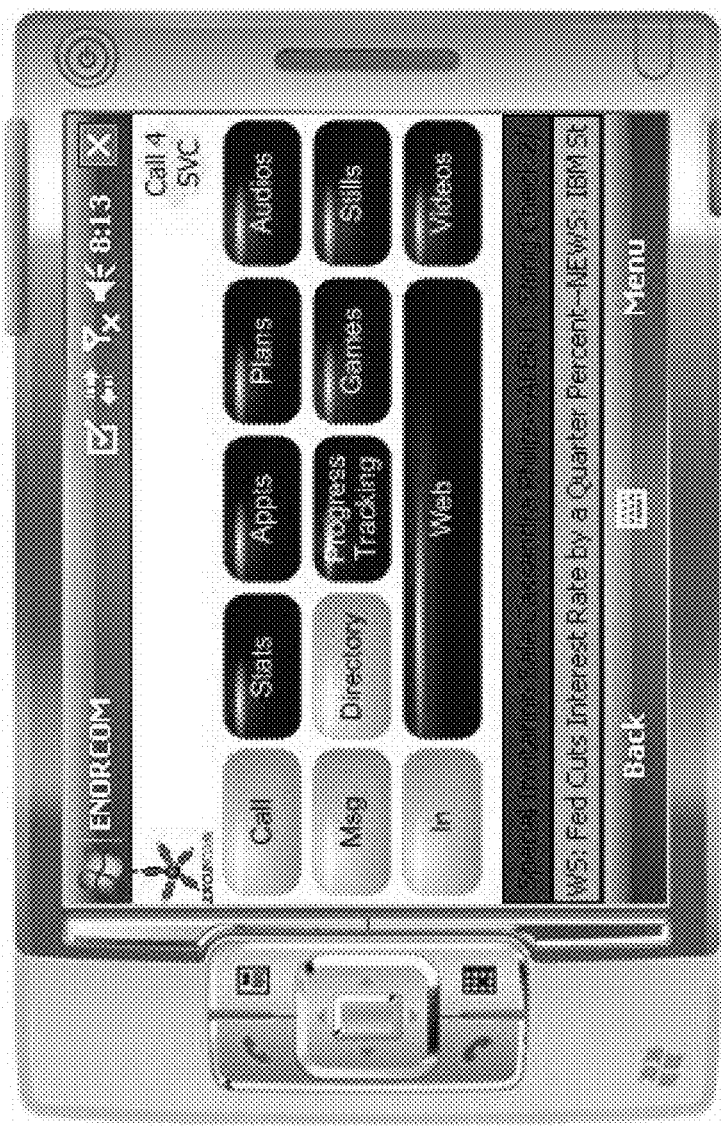
FIG. 38 shows a unified top-level view in a UI of a mobile device.

Examples of some features of the UI are shown in the screens of an advanced mobile device illustrated in FIGS. 38 through 41. FIG. 38 shows a unified top-level view in a UI of a mobile device. More specifically, FIG. 38 shows that the user has access to up to 15 customizable buttons. The user has access to all communication, user content, and events in one unified view on one screen simultaneously. In addition, the user can access relevant statistics, current schedule of activities and future plans from one screen with one click, as well as view progress tracking of plan.

Figure 39:
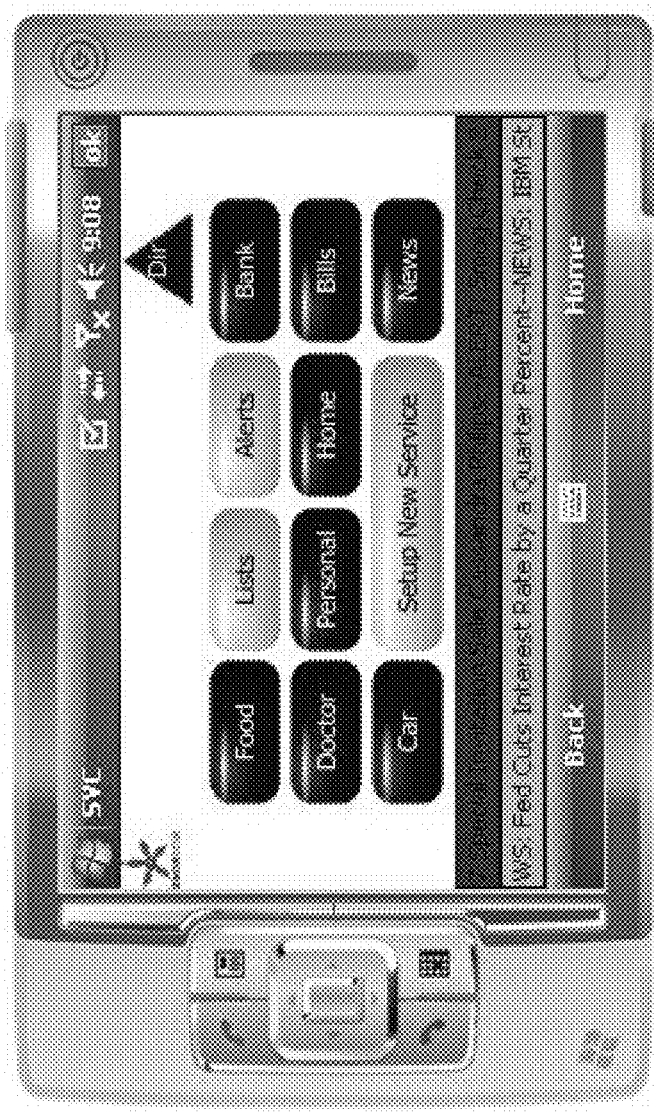
FIG. 39 shows a customized "call for service" menu.

After clicking on "call4svc", the user gets access to a number of services simultaneously. These services and their implementations are described earlier in this document. The user can choose the services of interest and how they appear on the screen. The following are demonstrative samples:

FIG. 39 shows a customized call for service menu. The user can view multiple service choices simultaneously and can access any service in one-step while keeping abreast of critical machine generated alerts and news bulletins. Under each category of service, the user is able to define the particular service, create appropriate shortcuts for such services which are directly hardwired into the device for robust performance. These services form the basis of Event Repository shown in FIG. 16 and managed by the GSM block intelligence.

As can be seen, the user can program additional conditions for "specific event" notifications such as urgent messages or occurrence as well as ongoing news and selected advertising feeds "at users' discretion" to be displayed in various forms upon the user interface.

The Core engine implementation has removed all the dependencies and traditional OS management tasks from its functionality and it has created a large array of UI related functional hardware blocks such as the UI register file and memory containing various user interfaces and their modifications in reconfigurable and hardware mapped memory blocks. The Alert and News bars can be closed on any screen or all of them.

Figure 40:
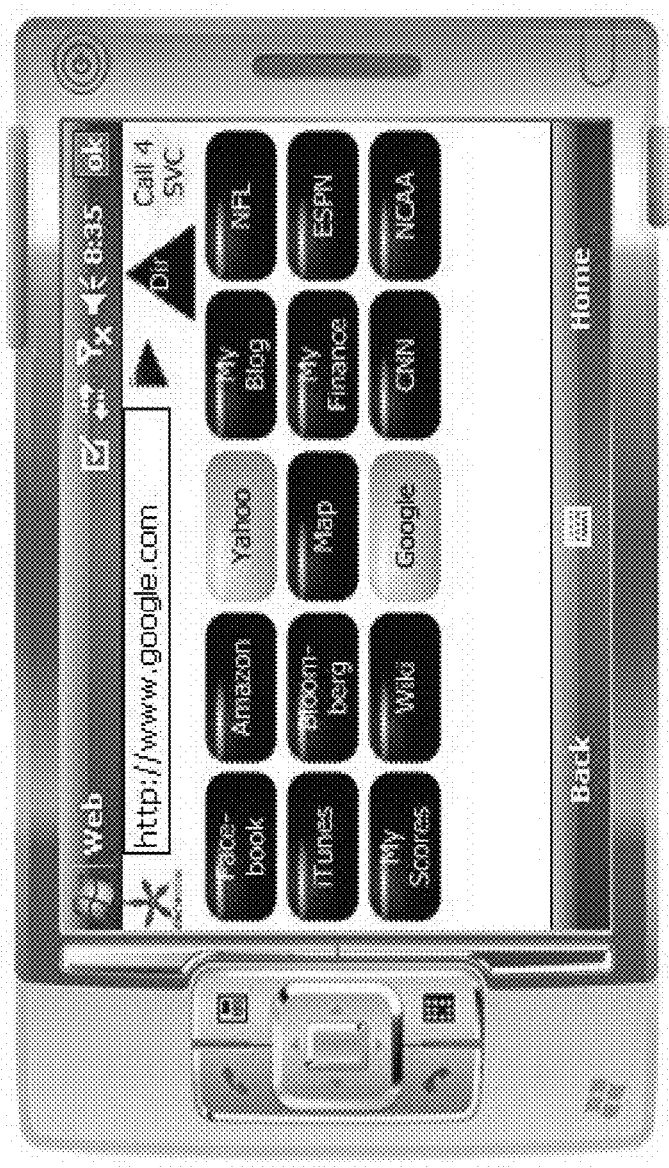
FIG. 40 shows a screen for customized website access.

FIG. 40 shows a screen for customized website access. In this embodiment, the user is able to access up to 15 user-programmable one-touch access buttons to websites or personal pages.

The Automated Mobile Assistant System operates as a central location for access and management of all communication services of interest to the user—including land-line and mobile voice mail, email, and messaging services. The system provides the user access to all incoming voice/text message and emails no matter where they were sent to (e.g. home or office landline mailbox or mobile mailbox. The user selects the mailboxes to be included in the system. This capability is used by the active secretary to allow the user unified access to all messaging that is of interest to the user. The user can manage all messaging channels from the mobile device.

The voice, MMS, and email accounts to be monitored are initially registered on the system by the user and proper authorizations are established (e.g. password, etc.) The system allows for customized combinations of push and pull transmit and receipt mechanisms. Pull services download the requested messages to the device at time intervals specified by the user. Push services push messages onto the device as they are received. The system allows for designation of specific attributes in the messages to trigger the message to be pushed onto the device and an alert to be generated and sent to the user. The designation can include a specified phone number, email address, email account, topic or key word in the message, etc. Any of these designated messages will be pushed onto the device while all other messages will be treated by the normal policy set by the user.

The system acts as a personal gateway for all messages for the user and manages and routes messages according to user requirements and specification.

In one embodiment, the designated phone numbers are handled differently according to the location of the mobile device and user context. For example, when the mobile device is at a location away from home, home calls are routed to the voice message center. When the mobile device is in the home location, home voice calls are routed to the home phone. In another example, when on vacation the system routes office calls to the mobile device but when at home in the evening, it routes them directly to voice mail. In another example, all calls to the mobile device are sent directly to voice mail when user is involved with a particular activity (e.g. at certain meetings) or in a particular location/establishment such as a restaurant, or a theatre without the need to silence the device each time. All such selections are based on initial user selection.

In this invention, multimedia messages are embedded in voice communications or messaging. A user can leave a voice message and include a multimedia file in the message. This is accomplished in any of several ways. In the case of a VOIP call, the voice transmission is done using data transmission technologies. In this case, the transmitting device being the aforementioned mobile device can use the captured or generated multimedia content to attach to such call. In case of pure cellular call scenarios where the call is going through cellular base stations as well as potentially a number of VOIP land connections, as long as data-capable digital networks are used, the multimedia transmission is done through the data channel and the data is transmitted along with the call.

Figure 41:
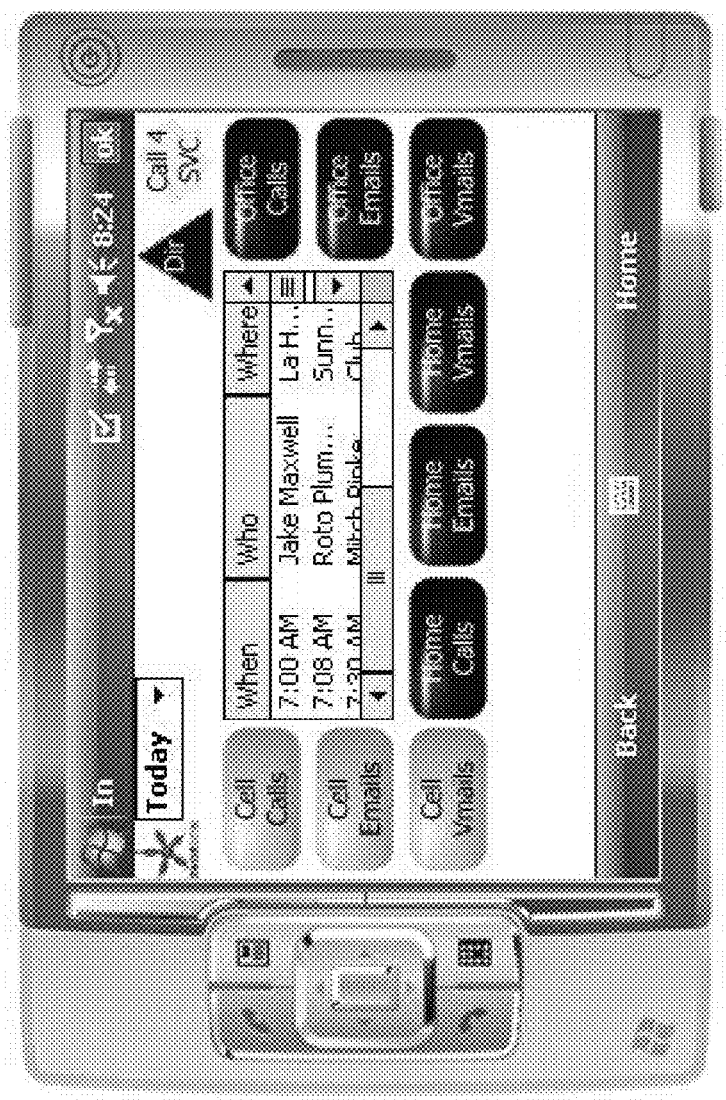
FIG. 41 shows a unified communication messaging screen on a mobile device.

FIG. 41 shows an example of a unified communication messaging view on a mobile device. The user has access to all mobile and landline calls, emails, and voicemails in one place and can access them with one click of the assigned hot-buttons. Pressing any hot button will display the details of the messages from the given source.

In this system, a Location ID is included in every incoming call. Currently, every phone call (whether landline or mobile) is enabled with a Caller ID service which provides the phone number where the call was originated from and the subscriber's name on the billing statement. The Caller ID service is provided by the landline phone service provider, based on the caller number received by the telephone switch. This data is then modulated as a data stream and usually sent between the first and second rings before the phone is picked up. The caller's name determined by the service at the terminating central office by looking up service provider's or third-party databases and this information is sent along with the phone number information to the recipient.

Figure 42:
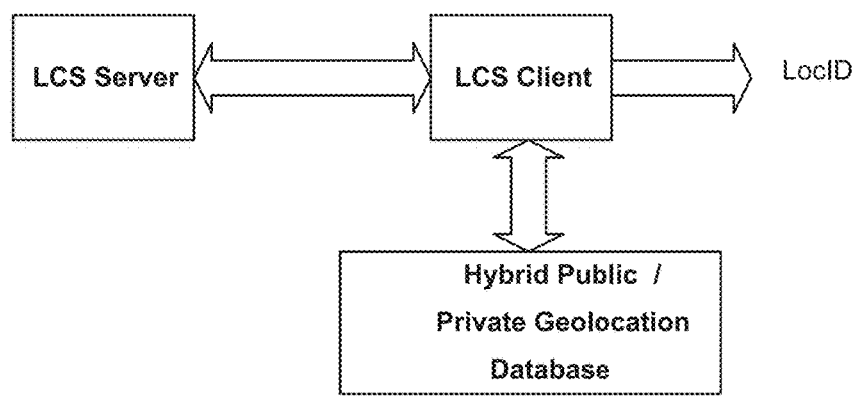
FIG. 42 shows the generation of Location ID.

In this system, in addition to Caller ID, each call is enabled with a Location ID, which identifies the location where the call originated from. For land-line based calls, location is fixed and is generally understood from the Caller ID information. For mobile based calls, the Caller ID information identifies the person who originated the call, but does not have information about the location where the call was originated from. The Location ID is derived from the location information available from the network and/or device. The Automatic Location Information (ALI) can be derived from network-based data, or network-assisted GPS, or directly from GPS data available on the phone, depending on the device and network capabilities. Referring to FIG. 42, the ALI is requested by the Location Service (LCS) client from the Public Land Mobile Network (PLMN) LCS server. The location is translated to a logical location that is of value to the user. Public and private databases, including geo-location directories are used to translate the location to a meaningful physical location. Depending on the precision of the location, the location can be as wide as a geographical location such as a city, or a neighborhood, or it can be as precise as a particular location such as a business establishment.

The Location ID is sent to the user as a prefix or post-fix to the phone Caller ID, or it is sent intermittently with the Caller ID (Caller ID, LocID), or is embedded in the name field along with the name. At the user's personal network access or device, the LocID is translated to a location that is personal to the user based on personal information of the user.

The user has the convenience of using one mobile device to send and receive calls on multiple phone numbers. This can be accomplished by including multiple subscriber information on the subscriber identity module.

The user has the ability to use one phone number attached to several different mobile phones. This would be the case when for a variety of reasons a user may want to receive mobile calls on different devices. A user of the aforementioned customized mobile device may elect to have more than one detachable communication module. Depending on which module the user is carrying, he may want to receive calls on that device. This invention enables usage models such as additional built-in cellular communication functionality within a vehicle, boat, room, etc. Once in those locations, the built-in device which has the same phone number as the main device is used with access to the same user content. This provides additional convenience and has added benefit of not using the main communication device's battery. The devices have to be registered on the system appropriately such that outgoing calls are accounted for properly, and incoming calls are routed appropriately by the mobile service center (MSC) on the wireless network. In most mobile systems, the network includes location registries to keep track of mobile devices on the system. For example, the home location registry (HLR) keeps track of devices on the network in a given geographical area. The devices are identified by unique identifiers that describe the specific physical device as well as the phone number associated with that device. Under normal circumstances, each phone number is uniquely associated with a device. In this invention, a phone number is allowed to be associated with multiple "cloned" devices. All cloned devices have to be uniquely identified as clones so that at any point in time, only one device can initiate a phone call or receive an incoming call. In a mobile network, each mobile device is identified with two unique numbers; the mobile identification number (MIN), which corresponds to the assigned phone number, and the electronic serial number (ESN). In one embodiment, the cloned identifier is embedded in the phone's ESN. The ESN is a 32-bit number that consists of an 18-bit serial number, an 8-bit manufacturer code, and 6 reserved bits. In one embodiment, 2 of the reserved bits are used to indicate up to 3 additional cloned devices: 00→no clones, 01→clone 1, 10→clone2, 11→clone 3.

Additional bits can be used if more clones are needed but for most practical cases up to 3 clones is sufficient. The ESN is generally set at the factory but the clone bits are made to be modified in the field to allow for dynamic programming of the clones as needed. This is generally done along with the assignment of the mobile phone number to the device.

When incoming calls come in, the network looks up the location of all the mobiles in the home database which have the same phone number associated with them, this includes all the cloned devices. The paging signal is sent to all cell sites where the device or any of its clones are registered. The network routes the calls to all registered mobiles which are on at the time and answer the page signal. Once the call is picked up by one of the mobile devices, the call is routed to that mobile and the conversation/data transfer is initiated. The call to all other mobiles is dropped and those mobile devices are deactivated (i.e. they can not initiate or receive any calls). Once the call is finished and the active mobile device goes back into idle mode, all other mobile devices are activated and go back to the idle state. Once one of the mobiles initiates a call, the other cloned devices are deactivated and stay deactivated until the call is finished at which time they all go back to the idle mode. This illustrates the implementation in one embodiment. Provisions can be made on the network to implement other embodiments of this invention to enable the user to assign the clone identifier numbers on the fly.

Various examples of the present disclosure are now discussed. A. A personal mobile device for communication and organization, comprising:

a core engine to coordinate operations of the mobile device, including communication and organization functions; and a plurality of modules coupled to the core engine, each of the modules dedicated to perform a different one of a plurality of classes of user-level functionality of the mobile device, each said module including a processing element and memory dedicated for use by said module.

B. A personal mobile device as recited in example A, wherein the plurality of classes of user-level functionality comprise two or more from the group consisting of: audio input/output, telecommunication, audio recording, image capture, image recording.

C. A personal mobile device as recited in the above examples, wherein the mobile device has user-customizable functionality.

D. A personal mobile device as recited in the above examples, wherein at least one of the plurality of modules is operable independently of the core engine and all other modules of the plurality of modules.

E. A personal mobile device as recited in the above examples, wherein the plurality of modules and the core engine collectively form a multi-function mobile electronic system.

F. A personal mobile device as recited in the above examples, wherein the plurality of modules share information with and/or through the core engine.

G. A personal mobile device as recited in the above examples, wherein the shared information comprises tag information associated with content.

H. A personal mobile device as recited in the above examples, wherein the plurality of modules share a data exchange block.

I. A personal mobile device as recited in the above examples, wherein the plurality of modules are coupled to the core engine via shared connectors.

J. A personal mobile device as recited in the above examples, wherein the mobile device is configured to have extendable functionality, wherein the functionality of the mobile device is extendable by adding one or more additional functionally distinct modules to the mobile device.

K. A personal mobile device as recited in the above examples, wherein the mobile device has a user-customizable physical form factor.

L. A personal mobile device as recited in the above examples, further comprising a chassis which mounts, at least partially encloses or holds together of the plurality of modules, wherein the plurality of modules are detachable from the chassis.

M. A personal mobile device as recited in the above examples, further comprising a detachable display device removably coupled to the core engine.

N. A personal mobile device as recited in the above examples, further comprising a plurality of detachable display devices removably coupled to the core engine.

O. A personal mobile device as recited in the above examples, wherein the mobile device can be shared by a plurality of users, each using a separate one of the plurality of detachable displays.

P. A personal mobile device as recited in the above examples, wherein the plurality of modules comprise a plurality of independently operable display devices which are combinable to form a single larger display device for the mobile device.

Q. A personal mobile device for communication and organization, comprising a core engine to coordinate operations of the mobile device, including communication and organization functions; and a plurality of modules coupled to the core engine via shared connectors, each of the modules dedicated to perform a different one of a plurality of classes of functionality of the mobile device, each said module including a processing element and memory dedicated for use by said module, wherein the plurality of modules share information with and/or through the core engine, wherein the shared information comprises tag information associated with content; and a chassis which mounts, at least partially encloses or holds together the plurality of modules, wherein the plurality of modules are detachable from the chassis, and wherein at least one of the plurality of modules is operable independently of the core engine and all other modules of the plurality of modules.

R. A personal mobile device as recited in the above examples, wherein the plurality of classes of functionality comprise two or more from the group consisting of: audio input/output, telecommunication, audio recording, image capture, image recording.

S. A personal mobile device for communication and organization, comprising a core engine to coordinate operations of the mobile device, including communication and organization functions; a plurality of modules coupled to the core engine, each of the modules dedicated to perform a different one of a plurality of classes of functionality of the mobile device, each said module including a processing element and memory dedicated for use by said module; and a detachable intelligent display for communication and/or as access to a mobile device and/or other devices.

T. A method of providing a time-based information system (TIBIS) in a processing system, the method comprising: accessing a memory facility in the processing system; and storing data received by or in at least one of the memory facilities sequentially based on time, according to a defined temporal granularity.

U. A method as recited in the above examples, wherein the processing system is a personal mobile entertainment, organization and communication device.

V. A method as recited in the above examples, wherein the defined temporal granularity is user-defined.

W. A method as recited in the above examples, wherein the defined temporal granularity is machine-defined.

X. A method as recited in the above examples, wherein said method comprises providing temporary storage and organization of event, information tags, or content in user-specified or machine-defined time intervals in a short-term memory.

Y. A method as recited in the above examples, further comprising providing long-term storage and organization of events, information tags, or content in user-specified or machine-defined time intervals in a long-term memory.

Z. A method as recited in the above examples, further comprising preventing modification of data in the long-term memory.

AA. A method as recited in the above examples, wherein the short-term memory is local non-volatile memory of a mobile device.

AB. A method as recited in the above examples, wherein the long-term memory is non-volatile memory of a mobile device.

AC. A method as recited in the above examples, wherein the long-term memory is removable from a mobile device.

AD. A method as recited in the above examples, wherein the long-term memory is non-volatile memory that resides remotely from the mobile device on a network.

AE. A method as recited in the above examples, wherein the method comprises using a multi-category tagging mechanism covering temporal, geographical/location, context as well as user-defined concepts.

AF. A method as recited in the above examples, wherein the method comprises generation, storage and distribution of multi-modal tagging of events in a mobile information device.

AG. A method as recited in the above examples, wherein the method further comprises using hardware-based search and retrieval of information based on the multi-modal tagging.

BA. An example of the present disclosure is a multi-function, mobile electronic system that includes a housing, a plurality of functionally distinct, independently operable sub-systems in the housing, at least two of the sub-systems comprising a processing element and a memory element operably connected to the processing element, the processing element and the memory element for each sub-system being dedicated to the function of the respective processing element and memory element.

BB. An example as recited above including a master core engine to control data exchange between the sub-systems.

BC. An example as recited above including a data exchange block under control of the master core engine.

BD. An example as recited above wherein the sub-systems communicate with the master core engine through control bits and content metadata.

BE. An example as recited above wherein the master core engine includes dedicated hardware.

BF. An example as recited above in wherein the processing and memory elements are optimized for each individual sub-system. The memory elements of different sub-systems can lend and borrow physical memory space to and from each other. The sub-systems can be selectively activated to customize functionality of the system. The sub-systems can be selected at an assembly/packaging stage. The sub-systems can provide functionality independent of wireless technology or wireless service provider, or both. The sub-systems can be removably attached to the housing such that the one sub-system is removable from the housing.

BG. An example as stated above including the one sub-system to provide wireless connectivity and can be removed and replaced to upgrade wireless communication technology or change wireless service provider without changing the mobile system or the other sub-systems.

BH. An example as stated above, wherein the sub-systems can be directed connected to each other.

BH. An example as stated above, wherein the sub-systems include at least one additional display modules combined giving large display for mobile system.

BI. An example as stated above, wherein the sub-systems include a plurality of display modules that include a closed configuration to provide a small display and an open configuration to provide a large display. The closed configuration can include folded display modules. The closed configuration can include stacked display modules. The sub-systems can include a plurality of detachable memory units in a functional sub-system.

BJ. An example as stated above, wherein the sub-systems include a sub-system to perform a function from a group consisting of health monitoring, biological sensing, and environmental sensing.

BK. An example as stated above, wherein at least one sub-system is a detachable intelligent display comprising display electronics and a wired or wireless connection to another sub-system.

BL. An example as stated above, wherein each sub-system is independently operable.

BM. An example of the present disclosure can include a multi-function, mobile electronic system that includes a support and a plurality of sub-systems selectively attached to the support to provide customizable form factor. The plurality of sub-systems can be selected at assembly to form a round or polygonal system. The sub-systems can be detachable by a user to customize the form factor. The support can define a cylindrical disk form factor and has a side connector channel to receive sub-systems therein. The sub-systems can include connectors in top and bottom surfaces thereof such that other sub-systems can connect thereto. The sub-systems can include connectors in top and bottom surfaces thereof such that other sub-systems can connect thereto. The form factor can creates a device to be worn on the body of the user with a least one sub-system extending outwardly for use as a phone microphone and speaker.

BN. An example can include an electronic display that includes display electronics, a connection to a mobile device or other electronic device. The display can be a detached intelligent display comprising of the display electronics and a wired or wireless connection to a mobile device or other electronic device. The mobile device can have ability to connect to any compatible display unit other than its own. The detached displays can attach to each other to form larger display. Each display unit has user I/O capability and can capture user input and transmit to a main unit. The display can have the ability to have mobile or other electronic device shared by multiple users. In an example, the display units receive identical information sent from the mobile device to all display units. In an example, each display unit provides its user access to the main device and its capabilities independent of other users. In an example, each display unit's authorization and access level is assigned by main unit at registration. In an example, the display unit has capability to connect to broadband internet gateway, enabling display unit Internet access. In an example, the display unit has its own battery. In an example, the display unit supplies power to mobile device if needed. In an example, the mobile device has ability to connect to any compatible display unit other than its own. In an example, detached displays attach to form larger display. In an example, each display unit's authorization and access level is assigned by main unit at registration. In an example, a display unit has capability to connect to broadband internet gateway, enabling display unit Internet access.

An example of the present disclosure can include a data exchange device including a core engine, a data exchange block operably coupled to the core engine; and multiple connectors operably connected to the core engine and being connectable to stand-alone mobile devices or modules to exchange information and expand functionality.

The techniques introduced above can be implemented in software and/or firmware in conjunction with programmable circuitry, or entirely in special-purpose hardwired circuitry, or in a combination of such embodiments. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A programmable management method for a mobile device, the method comprising:
   proactively monitoring current and anticipated values of:
      user location, activity, proximity to other users or events or locations, planned activities, usage pattern, biological sensory information, environmental sensory information, or combinations thereof, wherein said proactive monitoring is performed while the mobile device is in operation and without request for user input;
   initiating security checks based on detecting a discrepancy between said current and anticipated values, and wherein upon failure of said security checks, performing a security procedure wherein the user is not alerted to said security procedure initiation, wherein said procedure includes biological and environmental sensory measurements to identify cases with an authorized user under duress, wherein duress is detected upon collected sensory data mismatching an expected value of said data, and upon said detection, restricting access to said mobile device to a predetermined mode in response to duress.

2. The method of claim 1, wherein said security check includes a hybrid security authentication mechanism comprising a combination of a biological identification and a passkey, wherein said passkey includes a predetermined pattern of biological inputs including finger print, iris pattern, eye blinks or combinations thereof entered horizontally, vertically or at various angles, each in a specific time pattern, spatial pattern, or combinations thereof.

3. The method of claim 1, wherein said method is performed on said mobile device, on a local or remote server to which the mobile device connects or combinations thereof.

4. The method of claim 1, wherein said security procedure includes establishing the identity of the current user, a device locking operation, a content backup operation, an owner notification operation, including notifying another party, tracking the location of mobile device, collecting data including activity detected on the mobile device, proximity to other users or locations, capturing environmental and sensory information, user's photograph, reporting said information to owner or another party, or combinations thereof.

5. The method of claim 1, wherein duress mode access includes disabling access to user data and presenting cloned data to the user, and wherein cloned data is correct data, but the changes are not saved as changes to user information or data.

6. The method of claim 4, further, uploading captured information locally or remotely, erasing said local information, or combinations thereof.

7. A programmable management method for an electronic system, the method comprising:
    storing one or more of identifications associated with an authorized user, and further, monitoring a sequence of identification inputs,
    authenticating a user on the system upon detecting a match between the identification input entries and authorized identifications stored in memory and
    wherein authentication is further comprised of biological measurements or environmental sensory measurements including at least one of location, temperature, moisture, a user photograph, or heart rate, wherein said measurements are matched against expected values for a user under duress, and upon said match, further restricting access to a pre-determined duress mode, performing one or more of additional security actions including locking access to said system, capturing additional sensory information, capturing user photograph or video, notifying owner or authorities, or combinations thereof, wherein said actions are performed without notifying the user of the system, wherein duress mode access includes disabling access to user data and presenting cloned data to the user, and wherein cloned data is correct data, but the changes are not saved as changes to user information or data.

8. The method of claim 7, wherein duress mode access includes disabling access to user data and presenting cloned data to the user, and wherein cloned data is pre-determined false data.

9. A programmable management method for a mobile device, the method comprising:
    proactively monitoring current and anticipated values of:
        user location, activity, proximity to other users or events or locations, planned activities, usage pattern, environmental sensory information, biological sensory information, or combinations thereof,
        wherein said proactive monitoring is performed while the mobile device is in operation and without request for user input;
    generating a security level based on said monitoring, and
    upgrading said security level based on detecting a discrepancy between said current and anticipated values,
    performing a security procedure upon said security level upgrade, upon failure to perform a planned activity, failure to correctly respond to alerts, at owner's request or combinations thereof,
    wherein said security procedure includes non-transparent in addition to transparent security procedures, including performing of additional security actions without knowledge of the user of the system,
    wherein said security procedure includes performing one or more of additional security checks including biological and environmental sensory measurements to identify cases with an authorized user under duress,
    wherein duress is detected upon collected sensory data mismatching an expected set of values of said data, and
    wherein upon a match for a user under duress, further restricting access to a pre-determined duress mode.

10. The method of claim 9, wherein said security procedure includes a transparent mode including a hybrid security authentication mechanism comprising a combination of a biological identification and a passkey, wherein said passkey includes a predetermined pattern of biological inputs including finger print, iris pattern, eye blinks or combinations thereof entered horizontally, vertically or at various angles, each in a specific time pattern, spatial pattern, or combinations thereof.

11. The method of claim 9, wherein said security level is an emergency security level activated by said mobile device alerting a third party and wherein said security level bypasses all other additional monitoring procedures.

* * * * *